United States Patent
Kauz et al.

(10) Patent No.: US 12,409,728 B2
(45) Date of Patent: Sep. 9, 2025

(54) PASSIVE PEDAL FORCE EMULATOR ASSEMBLIES

(71) Applicant: KSR IP Holdings, LLC, Wilmington, DE (US)

(72) Inventors: Wjatscheslaw Kauz, Pattensen (DE); Daniel Leem, Chatham (CA); Chong W. Shon, Komoka (CA); Marty Vanek, Thamesville (CA)

(73) Assignee: KSR IP Holdings, LLC, Wilmington, DE (US)

( * ) Notice: Subject to any disclaimer, the term of this patent is extended or adjusted under 35 U.S.C. 154(b) by 0 days.

(21) Appl. No.: 18/241,541

(22) Filed: Sep. 1, 2023

(65) Prior Publication Data

US 2024/0075811 A1  Mar. 7, 2024

Related U.S. Application Data

(60) Provisional application No. 63/403,360, filed on Sep. 2, 2022.

(51) Int. Cl.
| | |
|---|---|
| *B60K 26/02* | (2006.01) |
| *G05G 1/44* | (2008.04) |
| *G05G 5/03* | (2008.04) |

(52) U.S. Cl.
CPC ............ *B60K 26/021* (2013.01); *G05G 1/44* (2013.01); *G05G 5/03* (2013.01)

(58) Field of Classification Search
CPC ... G05G 1/38; G05G 1/44; G05G 5/03; B60K 26/021
See application file for complete search history.

(56) References Cited

U.S. PATENT DOCUMENTS

| | | |
|---|---|---|
| 5,868,040 A | 2/1999 | Papenhagen et al. |
| 6,367,886 B1 | 4/2002 | Shaw |

(Continued)

FOREIGN PATENT DOCUMENTS

| | | |
|---|---|---|
| CN | 209388515 U | 9/2019 |
| CN | 213842642 U | 7/2021 |

(Continued)

OTHER PUBLICATIONS

Wang et al., "Development and Control of a Magnetorheological Damper-Based Brake Pedal Simulator for Vehicle Brake-by-Wire Systems", Chinese Journal of Mechanical Engineering, vol. 35, 13 pages (2022).

*Primary Examiner* — Thomas C Diaz
(74) *Attorney, Agent, or Firm* — Dinsmore & Shohl LLP

(57) ABSTRACT

Embodiments herein are directed to a pedal emulator assembly including a housing having a cavity defined by a pair of sidewalls, a first end wall and a second end wall. A lower arm having a spring retaining portion is formed therein. A pedal arm is pivotally coupled the pedal arm and includes a pedal pad. A lever arm including a spring receiving portion is positioned within the cavity of the housing and is pivotally coupled to the housing. A spring carrier including a compressible member extends between the spring receiving portion and the spring retaining portion. When a first predetermined load is applied to the pedal pad, the pedal arm drives the lever arm into the compressible member and the compressible member compresses into an at least partially compressed state to generate a first return force on the pedal pad.

20 Claims, 28 Drawing Sheets

(56) References Cited

U.S. PATENT DOCUMENTS

| | | | |
|---|---|---|---|
| 6,464,306 B2 | 10/2002 | Shaw et al. | |
| 6,591,710 B1 | 7/2003 | Shaw | |
| 7,401,865 B2 | 7/2008 | Shaw | |
| 8,635,930 B2 * | 1/2014 | Willemsen | G05G 5/03 |
| | | | 74/514 |
| 9,003,872 B2 | 4/2015 | Jeon | |
| 9,079,570 B2 | 7/2015 | Sellinger et al. | |
| 9,260,088 B2 | 2/2016 | Shand et al. | |
| 9,283,934 B2 | 3/2016 | Shand | |
| 10,620,658 B2 * | 4/2020 | Kadoi | G05G 1/44 |
| 10,906,514 B1 * | 2/2021 | Kim | G05G 1/40 |
| 10,983,549 B2 * | 4/2021 | Kadoi | G05G 5/03 |
| 11,327,520 B1 * | 5/2022 | Kim | G05G 5/05 |
| 11,364,881 B2 | 6/2022 | Kim et al. | |
| 11,613,236 B2 * | 3/2023 | Kim | B60T 7/042 |
| | | | 74/513 |
| 11,614,765 B2 | 3/2023 | Miller et al. | |
| 11,891,039 B2 | 2/2024 | Street et al. | |
| 2005/0082909 A1 | 4/2005 | Constantakis et al. | |
| 2007/0234842 A1 | 10/2007 | Elliott | |
| 2014/0251064 A9 | 9/2014 | Soltys et al. | |
| 2017/0351291 A1 | 12/2017 | Schoenfuss et al. | |
| 2018/0037207 A1 | 2/2018 | Pennala et al. | |
| 2018/0105038 A1 | 4/2018 | Viethen | |
| 2018/0253120 A1 * | 9/2018 | Kim | G05G 1/38 |
| 2021/0237569 A1 * | 8/2021 | Ridder | G05G 1/44 |
| 2022/0089135 A1 | 3/2022 | Austermeier et al. | |
| 2022/0144224 A1 | 5/2022 | Tarandek | |
| 2022/0314939 A1 | 10/2022 | Wagner | |
| 2022/0332295 A1 | 10/2022 | Hoxie et al. | |
| 2022/0348171 A1 | 11/2022 | Yanagida et al. | |

FOREIGN PATENT DOCUMENTS

| | | | |
|---|---|---|---|
| CN | 113748317 B | 12/2021 | |
| DE | 102011016241 A1 | 10/2012 | |
| DE | 102018207422 A1 * | 11/2018 | ............ B60K 26/02 |
| DE | 10201709618 A1 | 12/2018 | |
| EP | 1777095 A2 * | 7/2007 | ............ B60K 26/02 |
| KR | 1020100032129 A | 3/2010 | |
| WO | 2013186609 A1 | 12/2013 | |
| WO | 2024017671 A1 | 1/2024 | |

\* cited by examiner

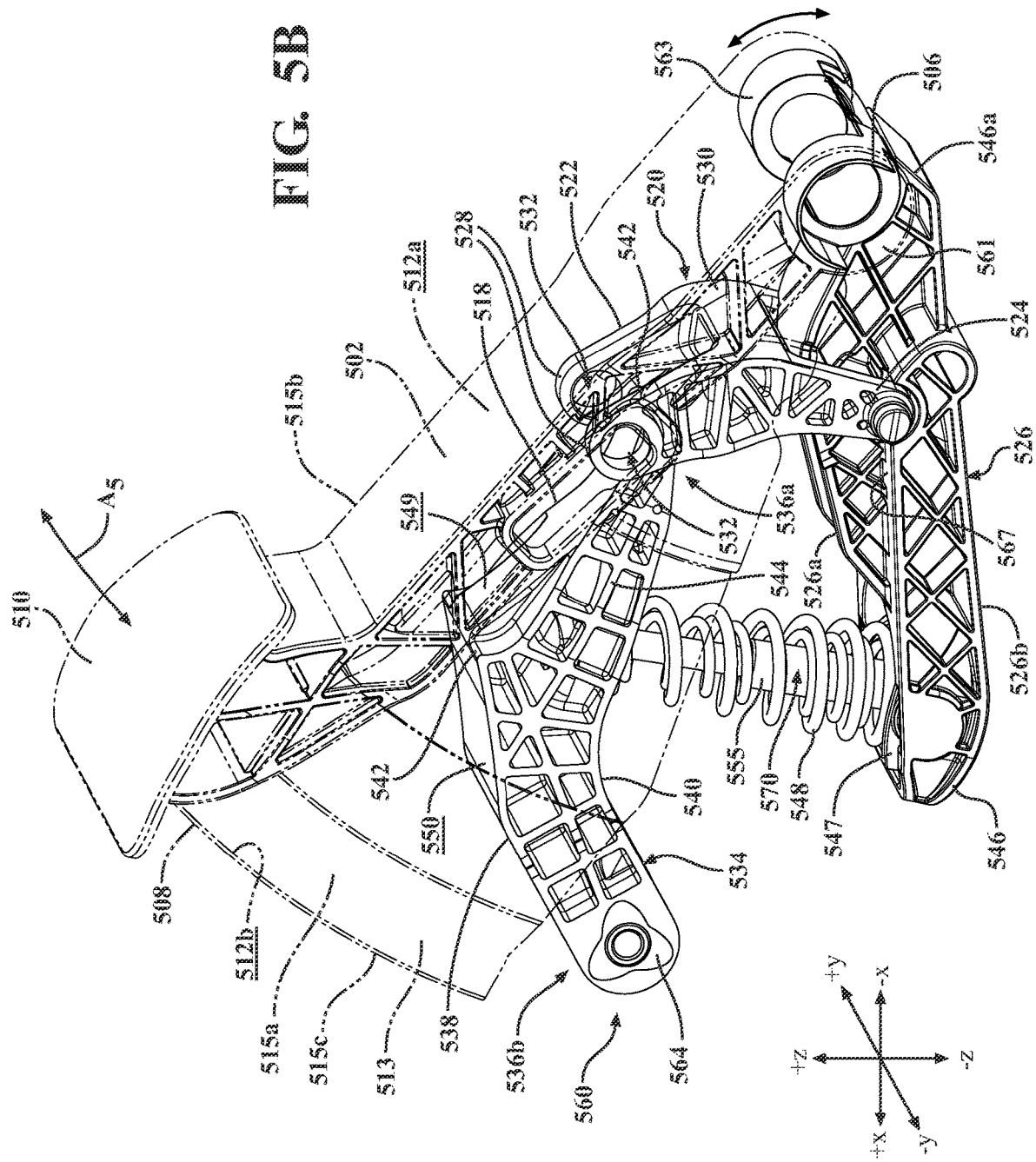

PASSIVE PEDAL FORCE EMULATOR ASSEMBLIES

CROSS-REFERENCE TO RELATED APPLICATIONS

This utility patent application claims priority benefit from U.S. provisional patent application Ser. No. 63/403,360, filed Sep. 2, 2022 and entitled "Passive Pedal Force Emulator Assemblies Having Friction and/or Lever Arms", the entire contents of which is incorporated herein in its entirety.

TECHNICAL FIELD

The present specification generally relates to pedal assemblies for vehicles and, more specifically, to passive force emulators for pedal assemblies with a mechanical resistance for damping and hysteresis dependent on a pedal movement.

BACKGROUND

Traditional vehicle pedal systems are utilized in vehicles to perform functions such as acceleration, braking, and clutch operations. Typically, these pedals are mechanically linked to the respective vehicle components they control, resulting in a driver of the vehicle feeling direct feedback as they depress the pedal utilized in the pedal system. For example, a brake pedal may provide resistance as it pushes against the hydraulic fluid in a brake system. However, in many modern vehicles, such as electric and other autonomous vehicles, the direct mechanical linkages in pedal systems may be replaced with electronic systems. While these electronic systems may offer easier integration, fewer mechanical parts, and weight savings, they often lack the tactile feedback expected and relied upon by drivers for vehicle control. Accordingly, a need exists for a pedal emulator assembly that can recreate the feel and feedback of a traditional mechanical pedal.

SUMMARY

In embodiments, a pedal emulator assembly is disclosed. The pedal emulator assembly includes a housing having a cavity defined by a pair of sidewalls, a first end wall and a second end wall. A lower arm having a spring retaining portion is formed therein. A pedal arm is pivotally coupled the pedal arm and includes a pedal pad. A lever arm including a spring receiving portion is positioned within the cavity of the housing and is pivotally coupled to the housing. A spring carrier including a compressible member extends between the spring receiving portion and the spring retaining portion. When a first predetermined load is applied to the pedal pad, the pedal arm drives the lever arm into the compressible member and the compressible member compresses into an at least partially compressed state to generate a first return force on the pedal pad.

In another embodiment, a pedal emulator assembly for a vehicle is disclosed. The pedal emulator assembly includes a floor-mounted housing having a cavity defined by a pair of sidewalls, a first end wall, and a second end wall. A lower arm having a spring retaining portion formed therein is positioned within the cavity. A pedal arm is at least partially received in the cavity, the pedal arm having an interior surface, a pivot end, and an opposite pad end on which a pedal pad is attached. A lever arm positioned within the cavity of the housing and pivotally coupled to the housing, the lever arm further including a first end, a second end positioned opposite the first end, an apex disposed at the first end, a hub portion disposed at the second end, an upper frame portion and a lower frame portion that connect at the apex and the hub portion; and a spring receiving portion positioned between the first end and the second end and within the lower frame portion. A spring carrier including a compressible member extends between the spring receiving portion and the spring retaining portion. When a first predetermined load is applied to the pedal pad, the interior surface of the pedal arm drives the lever arm into the compressible member such that the compressible member compresses into a compressed state to generate a first return force on the pedal pad.

In yet another embodiment, a pedal emulator assembly for a vehicle is disclosed. The pedal emulator assembly includes a housing having a cavity defined by a pair of sidewalls, a first end wall and a second end wall. The pedal emulator assembly further includes a lower arm having a spring retaining portion formed therein. A pedal arm is at least partially received in the cavity, the pedal arm having a pivot end pivotally coupled to the housing, an opposite pad end on which a pedal pad is attached, and an interior surface that is non-linear. A lever arm is positioned within the cavity of the housing and pivotally coupled to the housing, the lever arm further includes a first end, a second end positioned opposite the first end, an apex disposed at the first end, a hub portion disposed at the second end, an upper frame and a lower frame that connect at the apex and the hub portion, the upper frame including an upper surface with a non-linear profile, and a spring receiving portion positioned between the first end and the second end in the lower frame. The pedal emulator assembly further includes a spring carrier including a compressible member extending between the spring receiving portion and the spring retaining portion. When a first predetermined load is applied to the pedal pad, the interior surface of the pedal arm contacts the upper surface of the upper frame of the lever arm, such that the lever arm is forced into the compressible member to generate a return force on the pedal pad.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 5B schematically depicts the left side perspective view of the pedal assembly of FIG. 5A without a housing, according to one or more embodiments shown and described herein;

DETAILED DESCRIPTION

Figure 1:
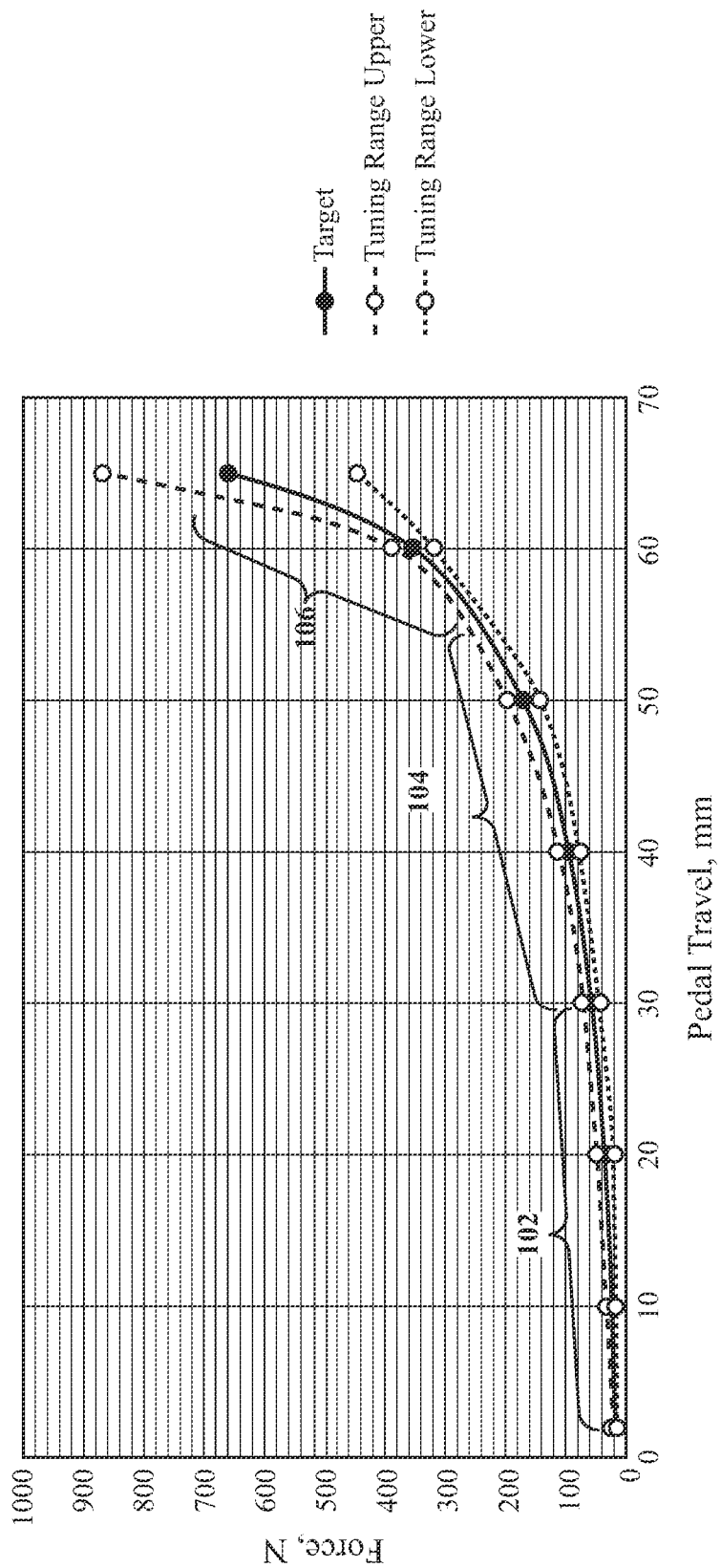
FIG. 1 schematically illustrates an example graphical representation of a pedal travel versus an applied force according to one or more embodiments shown and described herein.

A brake pedal emulator (BPE) is a device that takes the place of a brake pedal and other hardware and is be used on an Electromechanical Braking System where there is no direct mechanical or hydraulic connection between the brake pedal and the calipers. The BPE inputs are force and travel distance from the driver's foot, reference voltage for all sensors, ground for all sensors, reaction loads at all fastening points. The BPE outputs are force feedback/resistance to driver's foot as a function of travel and speed, multiple pedal position sensor outputs as a function of travel, and error codes relating to the sensor outputs. Optional function is the conditioning of the output signals to provide the driver's intended braking input signal. The intention is that the BPE behaves to the driver as closely as possible as a conventional braking system in terms of pedal feel and deceleration performance.

The BPE may be located in a driver's footwell area. The BPE needs to meet the same mechanical loads as conventional pedal assemblies and must behave in a similar way as the conventional pedal. For example, the BPE needs to behave similar to conventional pedals when respect to applying loads, lateral loads, reverse loads vs. deflections and plastic deformation.

Conventional brake pedal assemblies include a pedal mounting bracket with a pivotally attached pedal arm/lever that has certain pedal force characteristics that need to be met during the apply stroke of the pedal. As such, the BPE needs to be configured to meet these same certain pedal force characteristics. Further, in some embodiments, the BPE may also include a downstop for the brake pedal stroke. Additionally, the BPE needs to be configured to withstand panic braking loads.

The BPE assemblies disclosed herein meet the following criteria: The BPE fails functional such that upon any failure, the driver is permitted to operate the braking system by applying the pedal and provide an appropriate sensor signal output. The BPE is configured to withstand foreseeable conditions and abuse a pedal will take. The BPE is scalable to automotive volume series production and be cost effective to manufacture and assemble.

Embodiments described herein are directed to a pedal emulator assemblies that include sensors adapted to sense a position and/or force of a pedal pad. The pedal emulator assemblies are configured to simulate a braking fluid system, such as a hydraulic system, that is based on a speed system. That is, the faster a driver depresses onto the pedal pad of a pedal, the harder or more difficult the pedal is to depress, known herein as hepatic force.

As a pedal effort (PE) is applied to the pedal, a pedal arm pivots to allow for the pedal to travel. The pedal emulator assemblies apply an opposite emulator force (EF) to provide the driver with a resistive force that changes according to the speed in which the PE is applied. Generally, the pedal emulator assembly outputs three distinct force vs travel sections that correspond to a specific range of travel such that the driver feels different resistance or haptics based on how fast the pedal is being depressed.

Various embodiments of pedal emulator assemblies are described in detail herein. Whenever possible, the same reference numerals will be used throughout the drawings to refer to the same or like parts.

As used herein, the term "communicatively coupled" means that coupled components are capable of exchanging data signals and/or electric signals with one another such as, for example, electrical signals via conductive medium or a non-conductive medium, though networks such as via Wi-Fi, Bluetooth, and the like, electromagnetic signals via air, optical signals via optical waveguides, and the like.

Figure 3A:
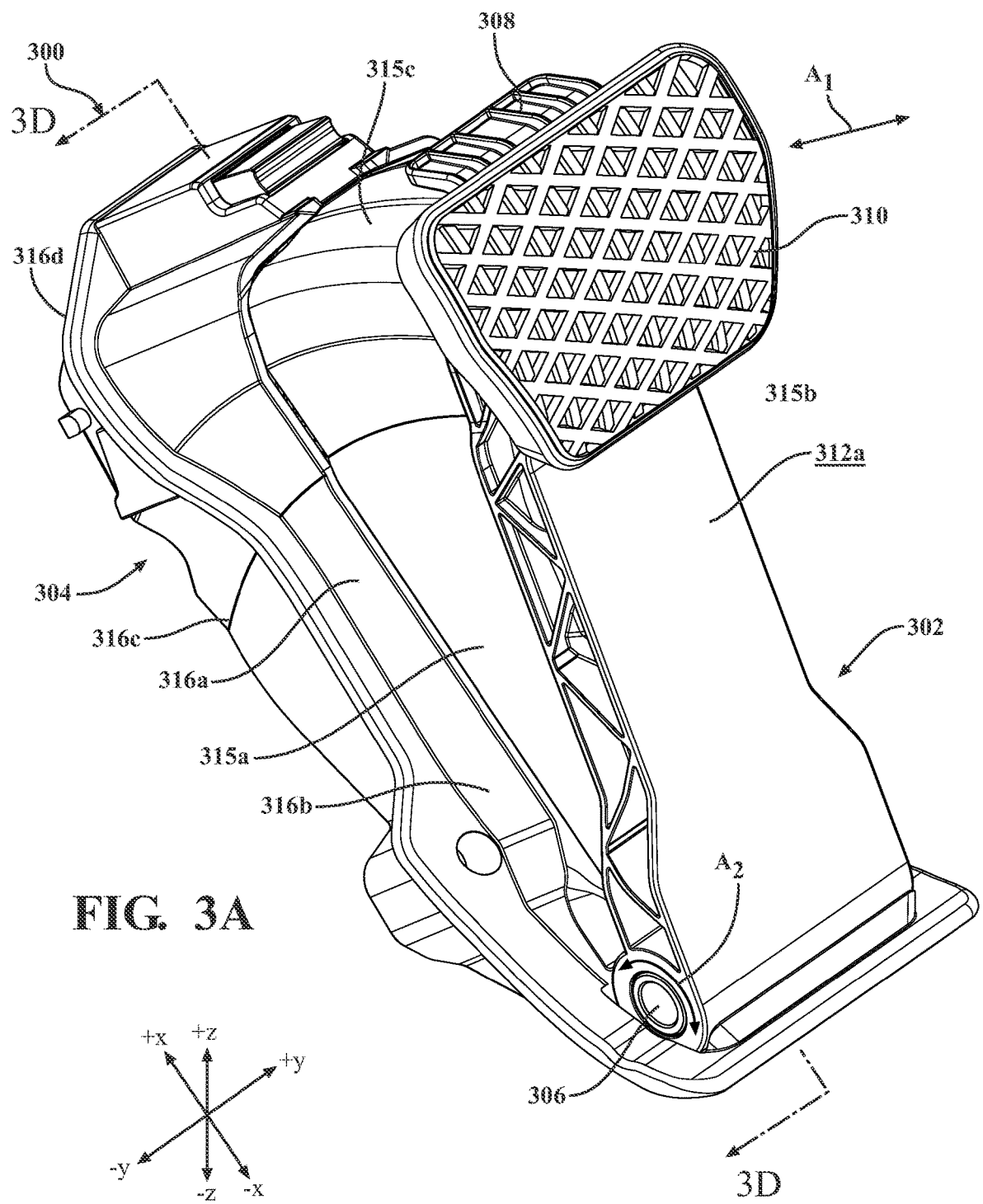
FIG. 3A schematically depicts a left side perspective view of a first example pedal assembly, according to one or more embodiments shown and described herein.
Figure 3B:
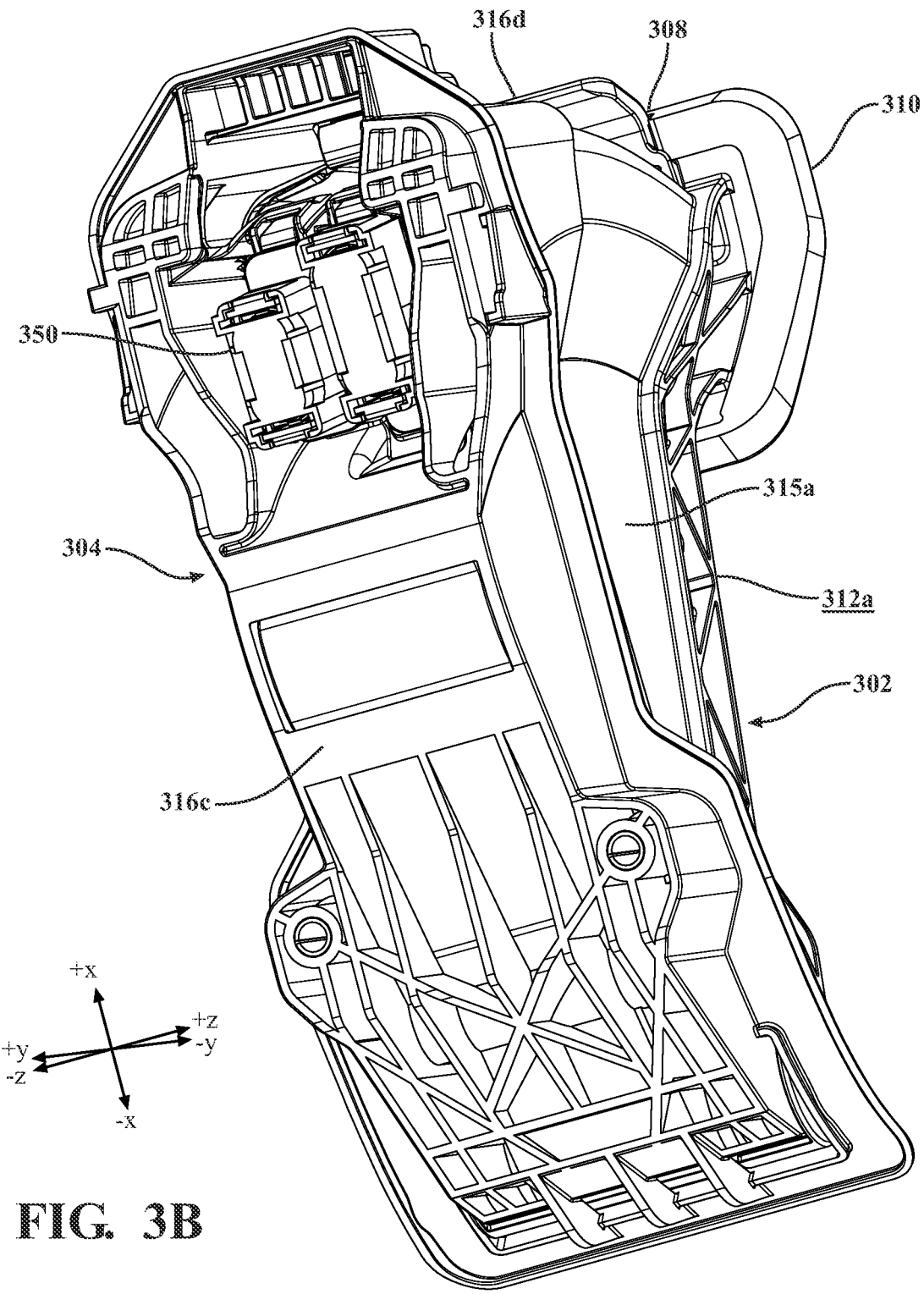
FIG. 3B schematically depicts a rear and left side perspective view of the pedal assembly of FIG. 3A, according to one or more embodiments shown and described herein.
Figure 3C:
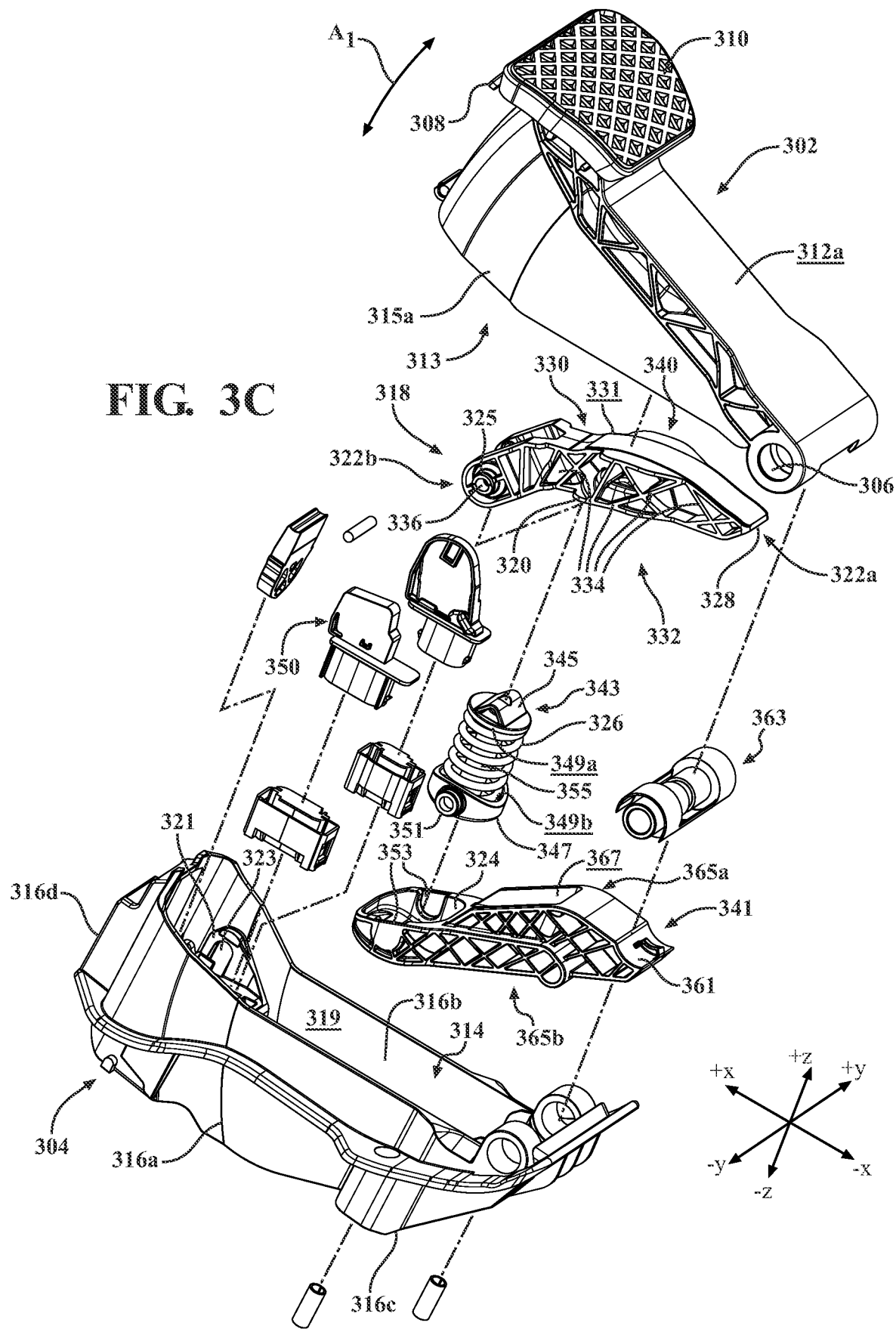
FIG. 3C schematically depicts an exploded perspective view of the pedal assembly of FIG. 3A, according to one or more embodiments shown and described herein.

As used herein, the term "longitudinal direction" refers to the forward-rearward direction of the assembly (i.e., in the +/−X-direction depicted in FIG. 3A). The term "lateral direction" refers to the cross-assembly direction (i.e., in the +/−Y-direction depicted in FIG. 3A), and is transverse to the longitudinal direction. The term "vertical direction" or "below" or "above" refer to the upward-downward direction of the assembly (i.e., in the +/−Z-direction depicted in FIG. 3A).

Referring initially to FIG. 1, an example graphical representation of a desired force response curve for a pedal assembly is depicted, such as the various pedal assemblies depicted in FIGS. 3A-7D. As can be seen, as the pedal travels apply force that is required to generate haptic feedback increases. The force is non-linear and increases significantly near the end of the travel of the pedal. This type of force response is typically found in a mechanical pedal design where there is a linkage either mechanically or hydraulically coupled with the brake calipers. As a pedal effort (PE) is applied to the pedal, the pedal arm pivots to allow the pedal to travel. The emulator applies an opposite emulator force (EF) to provide the driver with a resistive force that changes according to the speed in which the PE is applied.

For example, FIG. 1 depicts three distinct forces that correspond to a specific range of travel such that a driver of a vehicle feels varying resistance and/or haptics based on how fast a pedal pad of the pedal assembly is depressed. In the first section, illustrated by bracket 102, the pedal arm is partially depressed by a first predetermined load or force, but minimal force is transferred from the pedal arm to other components of the emulator assemblies discussed herein.

In the second section, as depicted by bracket 104, upon a second predetermined amount of force applied on the pedal assembly to have an approximate, and without limitation, 30-60 millimeters of travel of a pedal arm, the slope needs to increase. As such, this slope is desirable when the various pedal assemblies described herein are in a plurality of semi-compressed states or partially compressed states. As illustrated, the upward slope of the curve depicted in FIG. 1 indicates that the greater distance that a pedal pad of the pedal assembly travels, the greater force acts on the pedal pad, such that a foot of the driver feels a desired haptic response such as a force feedback. The bracket 102 depicts a first force feedback or first return force and the bracket 104 depicts a second force feedback or second return force that is felt by the driver while applying the second predetermined amount of load onto the pedal pad. As such, the second force feedback or second return force is a greater force than the first force feedback or first return force that is felt by the driver while applying the second predetermined amount of load onto the pedal pad. Further, the second predetermined amount of load onto the pedal pad is a greater load than the first predetermined amount of load onto the pedal pad.

In these embodiments, it should be appreciated that the amount of pedal travel, depicted without limitation, as the last 10 millimeters of travel, which may correspond to a third section as depicted by bracket 106, may produce the greatest increase in force when a third predetermined force is applied to the pedal pad. As such, the bracket 106 depicts a third force feedback or third return force that is felt by the driver while applying the third predetermined amount of load onto the pedal pad. As such, the third force feedback or third return force is a greater force than the second force feedback or second return force that is felt by the driver while applying the third predetermined amount of load onto the pedal pad. Further, the third predetermined amount of load onto the pedal pad is a greater load than the second predetermined amount of load onto the pedal pad.

Various pedal assemblies and their corresponding emulators will be described in additional detail herein with reference to FIGS. 3A-7D.

Figure 2:
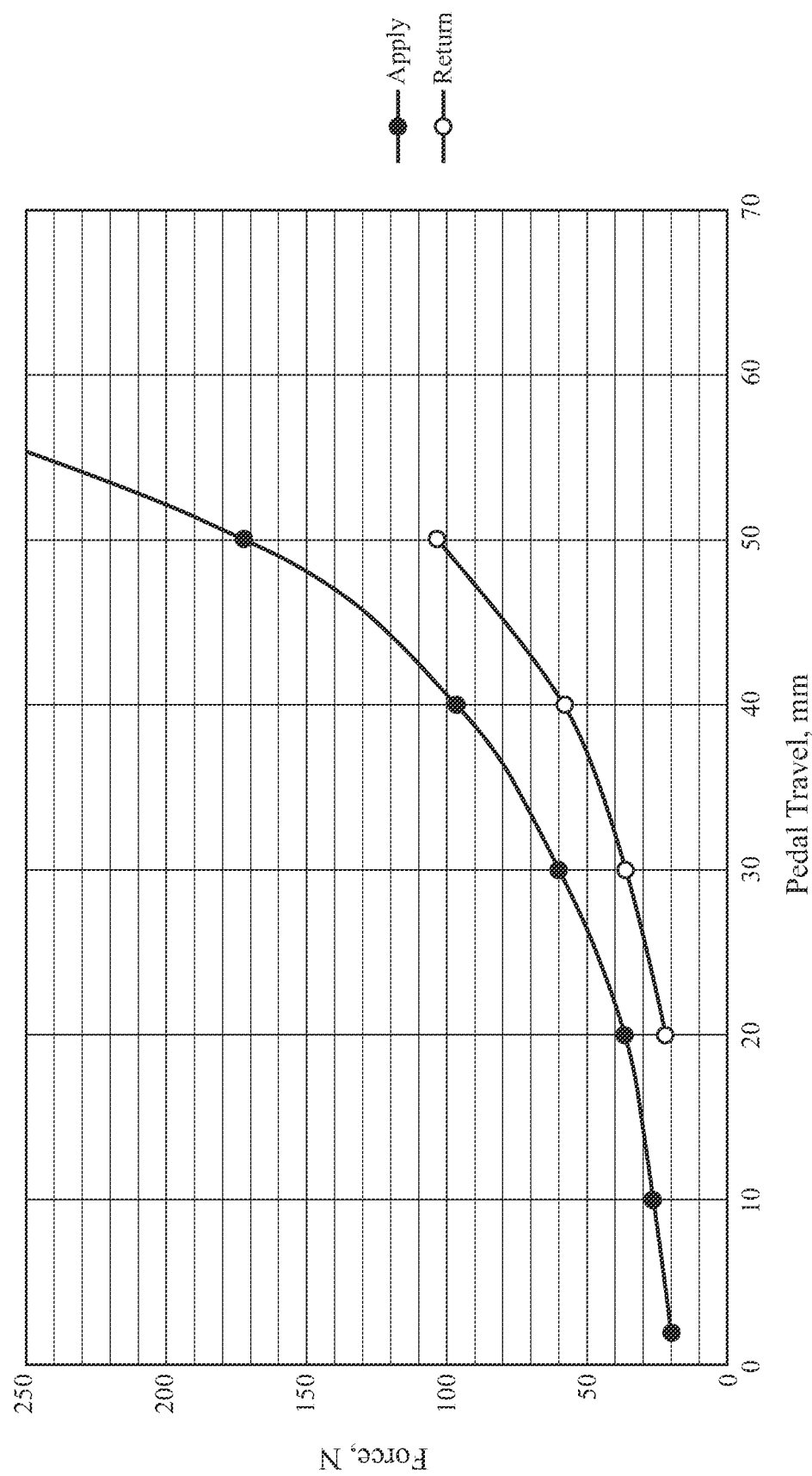
FIG. 2 schematically illustrates an example graphical representation of a pedal travel versus a hysteresis force according to one or more embodiments shown and described herein.

Referring now to FIG. 2, an example graphical representation of a desired mechanical hysteresis force in terms of a force as a function of a pedal position is depicted. As can be seen in the figure, the curve has a similar shape to the apply force denoted in FIG. 1. For example, the return force depicted in FIG. 2 may have an upward slope that corresponds to the upward slope of the target force per pedal travel distance depicted in FIG. 1. It should be appreciated that, in these embodiments, it is desirable to have such force responses in a drive by wire braking system without a mechanical linkage. Such a system will include a brake pedal emulator that is substitute for a mechanically linked brake pedal. As noted hereinabove, various embodiments of brake pedal emulators will be described in additional detail herein with reference to FIGS. 3A-7D.

Referring now to FIGS. 3A-3F, there is shown a schematic representation of a first embodiment of a pedal emulator assembly 300 that utilizes a sliding friction force to generate resistance. In this embodiment, the pedal emulator assembly 300 is depicted as a floor mounted pedal assembly. This is non-limiting and the pedal assembly may be a hanging type, organ type, or other type of pedal assembly. The pedal emulator assembly 300 includes a pedal arm 302 and a housing 304. The pedal arm 302 includes a pivot end 306 and an opposite pad end 308 in which a pedal pad 310 is attached thereto. The pedal arm 302 includes an exterior surface 312a and an opposite interior surface 312b. A cavity 313 of the pedal arm 302 is defined by a pair of opposing walls 315a, 315b, an exterior wall 315c, and the interior surface 312b of the pedal arm 302. The interior surface 312b is positioned to face a cavity 314 of the housing 304 and portions of the pair of opposing walls 315a, 315b are received within the cavity 314 of the housing 304. In some embodiments, the interior surface 312b of the pedal arm 302 may not be a uniform, linear, and/or smooth contour surface and instead, the contour of the interior surface 312b may include ramped portions 317a, arcuate portions 317b, raised portions 317c, notches 317d, and/or the like. In other embodiments, the interior surface 312b of the pedal arm 302 may be linear or uniform contour. The cavity 314 of the housing 304 may be defined by a pair of sidewalls 316a, 316b, a first end wall 316c, and a second end wall 316d. Further, the cavity includes an interior surface 319 formed by the pair of sidewalls 316a, 316b, a first end wall 316c, and a second end wall 316d.

In the embodiments described herein, the housing 304, including sidewalls 316, 316b, first end wall 316c, and second end wall 316d, may be a molded plastic. For example, the housing 304 may be formed with various materials such as acrylonitrile butadiene styrene (ABS), polyethylene (PE), polypropylene (PP), polycarbonate (PC), nylon, polycarbonate/acrylonitrile butadiene styrene, polyurethane, polymethyl methacrylate, high density polyethylene, low density polyethylene, polystyrene, PEEK, POM (Acetal/Delrin), polyethylene terephthalate, thermoplastic elastomer, polyetherimide, theremoplastic vulcanizate, polysulfone, combinations thereof, and/or the like. Additionally, additives may be added such as UV absorbers, flame-retardants, colorants, glass fibers, plasticizers and/or the like.

In other embodiments, the housing 304 and pedal arm 302 may be formed from injection molding or other additive manufacturing techniques. For example, as provided herein, additive manufacturing techniques refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Furthermore, it should be appreciated that the housing 304 may be floor mounted. That is, in some embodiments, the housing 304 may be coupled or mounted to be positioned within or extending from a floor surface of a vehicle. As such, the cavity 314 of the housing 304 accommodates the pedal arm 302 at full depression to allow the pedal pad 310 to fully travel.

Referring still to FIGS. 3A-3F, the pedal emulator assembly 300 may further include a lever arm 318 that is positioned within the cavity 314 of the housing 304 and is pivotally coupled between the pair of sidewalls 316a, 316b. The lever arm 318 includes a first end 322a and an opposite second end 322b. Further, the lever arm 318 includes an upper frame 330 and a lower frame 332 that connect at an apex 328 at the first end 322a and a hub portion 336 at the second end 322b. A plurality of support members 334 extend between the upper frame 330 and the lower frame 332 to ensure the integrity of the lever arm 318 as the pedal arm 302 is depressed.

As further depicted in FIGS. 3A-3F, the hub portion 336 positioned at the second end 322b of the lever arm 318 is pivotally connected to the pair of sidewalls 316a, 316b of the housing 304 via an attachment portion 321 extending between the pair of sidewalls 316a, 316b. The attachment portion 321 may include a pair of receiving slots 323 configured to receive a circumferential wall 325 or continuous circular wall of the lever arm 318 extending from the second end 322b in the lateral direction (i.e., in the +/−Y direction). For example, the hub portion 336 may be coupled to the pair of sidewalls 316a, 316b using a press fit, a through pin, and the like. In other embodiments, a protrusion may extend from each of the pair of sidewalls 316a, 316b to be received by the hub portion 336, such that the hub portion 336 may pivot relative the pair of sidewalls 316a, 316b. However, it should be understood that the hub portion 336 may be coupled to the pair of sidewalls 316a, 316b via any suitable coupling that allows the hub portion 336 to pivot. By pivotally coupling the hub portion 336 between the pair of sidewalls 316a, 316b, the lever arm 318 may rotate about the hub portion 336 when the interior surface 312b of the pedal arm 302 contacts the upper frame 330 of the lever arm 318, as will be described in additional detail herein.

As further depicted in FIGS. 3A-3F, the upper frame 330 includes a surface 331 that has nonlinear profile extending between the first end 322a and the second end 322b of the lever arm 318 and through an apex 340 of the upper frame 330. For example, as depicted best in FIGS. 3D-3F, a first portion 327 of the upper frame 330 (e.g., the portion extending between the first end 322a and the apex 340) may have a first slope, while a second portion 329 of the upper frame 330 (e.g., the portion extending between the apex 340 and the second end 322b) may have a second slope different from the first slope, which may provide the surface 331 of the upper frame 330 with the nonlinear profile. In these embodiments, the first slope of the first portion 327 may be greater (e.g., steeper) than the second slope of the second portion 329, which may aid in ensuring that appropriate forces are provided as the pedal is depressed. Operation of the pedal emulator assembly 300 will be described in additional detail herein with reference to FIGS. 3D-3F.

In the embodiments described herein, the lever arm 318 may further include a spring receiving portion 320 positioned between the first end 322a and the second end 322b in the lower frame 332.

A spring carrier 343 that includes a compressible member, such as at least one spring 326, may extend between the spring receiving portion 320 of the lever arm 318 and a spring retaining portion 324 formed in a lower arm 341. The lower arm 341 may be fixedly coupled to the floor surface of the cavity, and/or to the interior surface 319, and the like.

The lower arm 341 further includes an upper portion 365a and an opposite lower portion 365b. The lower portion 365b is coupled to the housing 304 via a lower arm protrusion 366 that extends from the lower portion 365b of the lower arm 341. In these embodiments, the lower arm protrusion 366 of the lower arm 341 is received in a recess 370 of the housing 304 formed in the second end wall 316d. The upper portion includes an engagement surface 367 that is configured to receive a portion of the apex 328 of the joining of the upper frame 330 and the lower frame 332 of the lever arm 318 based on an amount of travel of the pedal arm 302. For example, as best illustrated in FIG. 3F, the apex 328 is illustrated as abuts, engaging, or otherwise in communication with the engagement surface 367 of the lower arm 341 when the pedal arm 302 is in the fully compressed position adding to the pedal effect felt by the driver.

The lower arm 341 may further include a concave portion 361 configured to receive a pivot portion 363 that is rotatably or movably coupled to the 306 of the pedal arm 302 such that the pedal arm pivots or rotates or otherwise moves the pivot portion 363 within the concave portion 361 of the lower arm 341.

As such portion of the spring carrier 343 may be received within, the cavity 313 of the pedal arm 302 and a portion may be received within the cavity 314 of the housing 304. In some embodiments, the spring carrier 343 may be coupled to spring receiving portion 320 of the lever arm 318 via a fastener such as a nut and bolt, screw, rivet, hook and loop, adhesive, weld, and/or the like. In other embodiments, the spring carrier 343 may be coupled to the spring receiving portion 320 of the lever arm 318 via a press fit configuration, a tension fit, and the like. Further, in some embodiments, the spring carrier 343 may be coupled to the spring retaining portion 324 of the lower arm 341 via a fastener such as a nut and bolt, screw, rivet, hook and loop, adhesive, weld, and/or the like. In other embodiments, the spring carrier 343 may be coupled to spring retaining portion 324 of the lower arm 341 via a press fit configuration, a tension fit, and the like.

The spring carrier 343 further includes a female spring guide 345 and a male spring guide 347 that includes an elongated member 355 configured to extend and engage with the female spring guide 345 and compress into a void or cavity in the male spring guide 347 based on a tension or force applied to the spring carrier 343. It should be understood that this is non-limiting and the elongated member 355 may be configured to extend and engage with the male spring guide 347 and compress into a void or cavity in the female spring guide 345 based on a tension or force applied to the spring carrier 343.

The female spring guide 345 and the male spring guide 347 are coupled to one another within an inner diameter of the at least one spring 326 (e.g., via the elongated member 355) such that the at least one spring 326 extends between and is in contact with a spring receiving surface 349a of the female spring guide 345 and a spring receiving surface 349b of the male spring guide 347. Such an arrangement retains the at least one spring 326 while permitting for the at least one spring 326 to expand and compress as a function of the amount of travel of the pedal arm 302, as discussed in greater detail herein.

A protrusion 351 extends from the male spring guide 347 to act as a coupling point to pivotally couple the male spring guide 347 to a corresponding slots 353 in the spring retaining portion 324 of the lower arm 341 in a press fit or tension fit connection. In other embodiments, the protrusion 351 of the male spring guide 347 may be coupled to the corresponding slots 353 via a fastener such as a nut and bolt, screw, rivet, hook and loop, adhesive, weld, and/or the like.

The tension caused by the at least one spring 326 arranged between the male spring guide 347 and the female spring guide 345 that are configured to move to compress the at least one spring 326 may cause the female spring guide 345 to remain in contact with or seated within the spring receiving portion 320 of the lever arm 318 and cause the male spring guide 347 to remain in contact with, or seated within, the spring retaining portion 324 formed in the lower arm 341. As such, regardless of the amount of travel of the pedal arm 302, there is a tension caused by the male spring guide 347 and the female spring guide 345 maintaining a position of contact of the spring carrier 343 extending between the lever arm 318 and the lower arm 341.

Figure 3D:
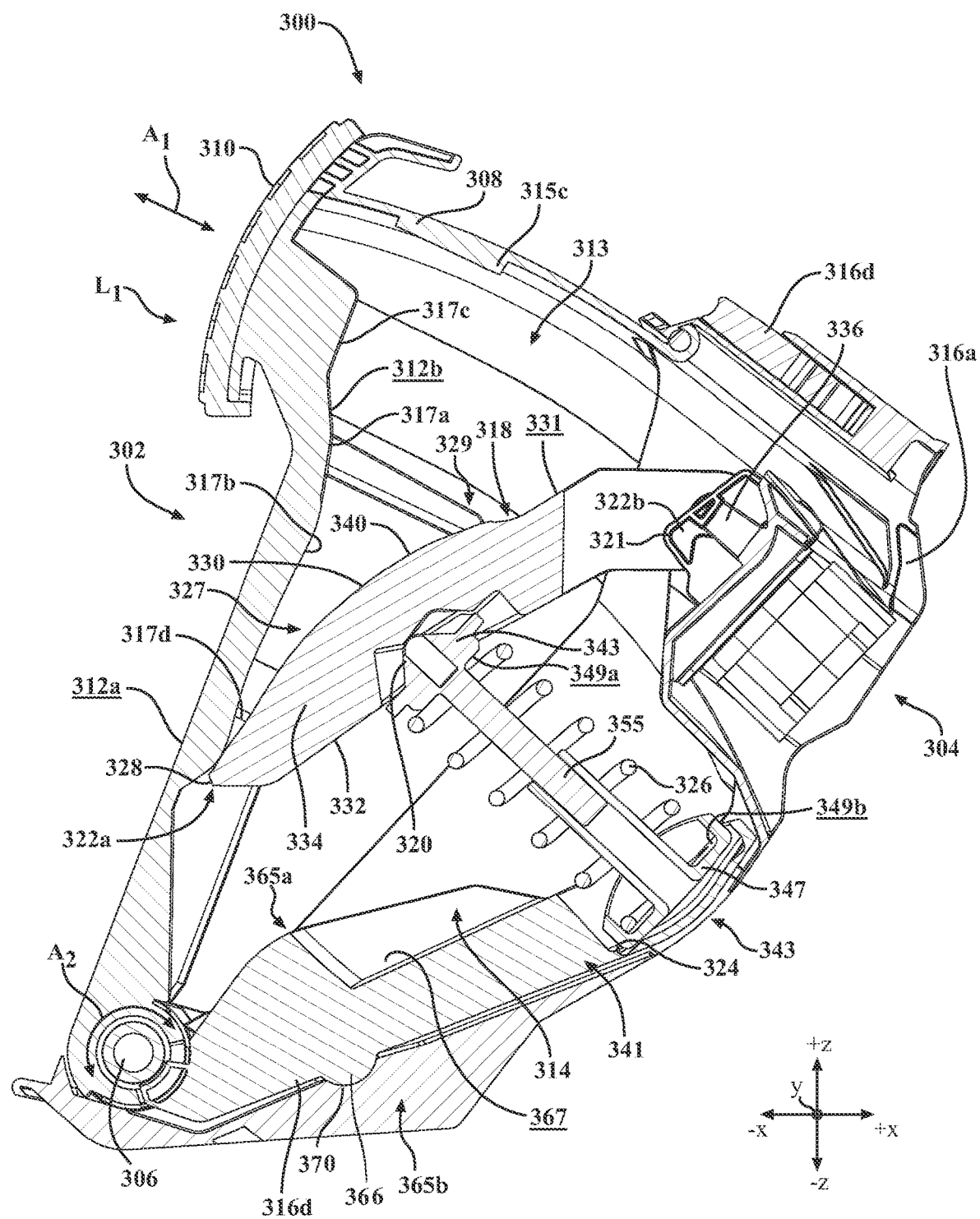
FIG. 3D schematically depicts a cross-sectional view of the pedal assembly of FIG. 3A taken from line 3-3 with a pedal arm in an undepressed state, according to one or more embodiments shown and described herein.

The at least one spring 326 biases the lever arm 318 into the interior surface 312b (e.g., via the first end 322a, as has been described herein) with a force sufficient to maintain the pedal pad 310 in an initial or undepressed position, such that the pedal pad 310 is available for the driver, as best illustrated in FIG. 3D.

Although the pedal emulator assembly 300 depicted in FIGS. 3A-3F is illustrated as including a single spring as the at least one spring 326, it should be appreciated that, in some embodiments, multiple springs may extend between the spring receiving portion 320 and the spring retaining portion 324 formed in the lower arm 341. The multiple springs may be coaxially aligned such that the at least one spring 326 has an outer diameter smaller or less than an inner diameter of the at least one spring 326 to be positioned within the inner diameter of the at least one spring 326, and so on. For example, in some embodiments, multiple springs may be utilized to ensure that the pedal emulator assembly 300 remains functional in the event at least one of the springs fails (e.g., breaks, disengages the spring retaining portion and/or spring retention portion, and the like). In these embodiments, the at least one spring 326 may be a coil spring. In other embodiments, the at least one spring 326 may be a torsion spring, a tension spring, a conical spring, and/or the like. The at least one spring 326 may be formed with a steel material, such as stainless steel, wire, carbon steel, alloy steel, elgiloy, Monel®, copper, nickel, and/or the like.

Operation of the pedal emulator assembly 300 will now be discussed in detail with reference to FIGS. 3D-3F. For example, as depicted in FIG. 3D, the pedal emulator assembly 300 is in the initial or undepressed position, and/or subject to a first predetermined load L1. In this position, the pedal pad 310 is extended away from the housing 304 in the longitudinal direction (e.g., in the +/−X direction) such that the interior surface 312b of the pedal arm 302 is only in contact with the first end 322a of the lever arm 318. In these embodiments, the at least one spring 326 may be in a mostly unbiased (e.g., fully extended) position, such that the at least one spring 326 is only applying a minimum resistance to maintain the positioning of the pedal arm 302. As such, the first predetermined load L1 may be enough to force to compress the at least one spring 326 a predetermined distance and the pedal arm may slidably contact or slidably engage with a portion of the non-linear profile of the surface 331 of the upper frame 330 of the lever arm 318 to achieve the desirable curve illustrated by bracket 102 in FIG. 1.

Figure 3E:
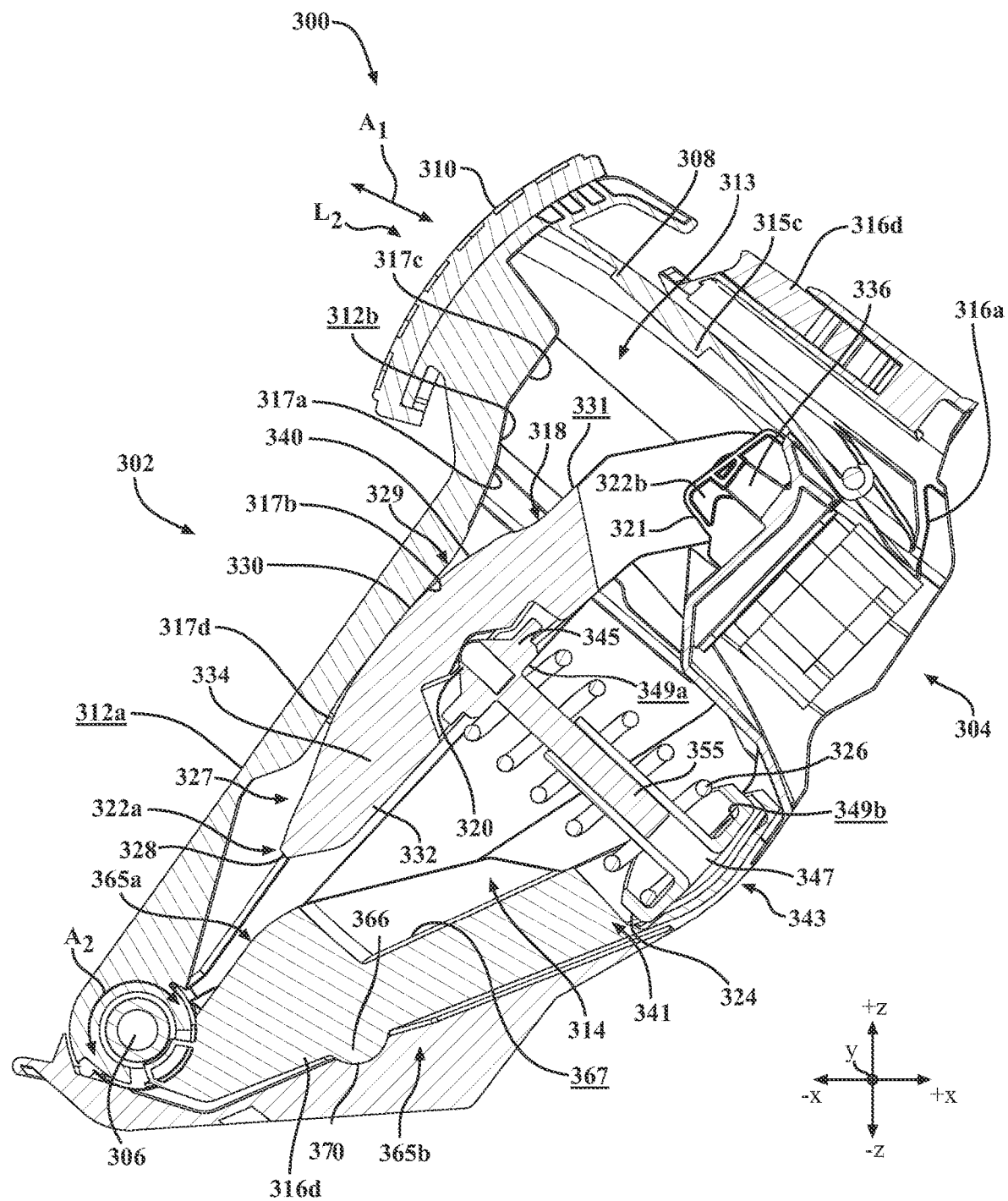
FIG. 3E schematically depicts a cross-sectional view of the pedal assembly of FIG. 3A taken from line 3-3 with a pedal arm in an partially depressed state, according to one or more embodiments shown and described herein.
Figure 3F:
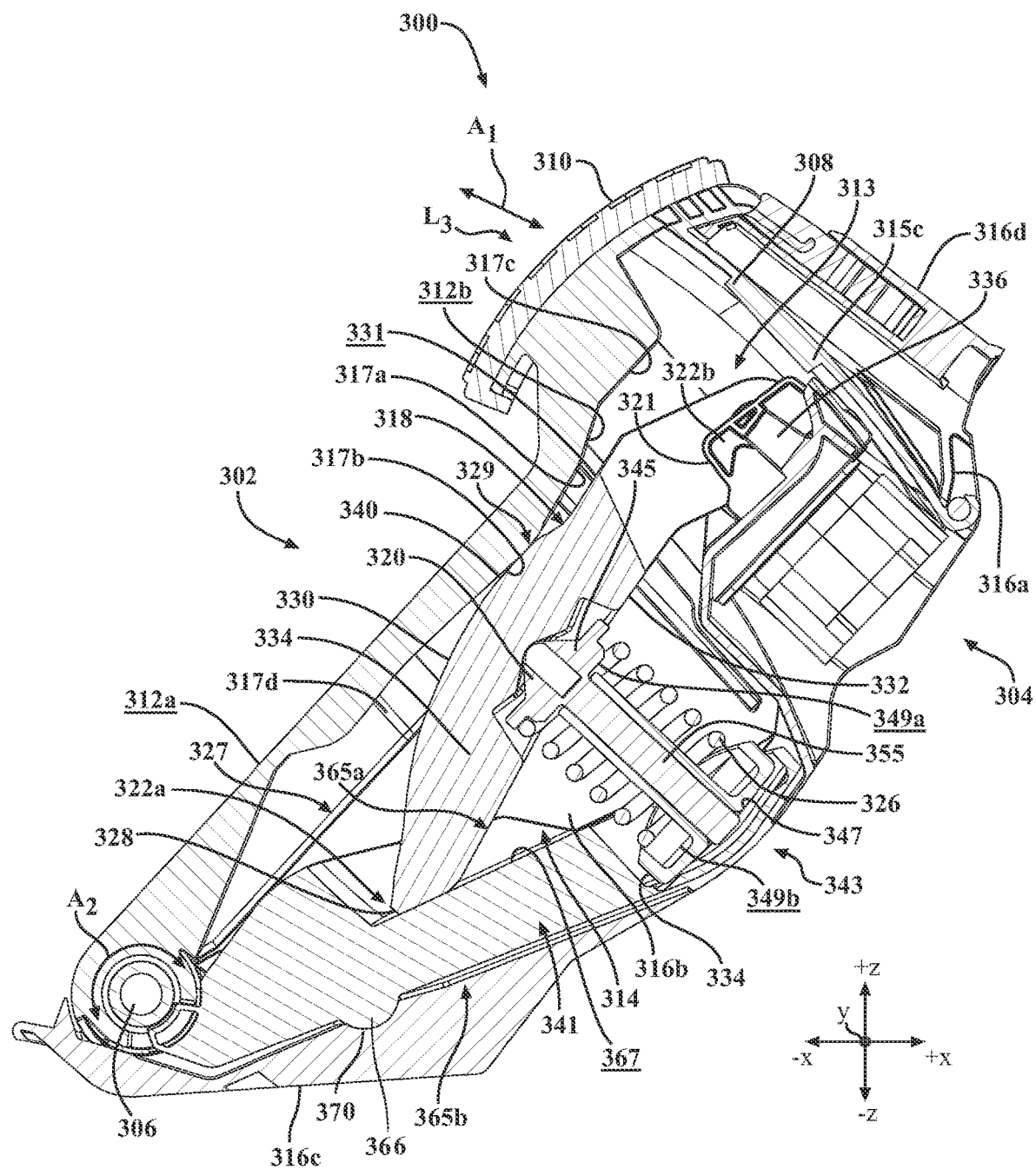
FIG. 3F schematically depicts a cross-sectional view of the pedal assembly of FIG. 3A taken from line 3-3 with a pedal arm in a fully depressed state, according to one or more embodiments shown and described herein.

Referring now to FIG. 3E, when a second predetermined load L2 is applied to the pedal pad 310, in the direction indicated by arrow A1, the pedal arm 302 moves or pivots about the pivot end 306, indicated by arrow A2, to allow the pad end 308 to move into the housing 304 based on the amount of force exerted on the pedal pad 310 and the current position of the pedal arm 302. For example, as depicted in FIG. 3E, the pad end 308 may move partially into the housing 304, such that the at least one spring 326 is partially compressed and generates a return force or a force feedback on the pedal pad 310 that corresponds to the amount of force applied to the pedal pad 310 by the driver.

Simultaneously, the interior surface 312b of the pedal arm 302 may abut or ride against the surface 331 of the upper frame 330 in addition the compression of the at least one spring 326. In these embodiments, the amount of force applied to the pedal pad 310 (e.g., via the driver), may correspond to the pedal effort and/or resistance felt by the driver during depression of the pedal pad 310. More particularly, the mechanical advantage of the pedal arm 302 against the at least one spring 326 may determine the pedal effort and/or resistance felt by the driver during depression of the pedal pad 310. In these embodiments, the mechanical advantage between the pedal arm 302 and the at least one spring 326 refers to the ratio of the force exerted by the at least one spring 326 relative to the force applied to the pedal arm 302 via contact between the driver and the pedal pad 310.

Referring still to FIG. 3E, a greater or larger portion of the non-linear profile of the surface 331 of the upper frame 330 of the lever arm 318 may further ride against or slidably contact or slidably engage with interior surface 312b of the pedal arm 302 producing a greater pedal effect experienced by the driver, as illustrated by bracket 104 in FIG. 1. Further, the at least one spring 326 may still be compressing providing an additional pedal effect. In these embodiments, the effective force exerted by the at least one spring 326 may depend on the contour of the surface 331 of the upper frame 330 relative to the contour of the interior surface 312b of the pedal arm 302 contacting the upper frame 330.

For example, in the embodiments depicted in FIGS. 3D-3F, the contour of the interior surface 312b of the pedal arm 302 may be similar to the contour of the first portion of the upper frame 330 (e.g., the portion between the first end 322a and the apex 340). Accordingly, when the pedal arm 302 is partially depressed, as best depicted in FIG. 3E, the force exerted on the driver's foot may be less, as the similar contours of the interior surface 312b of the pedal arm 302 and the first portion of the upper frame 330 may act to balance the force exerted by the at least one spring 326. In these embodiments, the force exerted on the foot of a driver may simulate the initial give or ease of a traditional brake pedal, which is depicted in the bracket 104 of FIG. 1.

As the pedal arm 302 is further depressed, the interior surface 312b of the pedal arm 302 may engage different portions of the upper frame 330. As the contour of the upper frame 330 changes, the upper frame 330 may provide increased mechanical advantage against the at least one spring 326, thereby simulating a progressive increase in resistance or pedal effort felt by the driver.

The mechanical advantage against the at least one spring 326 may be increased as the contour of the upper frame 330 departs from the contour of the interior surface 312b of the pedal arm 302. For example, as depicted in FIGS. 3D-3F, the second portion 329 of the upper frame 330 (e.g., the portion between the apex 340 and the second end 322b) may greatly differ in slope from the interior surface 312b of the pedal arm 302. Accordingly, as the interior surface 312b of the pedal arm 302 contacts the second portion 329 of the upper frame 330, the force provided by the at least one spring 326 acts at an angle, thereby increasing the mechanical advantage or pedal effort against the pedal arm 302.

For example, as the pedal arm 302 moves from the partially depressed position (as depicted in FIG. 3E) to the fully depressed position (as depicted in FIG. 3F), the interior surface 312b of the pedal arm 302 may transition from engaging the first portion 327 of the upper frame 330 to the second portion 329 of the upper frame 330. As the interior surface 312b of the pedal arm 302 contacts the second portion 329 of the upper frame 330, the mechanical advantage and/or pedal effort against the at least one spring 326 may be maximized, thereby maximizing the force exerted back onto the pedal arm 302 (and thus, the foot of the driver).

Accordingly, it should be appreciated that the various contours of the interior surface 312b, the surface 331 of the upper frame 330 of the lever arm 318 and the at least one spring 326 provide the pedal effect/resistance felt at the pedal pad 310 by the driver. The force applied by the at least one spring 326 and the various contours of the surface 331 of the interior surface 312b applied against the non-linear surface of the upper frame 330 of the lever arm 318 apply different forces at the corresponding travel positions of the pedal arm 302 with the surface 331 having the non-linear contour applying a desirable force to the pedal arm 302. The combination of the at least one spring 326 and the various contours of the interior surface 312b applied against the surface 331 of the upper frame 330 of the lever arm 318 result in a composite of forces to provide a desired force curve.

Referring again to FIGS. 3A-3F, in the embodiments described herein, the pedal emulator assembly 300 may further include a sensor assembly 350. In these embodiments, the sensor assembly 350 may include a printed circuit board including at least one Hall Effect chip and a magnet positioned anywhere within the housing 304 that moves to detect movement of the pedal arm 302 and/or the at least one spring 326 via Hall Effect sensing techniques. Accordingly, the sensor assembly 350 may be configured to track the position of the pedal arm 302 and the forces applied to the foot of the driver. In other embodiments, inductive sensing techniques may be applied to sense a coupler that moves to detect movement of the pedal arm 302 and/or the at least one spring 326.

Turning now to FIGS. 4A-4E, a second example embodiment of a pedal emulator assembly 400 that utilizes friction to generate resistance is schematically depicted. In these embodiments, the pedal emulator assembly 400 includes a pedal arm 402 and a housing 404. The pedal arm 402 includes a pivot end 406 and an opposite pad end 408 in which a pedal pad 410 is attached thereto. The pedal arm 402 includes an exterior surface 412a and an opposite interior surface 412b. A protrusion 413 extends from the interior surface 412b of the pedal arm 402. In some embodiments, the protrusion 413 may be shaped to have a contact surface 415 that is rounded. In other embodiments, the protrusion 413 may be any shape including, without limitation, octagonal, hexagonal, triangular, cone, square, and/or the like. A portion of the pedal arm 402 may be received within a cavity 414 of the housing 404.

The cavity 414 of the housing 404 is defined by a pair of sidewalls 416a, 416b, an end wall 416c, and a top wall 416d. The pivot end 406 of the pedal arm 402 is pivotally connected to the pair of sidewalls 416a, 416b via an elongated member 417, such that the pedal arm 402 may rotate, in the direction indicated by arrow A4, about the pivot end 406. The housing 404 is configured to be mounted to an instrument panel, a bracket, and/or the like, such that the housing 404 is supported above a floor of a vehicle. Within the cavity 414 of the housing 404 is a lever arm 418 pivotally coupled between the pair of sidewalls 416a, 416b. The lever arm 418 includes a first end 420a and an opposite second end 420b. Further, the lever arm 418 includes an outer surface 419a and an opposite inner surface 419b that are spaced apart by a plurality of honeycomb members 419c. Further, the outer surface 419a includes an engagement surface 422 positioned to extend along the outer surface 419a from the first end 420a. The engagement surface 422 may be configured to abut and or receive the contact surface 415 of the protrusion such that the protrusion 413 slidably engages with the engagement surface 422. Both the outer surface 419a and the engagement surface 422 are non-linear and may have portions that are accurate and/or curvilinear.

Further, the lever arm 418 includes a projection 423 extending from inner surface 419b that is configured to be received within a recess 427 of an interior surface 429 of the end wall 416c within the cavity 414. As such, the interaction between the projection 423 and the recess 427 permit the lever arm 418 to pivot or otherwise move within the cavity 414 a predetermined amount based on a load applied to the pedal pad 410.

A spring carrier 426 includes a pedal end 428a and an opposite lever arm end 428b. The spring carrier 426 extends between the pivot end 406 of the pedal arm 402 and the first end 420a of the lever arm 418. The pedal end 428a is coupled to a hub receiving portion 430 that is coupled to the pivot end 406 of the pedal arm 402 and the lever arm end 428b is coupled to the first end 420a of the lever arm 418. The second end 420b of the lever arm 418 is adapted to receive at least one spring 436 that extends between the lever arm 418 and the hub receiving portion 430.

In some embodiments, the spring carrier 426 may be coupled to a spring receiving portion 421 of the lever arm 418 via a fastener such as a nut and bolt, screw, rivet, hook and loop, adhesive, weld, and/or the like. In other embodiments, the spring carrier 426 may be coupled to the spring receiving portion 421 of the lever arm 418 via a press fit configuration, a tension fit, and the like. Further, in some embodiments, the spring carrier 426 may be coupled to a spring carrier retaining portion 438 of the pedal arm 402 via a fastener such as a nut and bolt, screw, rivet, hook and loop, adhesive, weld, and/or the like. In other embodiments, the spring carrier 426 may be coupled to the spring carrier retaining portion 438 of the pedal arm 402 via a press fit configuration, a tension fit, and the like.

The spring carrier 426 further includes a female spring guide 445 and a male spring guide 447 that includes an elongated member 455 configured to extend and engage with the female spring guide 445 and compress into a void or cavity in the male spring guide 447 based on a tension or force applied to the spring carrier 426. It should be understood that this is non-limiting and the elongated member 455 may be configured to extend and engage with the male spring guide 447 and compress into a void or cavity in the female spring guide 445 based on a tension or force applied to the spring carrier 426. The male spring guide 447 includes a first end 426a and an opposite second end 426b, the first end 426a configured to engage with the pedal arm at the pivot end 406 and the second end 426 is positioned at the femal spring guide 445.

The female spring guide 445 and the male spring guide 447 are coupled to one another within an inner diameter of the at least one spring 436 (e.g., via the elongated member 455) such that the at least one spring 436 extends between and is in contact with a spring receiving surface 449a of the female spring guide 445 and a spring receiving surface 449b of the male spring guide 447. Such an arrangement retains the at least one spring 436 while permitting for the at least one spring 436 to expand and compress as a function of the amount of travel of the pedal arm 402, as discussed in greater detail herein.

The tension caused by the at least one spring 436 arranged between the male spring guide 447 and the female spring guide 445 that are configured to move to compress the at least one spring 436 may cause the female spring guide 445 to remain in contact with or seated within the spring receiving portion 421 of the lever arm 418 and cause the male spring guide 447 to remain in contact with, or seated within, the spring carrier retaining portion 438 formed in the pedal arm 402. As such, regardless of the amount of travel of the pedal arm 402, there is a tension caused by the male spring guide 447 and the female spring guide 445 maintaining a position of contact of the spring carrier 426 extending between the lever arm 418 and the pedal arm 402.

Referring still to FIGS. 4A-4E, the pedal emulator assembly 400 further includes an elastomer member 432 positioned within a recess 434 of the housing 404. The recess 434 is positioned below the cavity 414 such that the elastomer member 432 is positioned to align with the interior surface 412b of the pedal arm 402 at the pad end 408 such that when the pedal arm 402 is moved or rotated a predetermined distance, the interior surface 412b of the pedal arm 402 at the pad end 408 makes contact to compress the elastomer member 432.

In the embodiments described herein, the housing 404 and pedal arm 402, may be a molded plastic. For example, the housing 404 and pedal arm 402 may be formed with various materials such as acrylonitrile butadiene styrene (ABS), polyethylene (PE), polypropylene (PP), polycarbonate (PC), nylon, polycarbonate/acrylonitrile butadiene styrene, polyurethane, polymethyl methacrylate, high density polyethylene, low density polyethylene, polystyrene, PEEK, POM (Acetal/Delrin), polyethylene terephthalate, thermoplastic elastomer, polyetherimide, theremoplastic vulcanizate, polysulfone, combinations thereof, and/or the like. Additionally, additives may be added such as UV absorbers, flame-retardants, colorants, glass fibers, plasticizers and/or the like.

In other embodiments, the housing 404 and pedal arm 402 may be formed from injection molding or other additive manufacturing techniques. For example, as provided herein, additive manufacturing techniques refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Figure 4A:
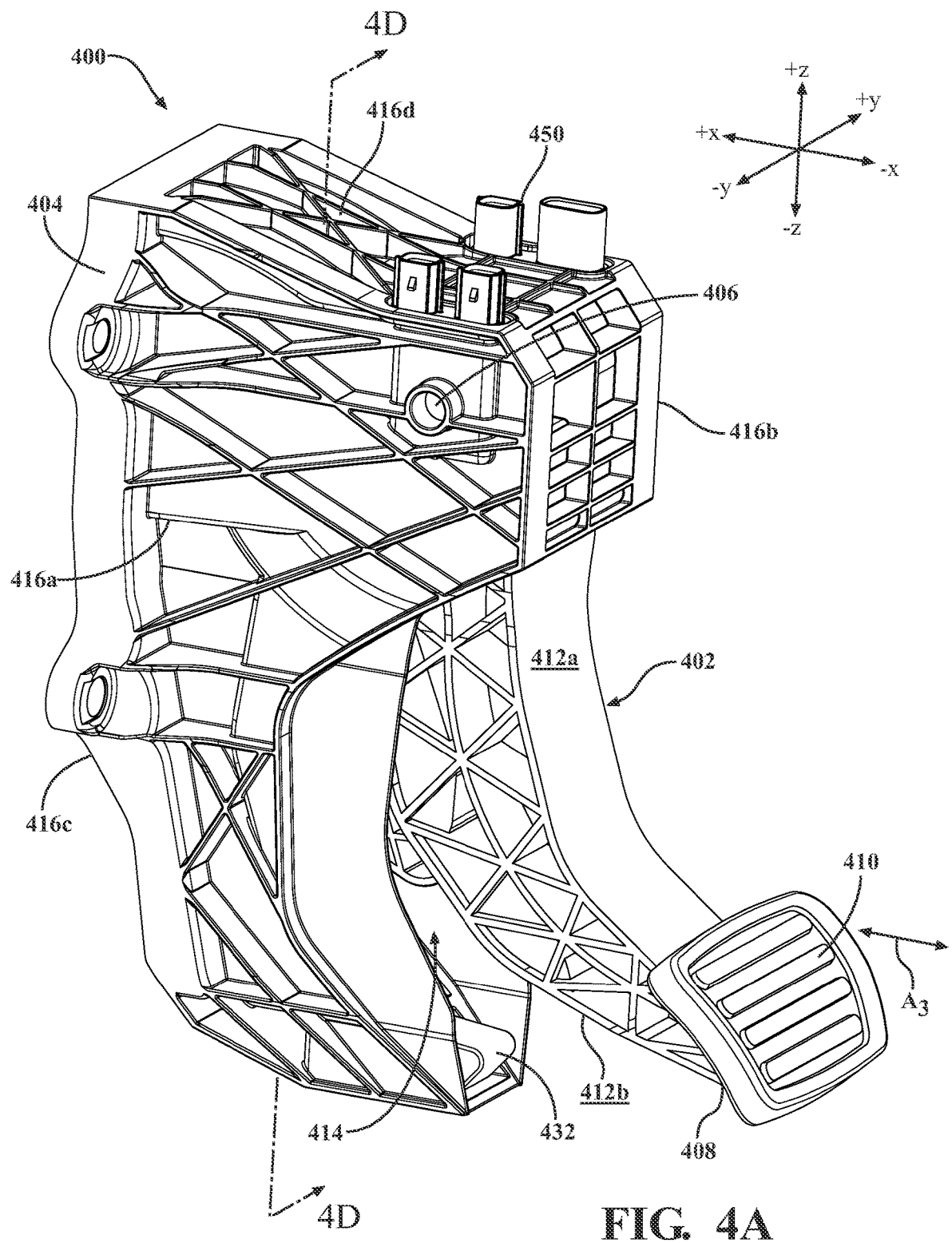
FIG. 4A schematically depicts a left side perspective view of a second example pedal assembly, according to one or more embodiments shown and described herein.
Figure 4B:
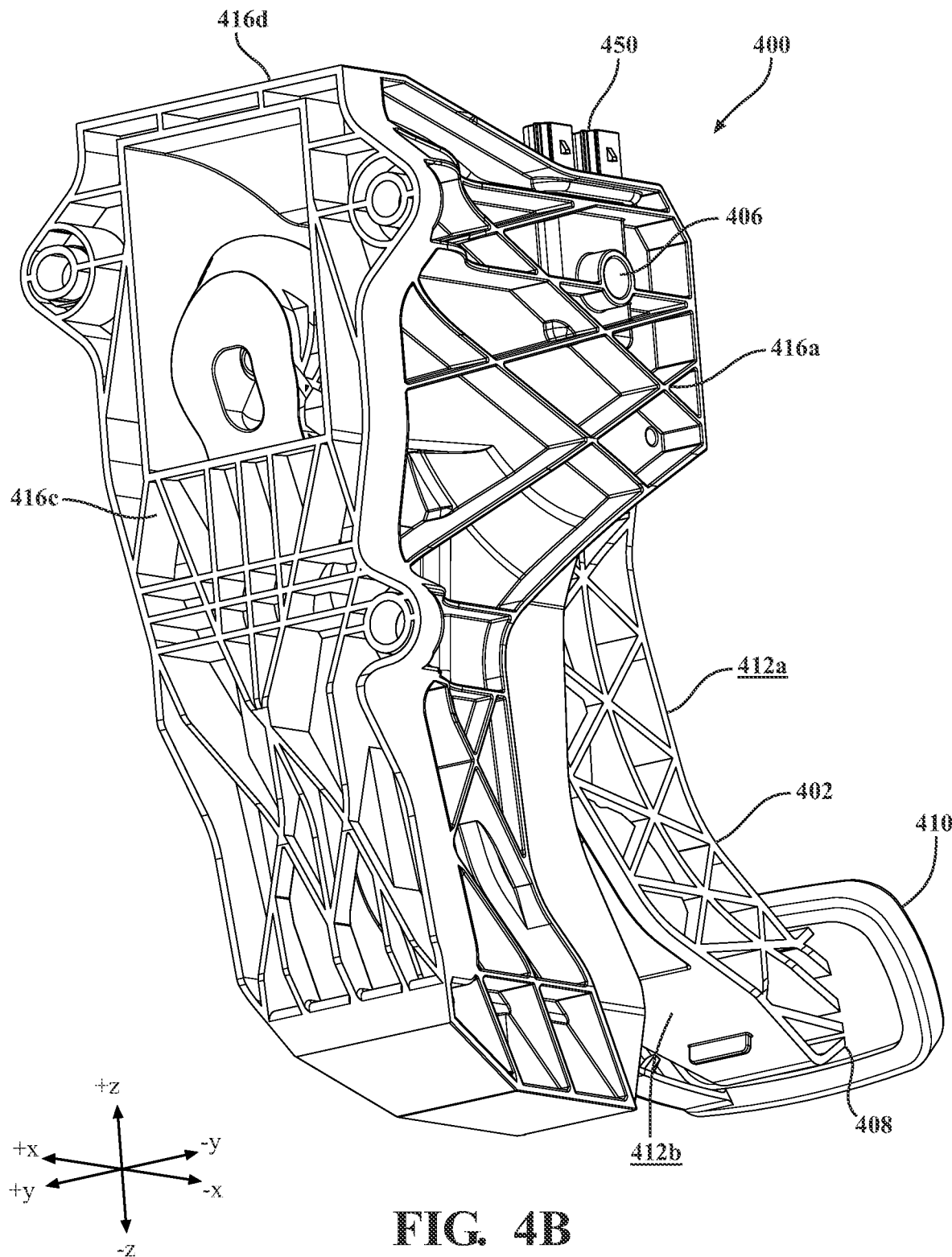
FIG. 4B schematically depicts a rear and left side perspective view of the pedal assembly of FIG. 4A, according to one or more embodiments shown and described herein.
Figure 4C:
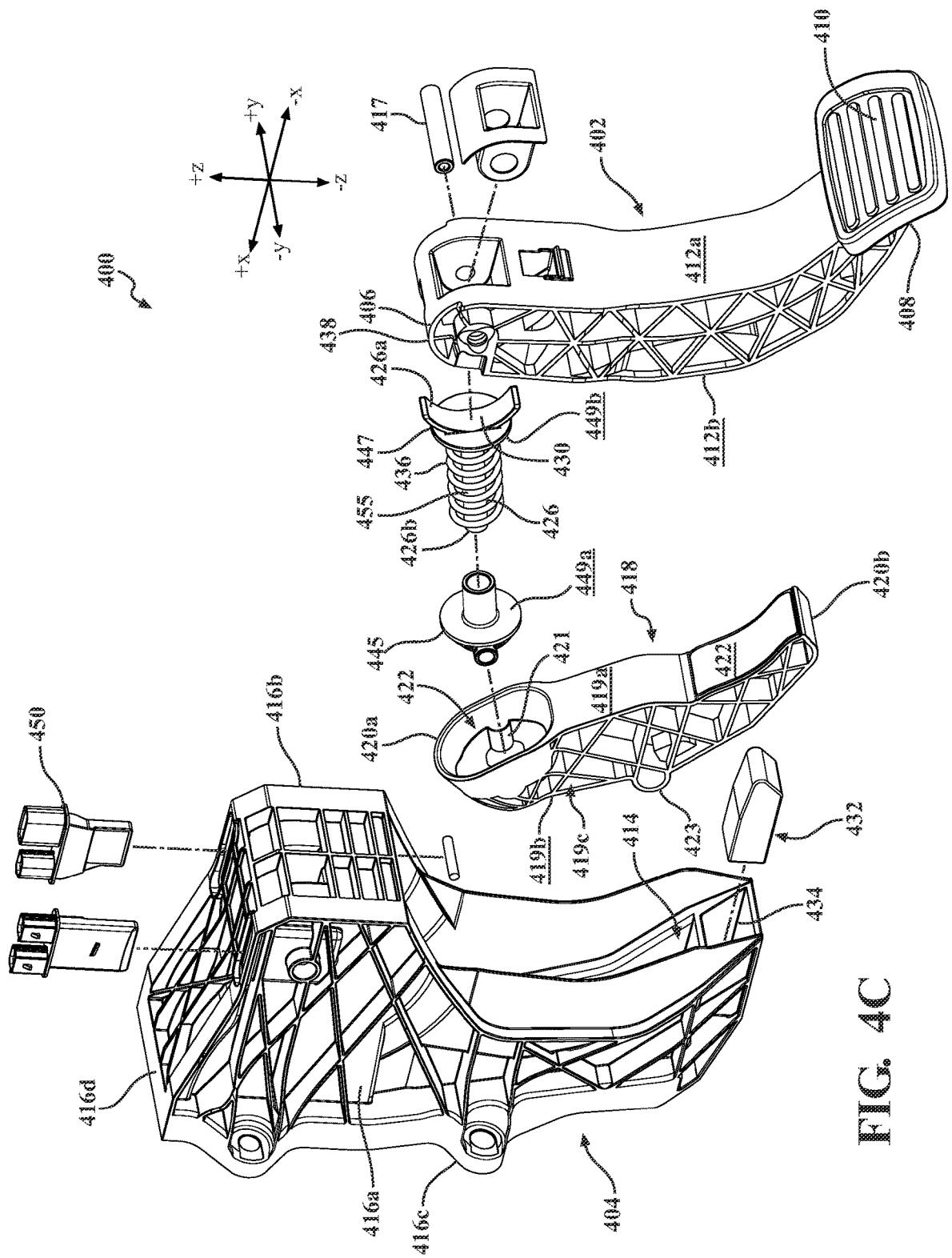
FIG. 4C schematically depicts an exploded perspective view of the pedal assembly of FIG. 4A, according to one or more embodiments shown and described herein.
Figure 4D:
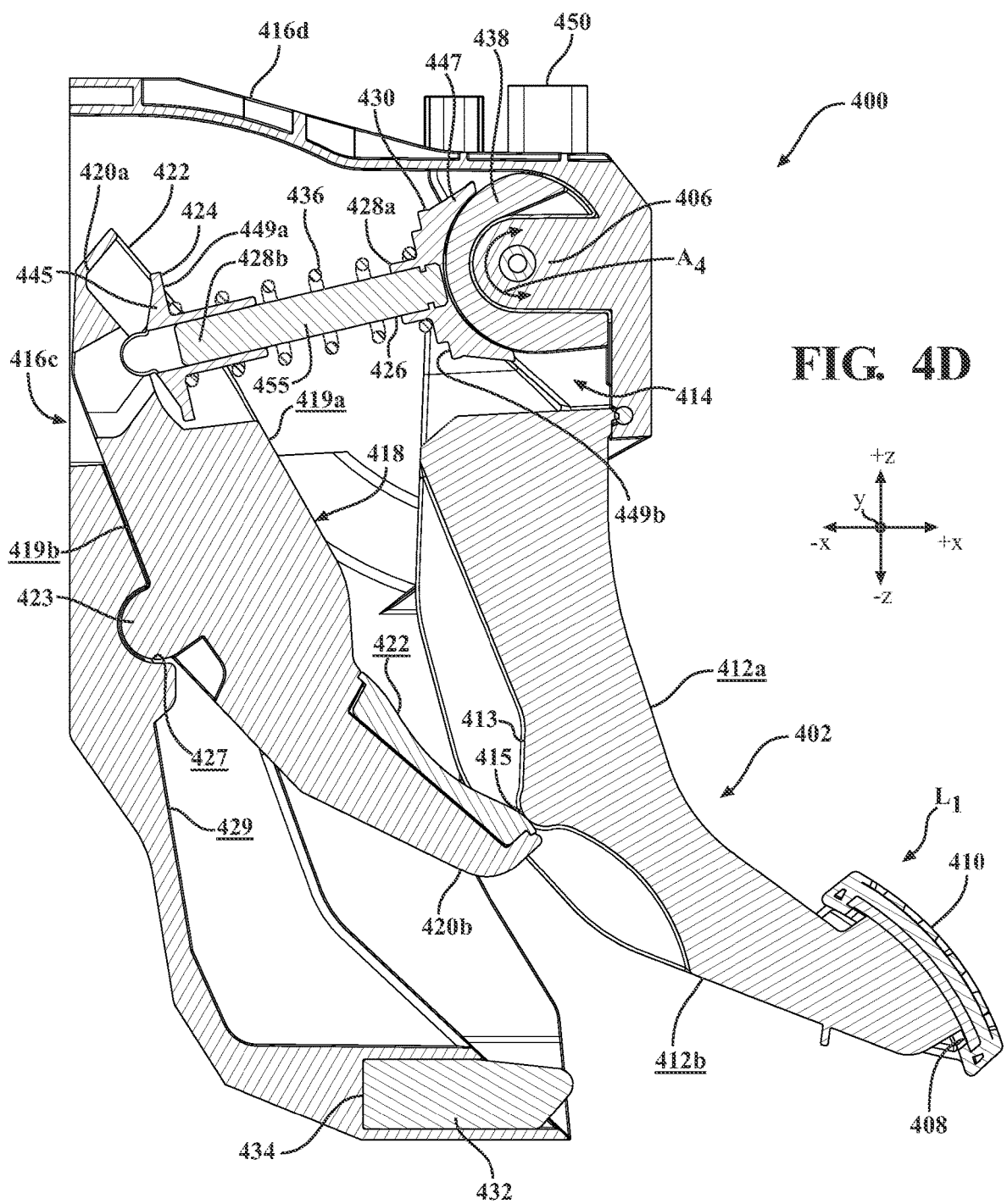
FIG. 4D schematically depicts a cross-sectional view of the pedal assembly of FIG. 4A taken from line 4-4 with a pedal arm in an undepressed state, according to one or more embodiments shown and described herein.

Operation of the pedal emulator assembly 400 will now be described in detail with reference to FIGS. 4D-4F. Initially, FIG. 4D depicts the pedal emulator assembly 400 in an uncompressed (e.g., initial or default) position, and/or subject to a first predetermined load L1. In these embodiments, the lever arm 418 is also positioned in an initial position, such that the interior surface 412b of the pedal arm applies only a minimum force on the lever arm 418. As such, the first predetermined load L1 may be enough force to compress the pedal arm 402 a predetermined distance such that the pedal arm 402 slidably contacts or slidably engages the engagement surface 422 of the lever arm to achieve the desirable curve illustrated by bracket 102 in FIG. 1. Accordingly, it should be further appreciated that, in when the first predetermined load L1 is applied to the pedal arm, as depicted in FIG. 4D, the at least one spring 436 and the elastomer member 432 positioned within the recess 434 of the housing 404 is similarly uncompressed.

When a second predetermined load L2 that is greater than the first predetermined load L1 is applied to the pedal pad 410, in the direction indicated by arrow A3, the pedal arm 402 moves or pivots about the pivot end 406, indicated by arrow A4, based on the amount of force applied to the pedal pad 410. In these embodiments, the coupling of the pivot end 406 to the pair of sidewalls 416a, 416b allows the pedal arm 402 to move in an arcuate trajectory. Simultaneously, the motion of the pedal arm 402 is transferred via the spring carrier 426 to compress the at least one spring 436. In these embodiments, the second predetermined load L2 applied to the pedal (e.g., in the direction indicated by arrow A3) may cause the pedal pad 410 to move to a partially compressed position that corresponds to the second bracket 104 depicted in FIG. 1.

Figure 4E:
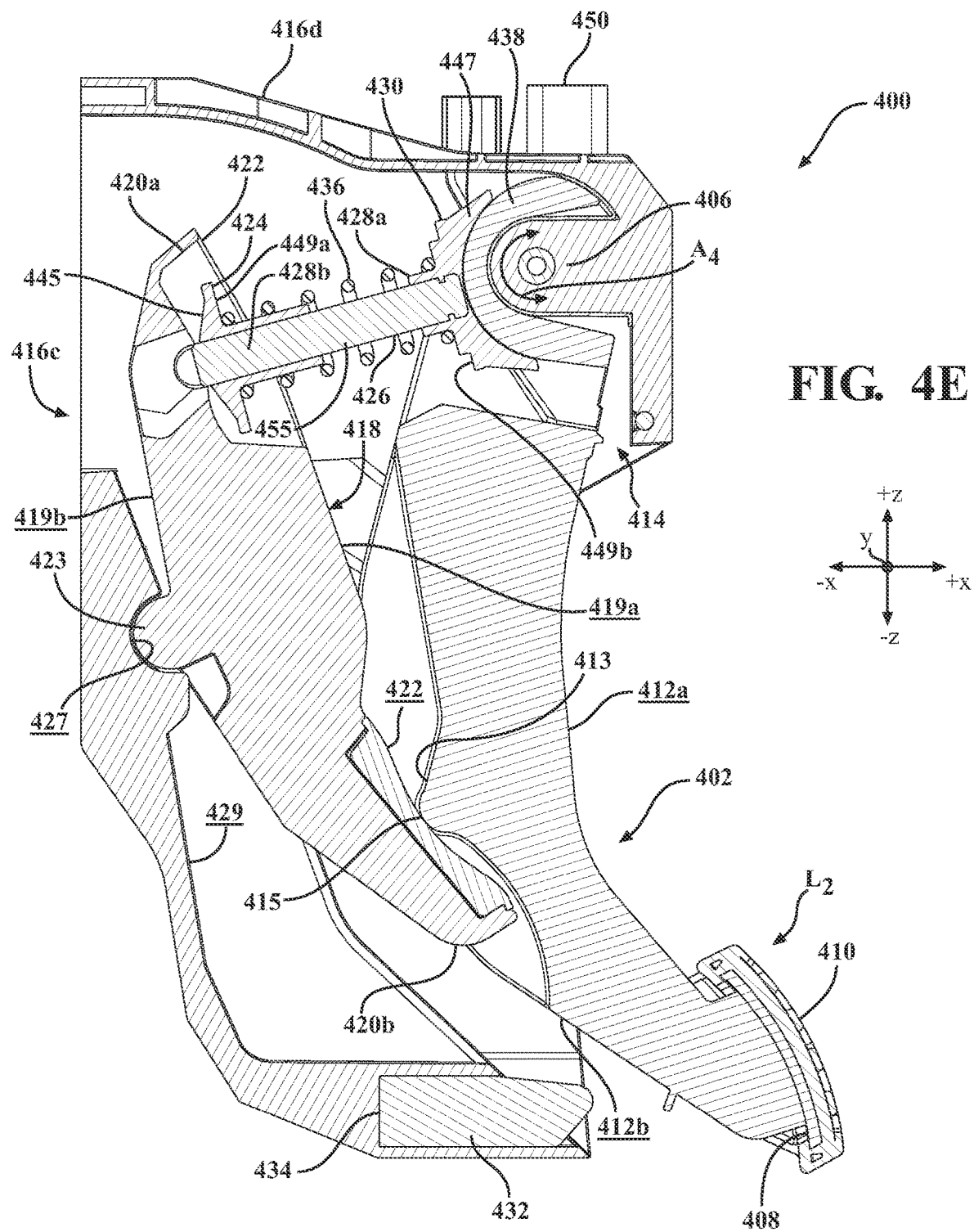
FIG. 4E schematically depicts a cross-sectional view of the hanging pedal assembly of FIG. 4A taken from line 4-4 with a pedal arm in an partially depressed state, according to one or more embodiments shown and described herein.

Referring still to FIG. 4E, and as described herein, the outer surface 419a of the lever arm 418 may be configured to interact with the interior surface 412b of the pedal arm 402. Because each of the outer surface 419a of the lever arm 418 and the interior surface 412b of the pedal arm 4-2 are non-linear surfaces, different portions of the outer surface 419a of the lever arm 418 contact the interior surface 412b of the pedal arm 402 as the pedal arm 402 is depressed, with each of the portion of the interior surface 412b of the pedal arm providing a variable amount of frictional force on the engagement surface 422 of the lever arm 418.

In the embodiments described herein, it should be appreciated that the variability in the frictional force acting on the outer surface 419a of the lever arm 418 may be used to produce a desired force curve. For example, as the pedal arm 402 is depressed, the resistance the pedal arm 402 offers the driver is not consistent and/or linear; instead, the resistance of the pedal arm 402 varies to emulate the feeling of a traditional vehicle pedal. In these embodiments, it may be possible to manipulate the surfaces of the outer surface 419a of the lever arm 418 and the engagement surface 422 in order to obtain the desired force curve depicted in FIGS. 1 and 2, as will be described herein.

For example, as the pedal arm 402 is depressed, the pivoting motion of the pedal arm 402 is translated to cause the lever arm 418 to pivot. For example, as the pedal arm 402 rotates, the interior surface 412b of the pedal arm 402 slides against the engagement surface 422 of the pedal arm 402, such that the lever arm 418 pivots. Accordingly, it should be appreciated that the amount of contact between the outer surface 419a of the lever arm 418 and the interior surface 412b of the pedal arm may determine the frictional force that exists between the two components, and in turn, the resistance offered by the pedal arm 402.

In order to achieve the desired force curve depicted in FIGS. 1 and 2, the interior surface 412b of the pedal arm and the outer surface 419a of the lever arm 418 may be configured such that the two surfaces increasingly contact one another as the pedal arm 402 is depressed. For example, a portion of the outer surface 419a of the lever arm 418 and/or the interior surface 412b of the pedal arm may be textured, include a plurality of bumps, or otherwise include non-linear portions (e.g., curved) such that contact between the interior surface 412b of the pedal arm 402 and the outer surface 419a of the lever arm 418 increases as the pedal arm 402 is depressed. Accordingly, the increase in friction between the interior surface 412b of the pedal arm 402 and the outer surface 419a of the lever arm 418 as the pedal arm 402 is depressed may similarly increase the resistance offered by the pedal arm 402, thereby generating the desired force curves depicted in FIGS. 1 and 2.

Referring still to FIG. 4E, when the second predetermined load L2 is applied to the pedal arm 402, the second end 420b of the lever arm 418 (e.g., the end connected to the spring mechanism) may compress the spring to further add to the resistance offered by the pedal arm 402. As should be appreciated, as the pedal arm 402 is depressed, and the lever arm 418 continues to pivot, the spring may become increasingly compressed, thereby increasing the resistance offered by the pedal arm 402. In these embodiments, variations in the type of spring and the compression characteristics of said spring may further impact or influence the resistance offered by the pedal arm 402 as the pedal arm 402 is depressed.

Figure 4F:
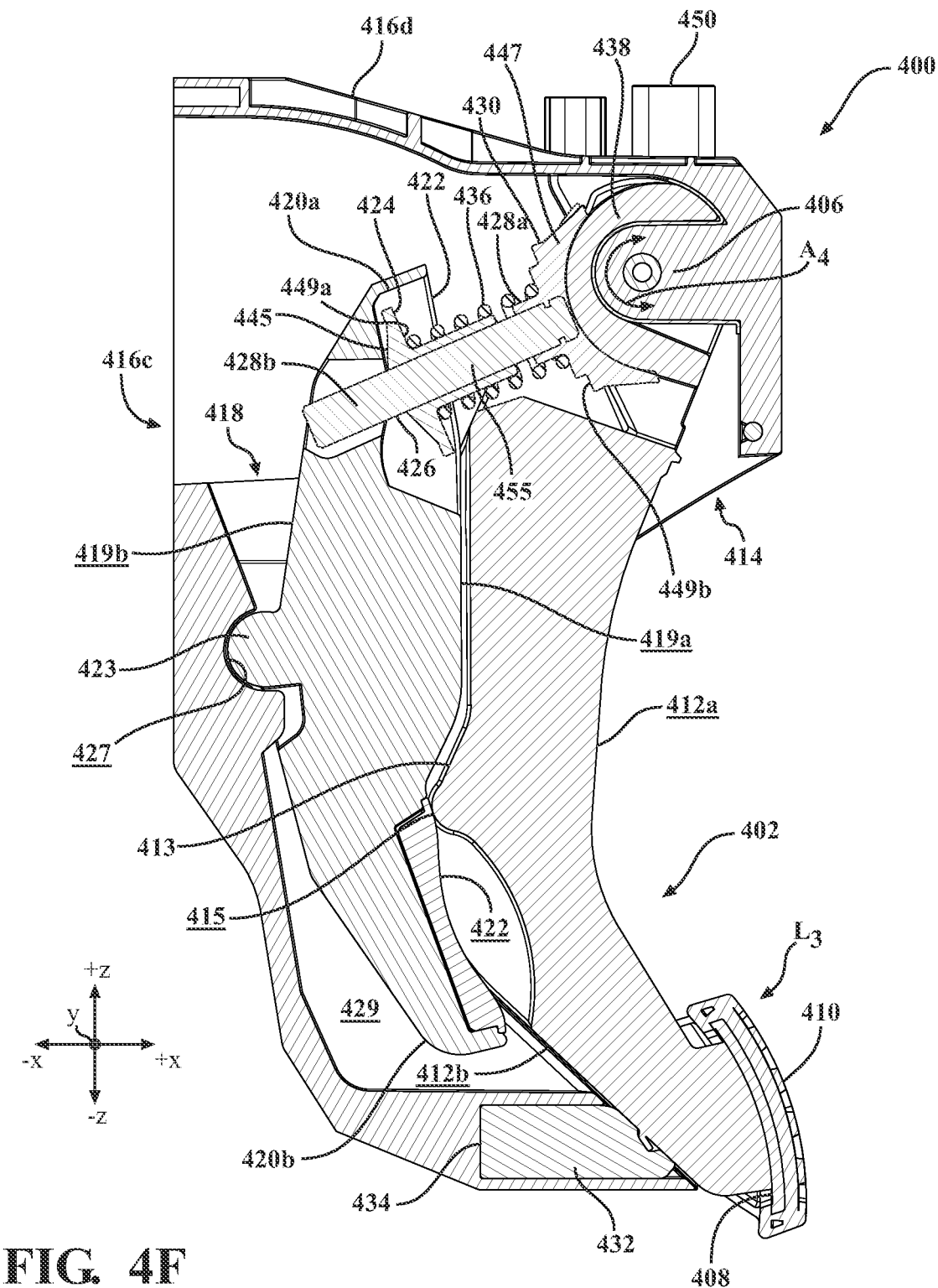
FIG. 4F schematically depicts a cross-sectional view of the hanging pedal assembly of FIG. 4A taken from line 4-4 with a pedal arm in a fully depressed state, according to one or more embodiments shown and described herein.

Turning now to FIG. 4F, the pedal emulator assembly 400 is depicted in a fully compressed position, in which a third predetermined load L3 is applied to the pedal arm 402. In these embodiments, as the third predetermined load L3 is applied to the pedal pad 410, the interior surface 412b of the pedal arm 402 makes contact with and compresses the elastomer member 432. In these embodiments, as the pedal arm 402 contacts the elastomer member 432, the elastomer member 432 may resist compression, thereby offering additional resistance to the pedal arm 402. In particular, the additional resistance offered by the elastomer member 432 may correspond to the third section depicted by bracket 106 of the desired force curve shown in FIG. 1.

Referring again to FIGS. 4A-4F, in the embodiments described herein, the pedal emulator assembly 400 may further include a sensor assembly 450. In these embodiments, the sensor assembly 450 may include a printed circuit board including at least one Hall Effect chip and a magnet positioned anywhere within the housing 404 that moves to detect movement of the pedal arm 402 and/or the lever arm 418, via Hall Effect sensing techniques. In other embodiments, inductive sensing techniques may be applied to sense a coupler that moves to detect movement of the pedal arm 302 and/or the at least one spring 326. Accordingly, the sensor assembly 450 may be configured to track the position of the pedal arm 402 and the forces applied to the foot of the driver.

In view of the foregoing, it should be appreciated that, the spring, the non-linear contour of the outer surface 419a and the engagement surface 422 and the elastomer member 432 provide the pedal effort/resistance felt by the driver during the depression of the pedal pad 310. That is, the various contours of the outer surface 419a and the engagement surface 422, the at least one spring, and the elastomer member 432 provide the pedal effect/resistance felt at the pedal pad 410 by the driver and apply different forces at the corresponding travel positions with the elastomer member 432 applying a significant force to the pedal arm 402. The combination of the contours of the outer surface 419a and the engagement surface 422, the at least one spring, and the elastomer member 432 result in a composite of forces to provide a desired force curve.

Turning now to FIGS. 5A-5F, a third example embodiment of a pedal emulator assembly 500 that utilizes a slot to generate friction resistance is schematically depicted. The pedal emulator assembly 500 includes a pedal arm 502 and a housing 504. The pedal arm 502 includes a pivot end 506 and an opposite pad end 508 in which a pedal pad 510 is attached thereto.

The pedal arm 502 includes an exterior surface 512a and an opposite interior surface 512b. The cavity 513 of the pedal arm 502 is defined by a pair of opposing walls 515a, 515b, an exterior wall 515c, and the interior surface 512b of the pedal arm 502. The interior surface 512b is positioned to face a cavity 514 of the housing and portions of the pair of opposing walls 515a, 515b are received within the cavity 514 of the housing 504. The cavity 514 of the housing 504 is defined by a pair of sidewalls 516a, 516b, a first end wall 516c, and a second end wall 516d. Further, the cavity includes an interior surface 519 formed by the pair of sidewalls 516*a*, 516*b*, the first end wall 516*c*, and the second end wall 516*d*.

In some embodiments, the housing 504 may be configured to be mounted to a floor of a vehicle. In other embodiments, the housing 504 may be configured to be mounted to any component of the vehicle within a passenger compartment such as an instrument panel, a firewall, and the like.

In the embodiments described herein, the housing 504 and pedal arm 502 may be a molded plastic. For example, the housing 504 and pedal arm 502 may be formed with various materials such as acrylonitrile butadiene styrene (ABS), polyethylene (PE), polypropylene (PP), polycarbonate (PC), nylon, polycarbonate/acrylonitrile butadiene styrene, polyurethane, polymethyl methacrylate, high density polyethylene, low density polyethylene, polystyrene, PEEK, POM (Acetal/Delrin), polyethylene terephthalate, thermoplastic elastomer, polyetherimide, theremoplastic vulcanizate, polysulfone, combinations thereof, and/or the like. Additionally, additives may be added such as UV absorbers, flame-retardants, colorants, glass fibers, plasticizers and/or the like.

In other embodiments, the housing 504 and pedal arm 502 may be formed from injection molding or other additive manufacturing techniques. For example, as provided herein, additive manufacturing techniques refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Referring still to FIGS. 5A-5F, the pedal emulator assembly 500 may further include a pair of slots 518 that extend through the pair of opposing walls 515*a*, 515*b*, respectively, between the pivot end 506 and the pad end 508 and below the interior surface 512*b* of the pedal arm 502 in the vertical direction (i.e., in the +/−Z direction). Each of the pair of slots 518 extend in the longitudinal direction (i.e., in the +/−X direction). In these embodiments, a link lever arm 520 that has a support end 522 and a coupled end 524 is positioned to within the cavity 513, 514 and to be movably coupled to the pair of slots 518. The coupled end 524 may be pivotally or movably coupled to a lower arm 526. The support end 522 includes a pair of ears 528 extending from a body 530. Each of the pair of ears 528 are spaced apart and/or dimensioned to be aligned with the pair of slots 518 in the lateral direction (i.e., in the +/−Y direction). Each ear of the pair of ears 528 include an aperture 532 extending there through. The apertures 532 receive an elongated member 533 with a circumferential outer surface 535 that has a diameter that is smaller than the apertures 532. The circumferential outer surface 535 may be a smooth contour and configured to slidably engage with the pair of slots 518 and with an upper lever arm 534, as discussed in greater detail herein. The elongated member 533 that has a pair of terminating ends 537 with a diameter that is larger than each of the pair of slots 518. In some embodiments, the elongated member 533 may be a through pin or other elongated type member to slidably couple the support end 522 of the link lever arm 520 to the pedal arm 502. The coupled end 524 may be pivotally coupled to the lower arm 526, such that the link lever arm 520 may pivot or otherwise move relative the lower arm 526 dependent on an amount of load applied to the pedal arm 502 as will be described in additional detail herein with reference to FIGS. 5D-5F.

As further depicted in FIGS. 5A-5F, the upper lever arm 534 is pivotally coupled between the pair of sidewalls 516*a*, 516*b*. The upper lever arm 534 includes a first end 536*a* and an opposite second end 536*b*. Further, the upper lever arm 534 includes an upper frame portion 538 and a lower frame portion 540 spaced apart and coupled by a plurality of honeycomb support members 544. The upper frame portion 538 and the lower frame portion 540 may connect or abut at an apex 542 that may be positioned at and/or between the pair of ears 528 of the support end 522 of the link lever arm 520 when a first predetermined load L1 is applied to the pedal pad 510. The second end 536*b* is pivotally connected to the pair of sidewalls 516*a*, 516*b*. In some embodiments, a through pin 543 may be used to pivotally couple or otherwise movable couple the second end 536*b* to the pair of sidewalls 516*a*, 516*b*. In other embodiments, a protrusion may extend from each of the pair of sidewalls 516*a*, 516*b* to be received by the second end 546*b*. The upper lever arm 534 further includes a spring receiving portion 546 positioned between the first end 536*a* and the second end 536*b* and extending within the lower frame portion 540.

Referring still to FIGS. 5A-5F, the upper frame portion 538 includes an engagement surface 549 and an upper surface 550. The engagement surface 549 may have a nonlinear profile, or counter, that is adapted to receive, abut, or otherwise slidably engages with the circumferential outer surface 535 of the elongated member 533 such that the circumferential outer surface 535 rides along the engagement surface 549 based on the amount of the load applied to the pedal pad 510, as will be described in additional detail herein.

The lower arm 526 includes a first end 546*a* that extends from and is pivotally coupled to the pivot end 506 of the pedal arm 502 and an opposite second end 546*b*. The lower arm 526 includes a spring retaining portion 547 positioned at or adjacent to the second end 546*b*. A spring carrier 570 that includes a compressible member, such as an at least one spring 548, extends between the spring retaining portion 547 of the lower arm 526 and the spring receiving portion 546 of the upper lever arm 534 to bias the upper lever arm 534 in a direction opposite of a pedal depression force (e.g., in the opposite direction depicted by the arrow A5 in FIGS. 5A and 5B). In these embodiments, the lower arm 526 may be fixedly coupled to the floor surface of the cavity 513, and/or to the interior surface 519, and the like.

Figure 5A:
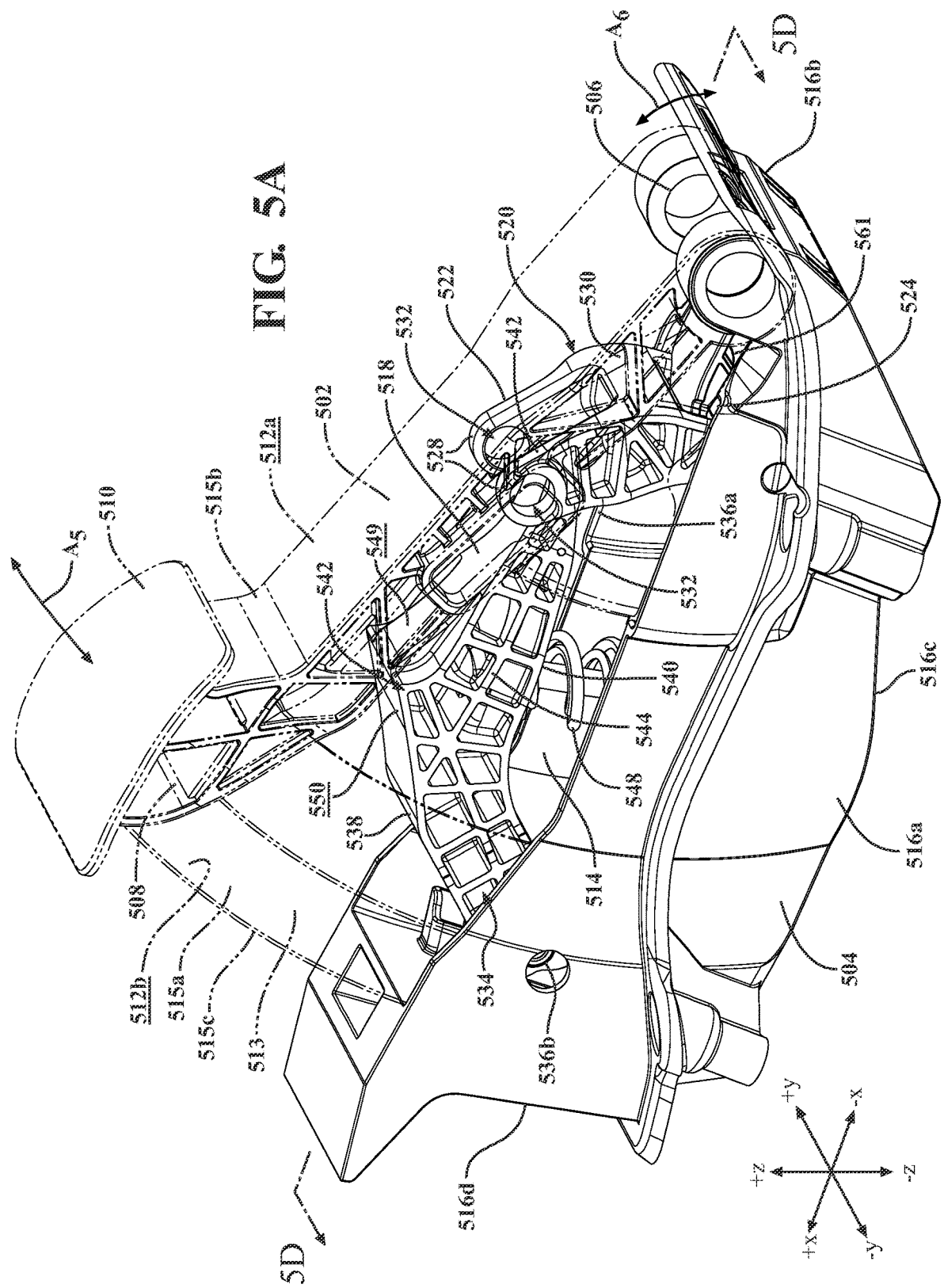
FIG. 5A schematically depicts a left side perspective view of a third example pedal assembly utilizing friction within a slot to generate resistance, according to one or more embodiments shown and described herein.
Figure 5C:
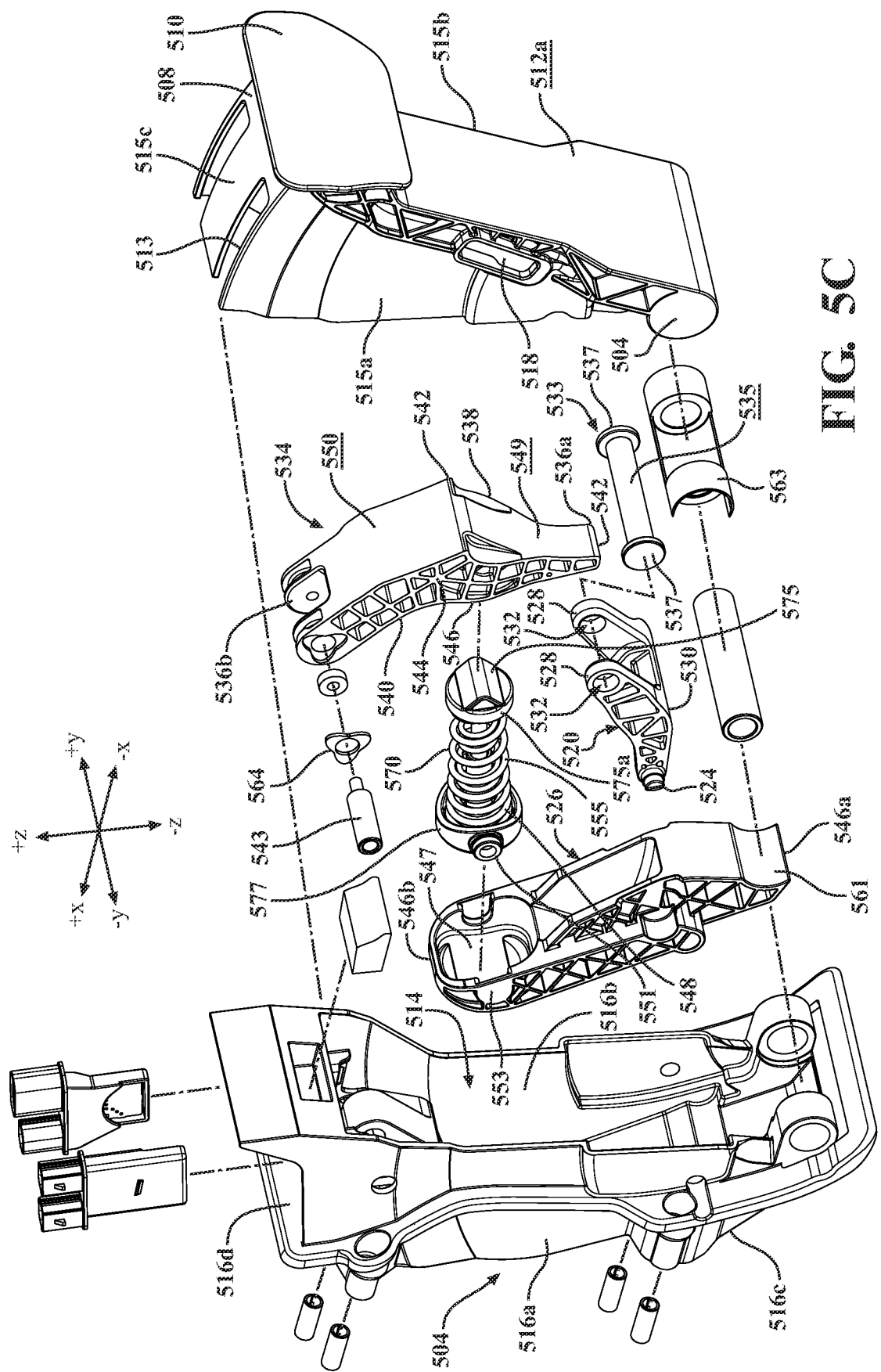
FIG. 5C schematically depicts an exploded perspective view of the pedal assembly of FIG. 5A, according to one or more embodiments shown and described herein.
Figure 5D:
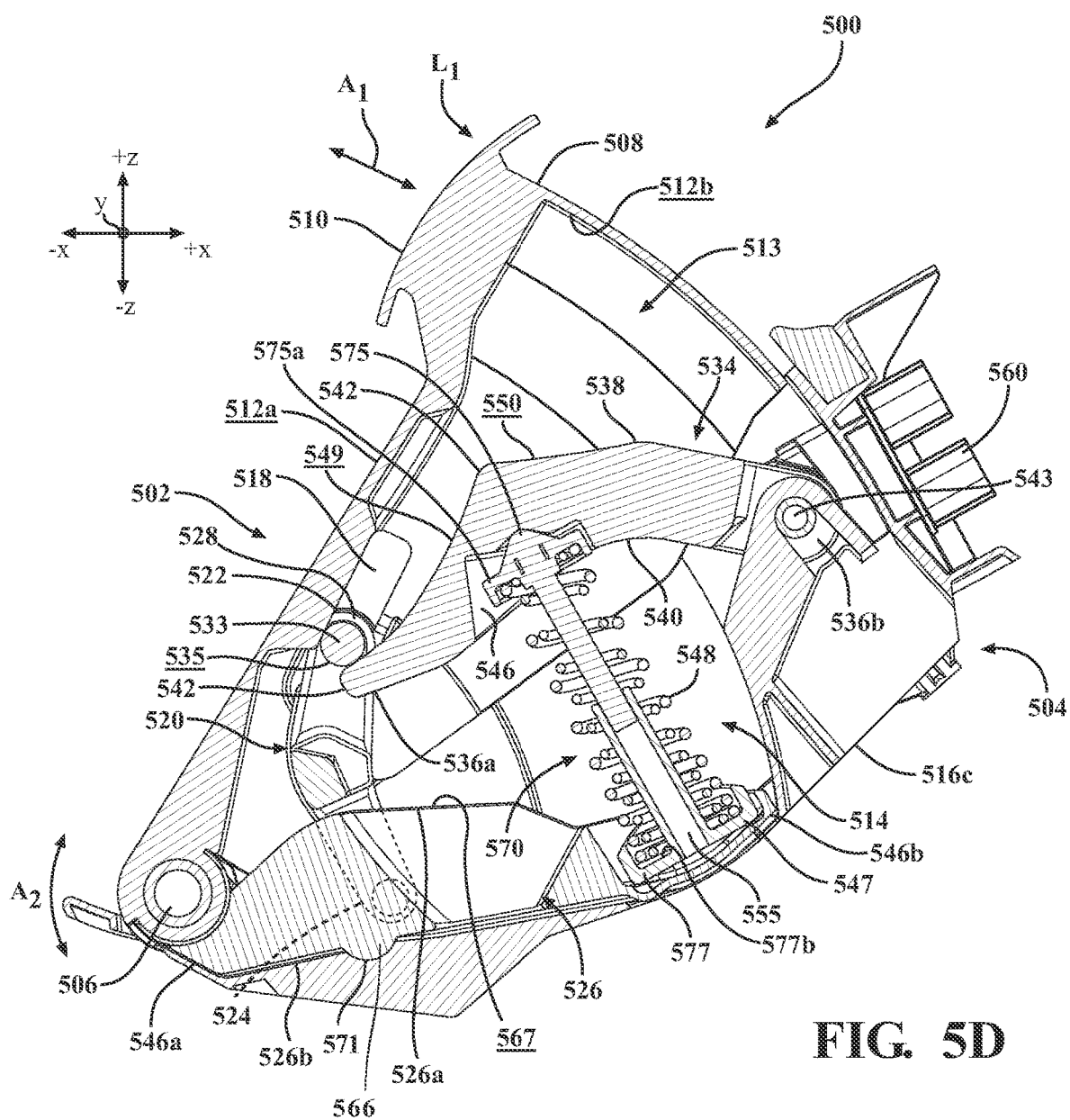
FIG. 5D schematically depicts a cross-sectional view of the pedal assembly of FIG. 5A taken from line 5-5 with a pedal arm in an undepressed state, according to one or more embodiments shown and described herein.

The lower arm 526 further includes an upper portion 526*a* and an opposite lower portion 526*b*. The lower portion 526*b* is coupled to the housing 504 via a lower arm protrusion 566 that extends from the lower portion 526*b* of the lower arm 526. In these embodiments, the lower arm protrusion 566 of the lower arm 526 is received in a recess 571 of the housing 504 formed in the second end wall 516*d*. The upper portion includes an engagement surface 567 that is configured to receive a portion of the link lever arm 520, such as the coupled end 524 of the link lever arm 520, based on an amount of travel of the pedal arm 502. For example, as best illustrated in FIG. 5F, the coupled end 524 of the link lever arm 520 is illustrated as pivoting about, or otherwise being in communication with the engagement surface 567 of the lower arm 526 when the pedal arm 502 is in the fully compressed position adding to the pedal effect felt by the driver.

The lower arm 526 may further include a concave portion 561 configured to receive a pivot portion 563 that is rotatably or movably coupled to the pivot end 506 of the pedal arm 502 such that the pedal arm pivots or rotates or otherwise moves the pivot portion 563 within the concave portion 561 of the lower arm 526.

As such portion of the spring carrier 570 may be received within the cavity 513 of the pedal arm 502 and a portion may be received within the cavity 514 of the housing 504. In some embodiments, the spring carrier 570 may be coupled to spring receiving portion 546 of the link lever arm 520 via a fastener such as a nut and bolt, screw, rivet, hook and loop, adhesive, weld, and/or the like. In other embodiments, the spring carrier 570 may be coupled to the spring receiving portion 546 of the link lever arm 520 via a press fit configuration, a tension fit, and the like. Further, in some embodiments, the spring carrier 570 may be coupled to the spring retaining portion 547 of the lower arm 526 via a fastener such as a nut and bolt, screw, rivet, hook and loop, adhesive, weld, and/or the like. In other embodiments, the spring carrier 570 may be coupled to spring retaining portion 547 of the lower arm 526 via a press fit configuration, a tension fit, and the like.

The spring carrier 570 further includes a female spring guide 575 and a male spring guide 577 that includes an elongated member 555 configured to extend and engage with the female spring guide 575 and compress into a void or cavity in the male spring guide 577 based on a tension or force applied to the spring carrier 570. It should be understood that this is non-limiting and the elongated member 555 may be configured to extend and engage with the male spring guide 577 and compress into a void or cavity in the female spring guide 575 based on a tension or force applied to the spring carrier 570.

The female spring guide 575 and the male spring guide 577 are coupled to one another within an inner diameter of the at least one spring 548 (e.g., via the elongated member 555) such that the at least one spring 548 extends between and is in contact with a spring receiving surface 575a of the female spring guide 575 and a spring receiving surface 577b of the male spring guide 577. Such an arrangement retains the at least one spring 548 while permitting for the at least one spring 548 to expand and compress as a function of the amount of travel of the pedal arm 502, as discussed in greater detail herein.

A protrusion 551 extends from the male spring guide 577 to act as a coupling point to pivotally couple the male spring guide 577 to corresponding slots 553 in the spring retaining portion 547 of the lower arm 526 in a press fit or tension fit connection. In other embodiments, the protrusion 551 of the male spring guide 577 may be coupled to the corresponding slots 553 via a fastener such as a nut and bolt, screw, rivet, hook and loop, adhesive, weld, and/or the like.

The tension caused by the at least one spring 548 arranged between the male spring guide 577 and the female spring guide 575 that are configured to move to compress the at least one spring 548 may cause the female spring guide 575 to remain in contact with or seated within the spring receiving portion 546 of the upper lever arm 534 and cause the male spring guide 577 to remain in contact with, or seated within, the spring retaining portion 547 formed in the lower arm 526. As such, regardless of the amount of travel of the pedal arm 502, there is a tension caused by the male spring guide 577 and the female spring guide 575 maintaining a position of contact of the spring carrier 570 extending between the upper lever arm 534 and the lower arm 526.

As further depicted in FIGS. 5A-5F, it should be appreciated that the at least one spring 548 may include a plurality of spring coils. For example, in some embodiments, multiple spring coils may be utilized to ensure that the pedal emulator assembly 500 remains functional in the event at least one of the spring coils fails (e.g., breaks, disengages the spring retaining portion and/or spring retention portion, and the like) In these embodiments, the at least one spring 548 may be formed with a steel material, such as stainless steel, wire, carbon steel, alloy steel, elgiloy, Monel®, copper, nickel, and/or the like.

Operation of the pedal emulator assembly 500 will now be discussed in detail with reference to FIGS. 5D-5F. For example, as depicted in FIG. 5D, the pedal emulator assembly 500 is an initial, or undepressed position, and/or subject to a first predetermined load L1. In the undepressed position, the link lever arm 520, which is guided by the pair of slots 518 formed in the housing 504 and are coupled to the pedal arm 502, as discussed in greater detail herein. In these embodiments, the at least one spring 548 may be in a mostly unbiased (e.g., fully extended) such that the at least one spring 548 is only applying a minimum resistance to maintain the positioning of the pedal arm 502. As such, the first predetermined load L1 may be enough force to compress the at least one spring 548 a predetermined distance and the elongated member 533 may slidably contact or slidably engage with a portion of the non-linear profile of the engagement surface 549 of the upper frame portion 538 of the upper lever arm 534 to achieve the desirable curve illustrated by bracket 102 in FIG. 1.

Figure 5E:
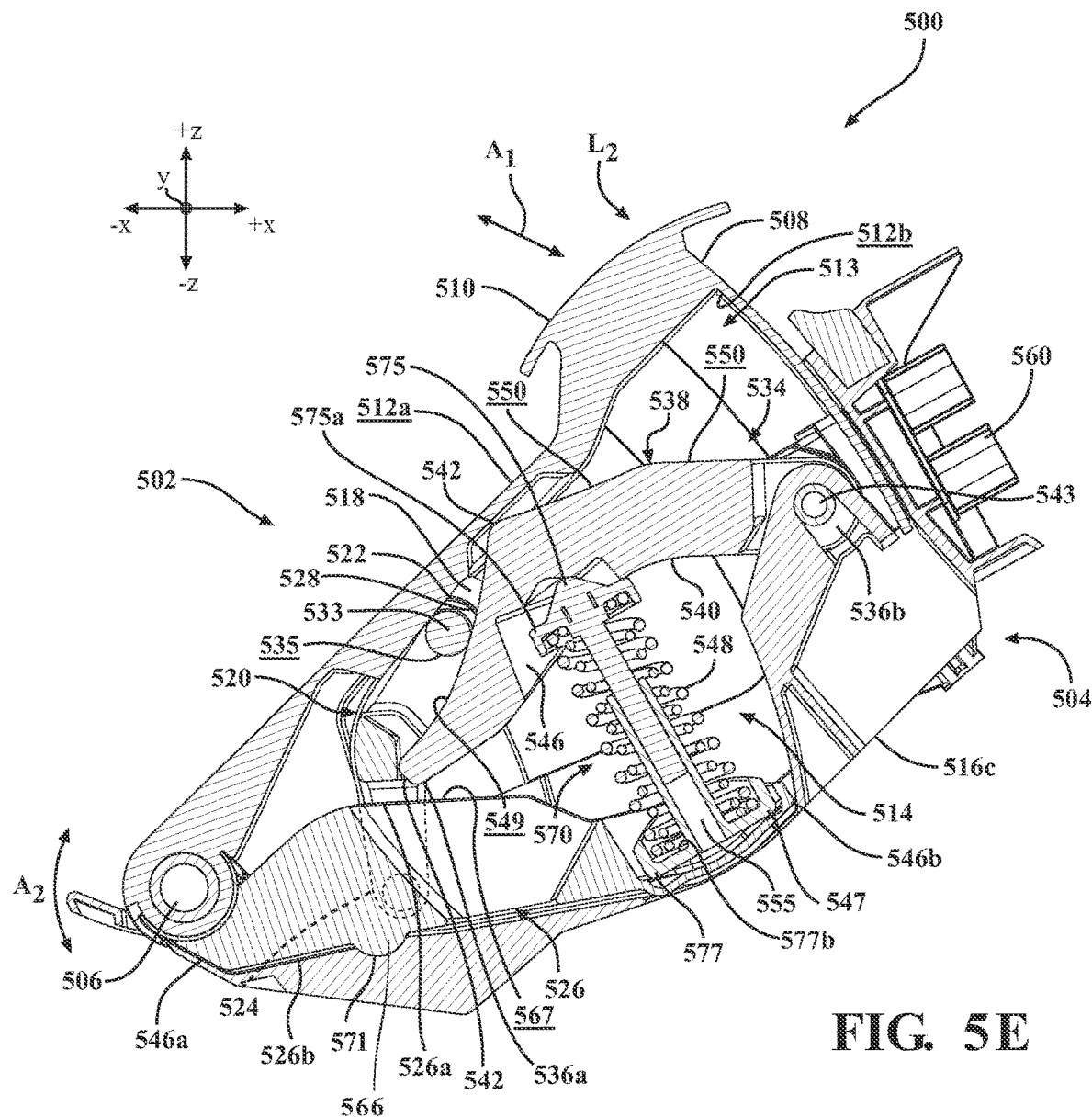
FIG. 5E schematically depicts a cross-sectional view of the pedal assembly of FIG. 5A taken from line 5-5 with a pedal arm in an partially depressed state, according to one or more embodiments shown and described herein.
Figure 5F:
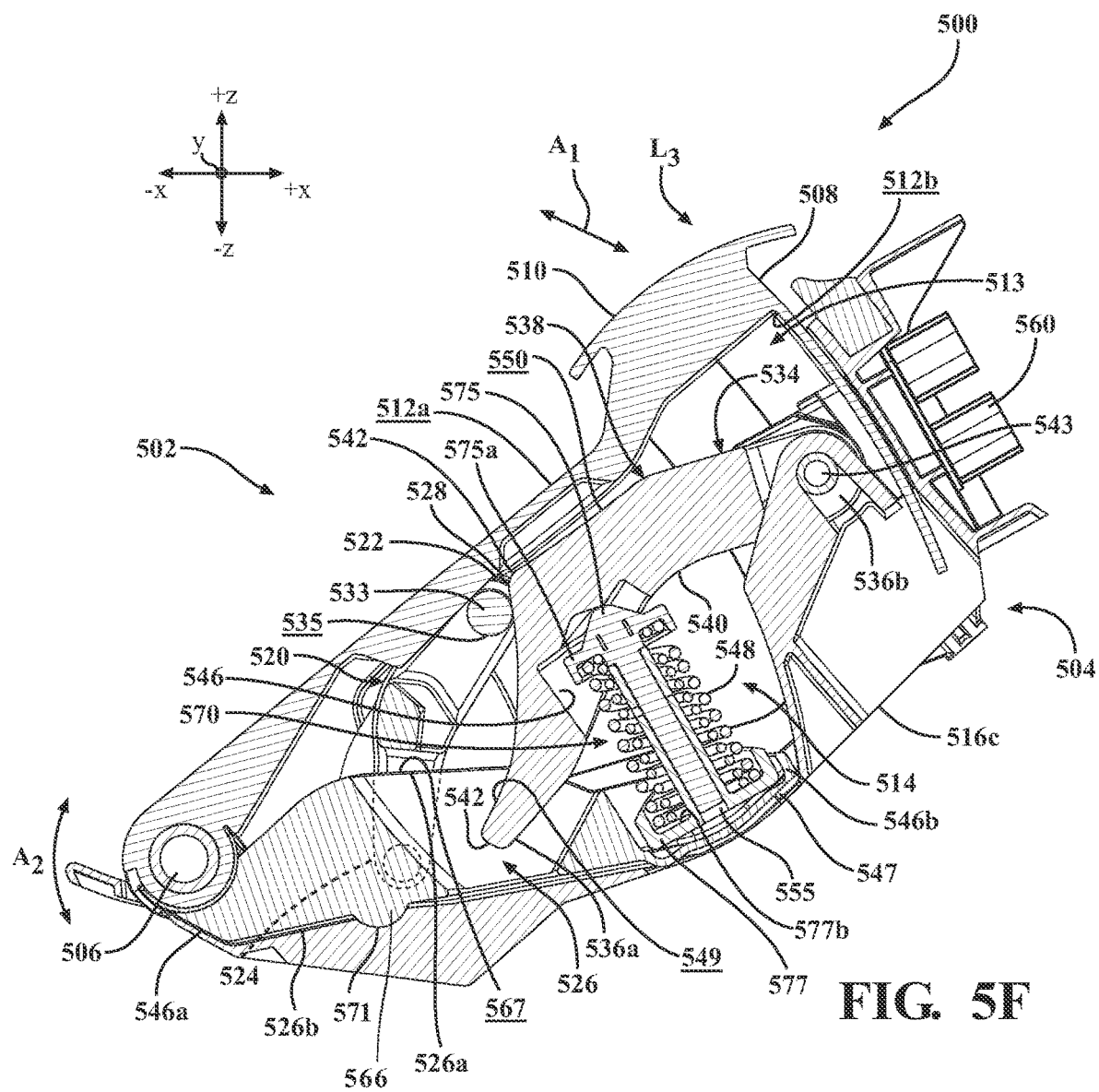
FIG. 5F schematically depicts a cross-sectional view of the hanging pedal assembly of FIG. 5A taken from line 5-5 with a pedal arm in a fully depressed state, according to one or more embodiments shown and described herein.

Referring now to FIG. 5E, when a second predetermined load L2 is applied to the pedal pad 510, in the direction indicated by arrow A5, the pedal arm 502 moves or pivots about the pivot end 506, in the direction indicated by arrow A6, to allow the pad end 508 to move into and out of the housing 504 based on the amount of force supplied to the pad end 508 and the current position of the pedal arm 502. For example, as depicted in FIG. 5E, the pad end 508 may move partially into the housing 504, such that the at least one spring 548 is partially compressed and generates a return force or force feedback on the pedal pad 510 that corresponds to the amount of force applied to the pedal pad 510 by the driver.

Simultaneously, the depression of the pedal arm 502 about the pivot end 506 may cause the slot 518 formed in the pedal arm 502 to contact the through pin that extends through the support end 522 of the link lever arm 520, in addition to the compression of the at least one spring 548. In these embodiments, the rotation of the pedal arm 502 about the pivot end 506 (e.g., in the direction indicated by arrow A2) and the contact between the slot 518 and the elongated member 533 may force the elongated member 533 to move in an upward direction along the engagement surface 549 of the upper frame portion 538 of the upper lever arm 534. As the elongated member 533 rides along the engagement surface 549 of the upper frame portion 538 of the upper lever arm 534, the link lever arm 520 may exert a downward force on the upper lever arm 534, which may in turn cause the upper lever arm 534 to rotate about its second end 536b and compress the at least one spring 548.

In these embodiments, the non-linear profile of the engagement surface 549 of the upper frame portion 538 of the upper lever arm 534 may impact or affect the resistance of the pedal arm 502 experienced by the driver. For example, the contour of the engagement surface 549 of the upper frame portion 538 may impact the force that must be exerted on the pedal pad 510 by the driver in order to advance the through pin upwardly through the slot 518, and in turn, compress the at least one spring 548.

More particularly, the non-linear contour of the engagement surface 549 of the upper frame portion 538 of the upper lever arm 534 may generate a variable mechanical advantage between the link lever arm 520 and the upper lever arm 534, which may allow for the pedal emulator assembly 500 to generate a desired force curve, as depicted in FIGS. 1 and 2. For example, as depicted most clearly in FIGS. 5D-5F, a first portion of the engagement surface 549 of the upper frame portion 538 (e.g., the portion of the engagement surface 549 that the elongated member 533 contacts in the undepressed position depicted in FIG. 5D) may include a relatively shallow, or gentle slope. Because the slope of the first portion of the engagement surface 549 of the upper frame portion 538 of the upper lever arm 534 is shallow, a second predetermined load L2, which may be a relatively low amount of force, may be required to depress the pedal pad 510 from the undepressed position (FIG. 5D) to a partially depressed position (FIG. 5E), which is depicted in bracket 104 of FIG. 1.

As further depicted in FIGS. 5D-5F, a second portion of the engagement surface 549 of the upper frame portion 538 of the upper lever arm 534 may have a slope that increases in steepness across the length of the second portion of the engagement surface 549 of the upper frame portion 538. As the slope of the engagement surface 549 of the upper frame portion 538 increases, it may become increasingly difficult to depress the pedal pad 510, such that a third predetermined load L3 that is greater than the second predetermined load L2 is required to move the elongated member 533 across the second portion of the engagement surface 549 of the upper frame portion 538 having the steeper slope. Because the force required to move the elongated member 533 through the slot 518 increases, the force exerted by the link lever arm 520 on the upper lever arm 534 is similarly increased, which may result in increased compression of the at least one spring 548, as is depicted by bracket 106 of FIG. 1.

In the embodiments described herein, it should be further appreciated that the elongated member 533 may not contact each portion of the engagement surface 549 of the upper frame portion 538 of the upper lever arm 534, as the movement of the elongated member 533 along the engagement surface 549 of the upper frame portion 538 is restricted by the slot 518. For example, the bottom surface and upper surface of the slot 518 may define the distance that the elongated member 533 may travel, and in turn, the portions of the engagement surface 549 of the upper frame portion 538 that the elongated member 533 may contact. Accordingly, it should be understood that the size of the slot may be configured to ensure that the elongated member 533 only contacts an intended portion of the engagement surface 549 of the upper frame portion 538. Furthermore, in these embodiments, the slot 518 ensures that the elongated member 533 rides along the engagement surface 549 of the upper frame portion 538 accurately. Accordingly, the guidance of the slot 518 helps ensure that the desired force curve of the pedal emulator assembly 500 is not disrupted.

Referring now to FIG. 5F, the forces required to depress the pedal arm 502 may be greatest when the elongated member 533 contacts the portion of the engagement surface 549 of the upper frame portion 538 of the upper lever arm 534 that has the greatest slope, which may correspond to a position when the pedal arm 502 is fully depressed. For example, when the pedal arm 502 is fully depressed, the at least one spring 548 may be fully compressed, such that the pedal arm 502 (and thus, the foot of the driver) may experience maximum resistance.

Referring now to FIGS. 5A-5F, the pedal emulator assembly 500 may further include a sensor assembly 560 configured to monitor the rotational movement of the second end 536b of the upper lever arm 534 to determine the exact force and position of the pedal pad 510 as the elongated member 533 of the primary lever arm 520 traverses in the slot 518. In these embodiments, the sensor assembly 560 may further include a coupler 564 integrated into second end 536b of the upper lever arm 534, such that the coupler 564 may rotate in tandem with the second end 536b of the upper lever arm 534 and convert mechanical movement (e.g., rotation) of the upper lever arm 534 into a measurable signal.

In particular, rotation of the coupler 564 affects the orientation and position of the coupler 564 relative to a plurality of transmitting and receiving coils. For example, as the coupler 564 moves (e.g., rotates), it induces changes in a magnetic field emitted by the transmitting coil. The receiving coils detect these changes, and variations in the received magnetic field can then be converted into electrical signals, which are processed, by an onboard controller or microprocessor. Accordingly, the electrical signals indicative of the variations in the received magnetic field may be directly correlated to the rotational position of the upper lever arm 534, and in turn, the pedal pad 510.

As should be appreciated in view of the foregoing, the various contours of the engagement surface 549 and the at least one spring 548 provide the pedal effect/resistance felt at the pedal pad 510 by the driver. That is, the force applied by the at least one spring 548 and the contours of the engagement surface 549 of the upper frame portion 538 of the upper lever arm 534 apply different forces at the corresponding travel positions with the contours of the engagement surface 549 of the upper frame portion 538 of the upper lever arm 534 near an end of the slot 518 (full travel of the pedal arm 502) applying a significant force to the pedal arm 502. The combination of the at least one spring 548 and the contours of the engagement surface 549 of the upper frame portion 538 of the upper lever arm 534 result in a composite of forces to provide a desired force curve.

Turning now to FIGS. 6A-6D, a fourth example embodiment of a pedal emulator assembly 600 that utilizes a pivoting friction lever to generate resistance is schematically depicted. In these embodiments, the pedal emulator assembly 600 may be a floor mounted organ-type brake pedal emulator assembly. This is without limitation, and the pedal emulator assembly 600 may be a hanging pedal assembly or any other type of pedal assembly. The pedal emulator assembly 600 includes a pedal arm 602 and a housing 604. The pedal arm 602 includes a pivot end 606 and an opposite pad end 608 in which a pedal pad 610 is attached thereto. The pedal arm 602 includes an exterior surface 612a and an opposite interior surface 612b. A link 614 is coupled to the interior surface 612b and to a spring carrier assembly 616 positioned within a cavity 618 of the housing 604.

The spring carrier assembly 616 includes a lever arm 620 and a spring carrier 622. The lever arm 620 includes a hub portion 624 and a spring receiving portion 626. The spring carrier 622 includes a concave portion 628 and a spring retaining portion 630.

Referring still to FIGS. 6A-6D, the housing 604 includes a friction member 632 integrally formed on an interior surface 634 of a sidewall 636. The friction member 632 may be semi-annular or semi-circular. The hub portion 624 of the lever arm 620 abuts the friction member 632 of the housing 604 and the concave portion 628 of the spring carrier 622. The hub portion 624 rotates within the concave portion 628 of the spring carrier 622 and against the friction member 632 of the housing 604 when a pressure is applied to the spring receiving portion 626. The pressure is received when the pedal pad 610 is depressed, which drives the link 614 into the lever arm 620. As such, pedal effort/resistance is generated by the friction created from the hub portion 624 rotating against the friction member 632 of the housing 604 and the concave portion 628 of the spring carrier 622.

In the embodiments described herein, the housing 604 and pedal arm 602, may be a molded plastic. For example, the housing 604 and pedal arm 602 may be formed with various materials such as acrylonitrile butadiene styrene (ABS), polyethylene (PE), polypropylene (PP), polycarbonate (PC), nylon, polycarbonate/acrylonitrile butadiene styrene, polyurethane, polymethyl methacrylate, high density polyethylene, low density polyethylene, polystyrene, PEEK, POM (Acetal/Delrin), polyethylene terephthalate, thermoplastic elastomer, polyetherimide, theremoplastic vulcanizate, polysulfone, combinations thereof, and/or the like. Additionally, additives may be added such as UV absorbers, flame-retardants, colorants, glass fibers, plasticizers and/or the like.

In other embodiments, the housing 604 and pedal arm 602 may be formed from injection molding or other additive manufacturing techniques. For example, as provided herein, additive manufacturing techniques refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

As further depicted in FIGS. 6A-6D, the pedal emulator assembly 600 may further include a first compressible member, such as at least one first spring 638, positioned between the spring receiving portion 626 of the lever arm 620 and the spring retaining portion 630 of the spring carrier 622 to bias the lever arm 620 in a direction opposite of a pedal depression force. The link 614 is coupled to the spring receiving portion 626. When a pedal depression force is applied to the pedal arm 602, the link 614 moves into the spring receiving portion 626 of the lever arm 620, which in turn compresses the at least one first spring 638 into the spring retaining portion 630 of the spring carrier 622.

In these embodiments, the pedal emulator assembly 600 may further include a sensor assembly 652 that includes a coupler 654 mounted in the hub portion 624 and is configured to rotate when the hub portion 624 rotates. The sensor assembly 652 may track or determine the movement of the coupler 654 via a transmitting coil and at least one receiving coil positioned on or within a circuit board, such as a printed circuit board. As such, the sensor assembly 652 will sense the mount of force on the pedal pad 610 at any given time based on the positon of the coupler 654. Operation of the sensor assembly 652 will be described in additional detail herein.

Referring still to FIGS. 6A-6D, a second compressible member, such as at least one second spring 640, is positioned at least partially within a spring receiving cavity 642 of the housing 604. A portion of the at least one second spring 640 is positioned above a housing upper surface 644 and below the interior surface 612b of the pedal arm 602. As such, once the pedal pad 610 is depressed with enough force to move the link 614 a predetermined distance, which is a force greater than the force needed to move the at least one first spring 638, an upper surface 646 of the at least one second spring 640 makes contact with the interior surface 612b of the pedal arm 602 compressing the at least one second spring 640 into the spring receiving cavity 642. Such compression provides the pedal effort/resistance of the second section of the desired force curve of FIG. 1, as will be described in additional herein.

In these embodiments, the pedal emulator assembly 600 may further include an elastomer member 648 or foam member positioned on and extending from the housing upper surface 644 and below the interior surface 612b of the pedal arm 602. The elastomer member 648 is configured to compress at a predetermined rate when the interior surface 612b of the pedal arm 602 makes contact with an upper surface 650 of the elastomer member 648.

Figure 6A:
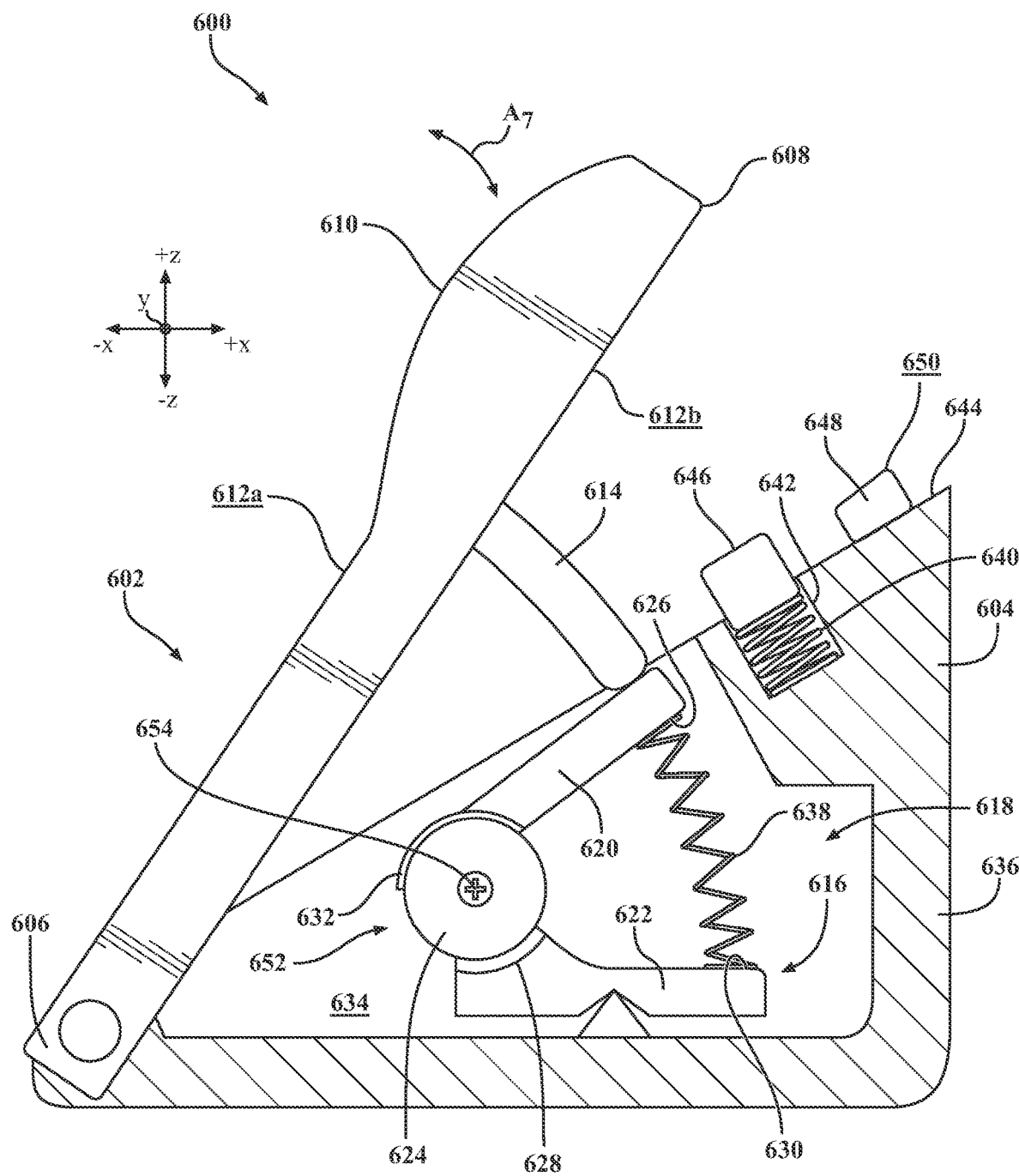
FIG. 6A schematically depicts a right side view of a fourth example pedal assembly utilizing a pivot friction lever to generate resistance, according to one or more embodiments shown and described herein.
Figure 6B:
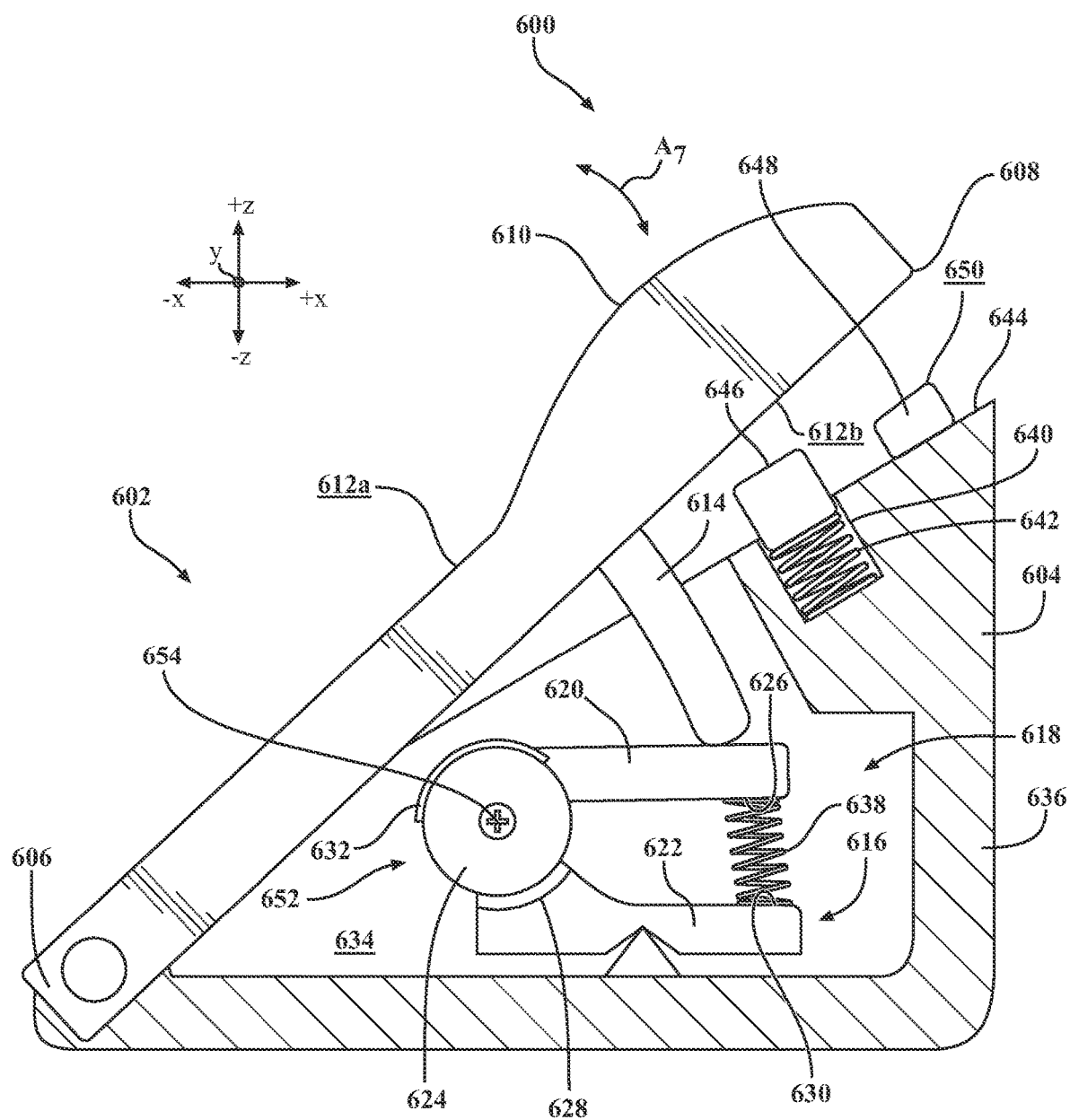
FIG. 6B schematically depicts a perspective view of the pedal assembly of FIG. 6A with a pedal arm in an undepressed state, according to one or more embodiments shown and described herein.

Operation of the pedal emulator assembly 600 will now be described in detail with reference to FIGS. 6B-6D. For example, as depicted in FIG. 6B, when the pedal pad 610 receives a first predetermined load, the pedal pad 610 begins to pivot around its pivot end 606. This movement is transferred via the link 614, such that the link 614 moves the lever arm 620 which compresses the at least one first spring 638 and rotates the hub portion 624. In these embodiments, the at least one first spring 638 is only applying a minimum resistance to maintain the positioning of the pedal arm 602. A such, the first predetermined load L1 may be enough force to compress the at least one first spring 638 a predetermined distance such that the link 614 contacts the spring receiving portion 626 of the spring carrier assembly 616 to achieve the desirable curve illustrated by bracket 102 in FIG. 1.

In these embodiments, as the first predetermined load L1 acts on the pedal arm 602, the hub portion 624 rotates within the concave portion 628 of the spring carrier 622, such that the hub portion 624 contacts the friction member 632 of the housing 604. Accordingly, the rotation of the hub portion 624 generates a frictional resistance, which acts as a portion of the first section of the pedal effort depicted as bracket 102 in the desired force curve depicted in FIG. 1.

Figure 6C:
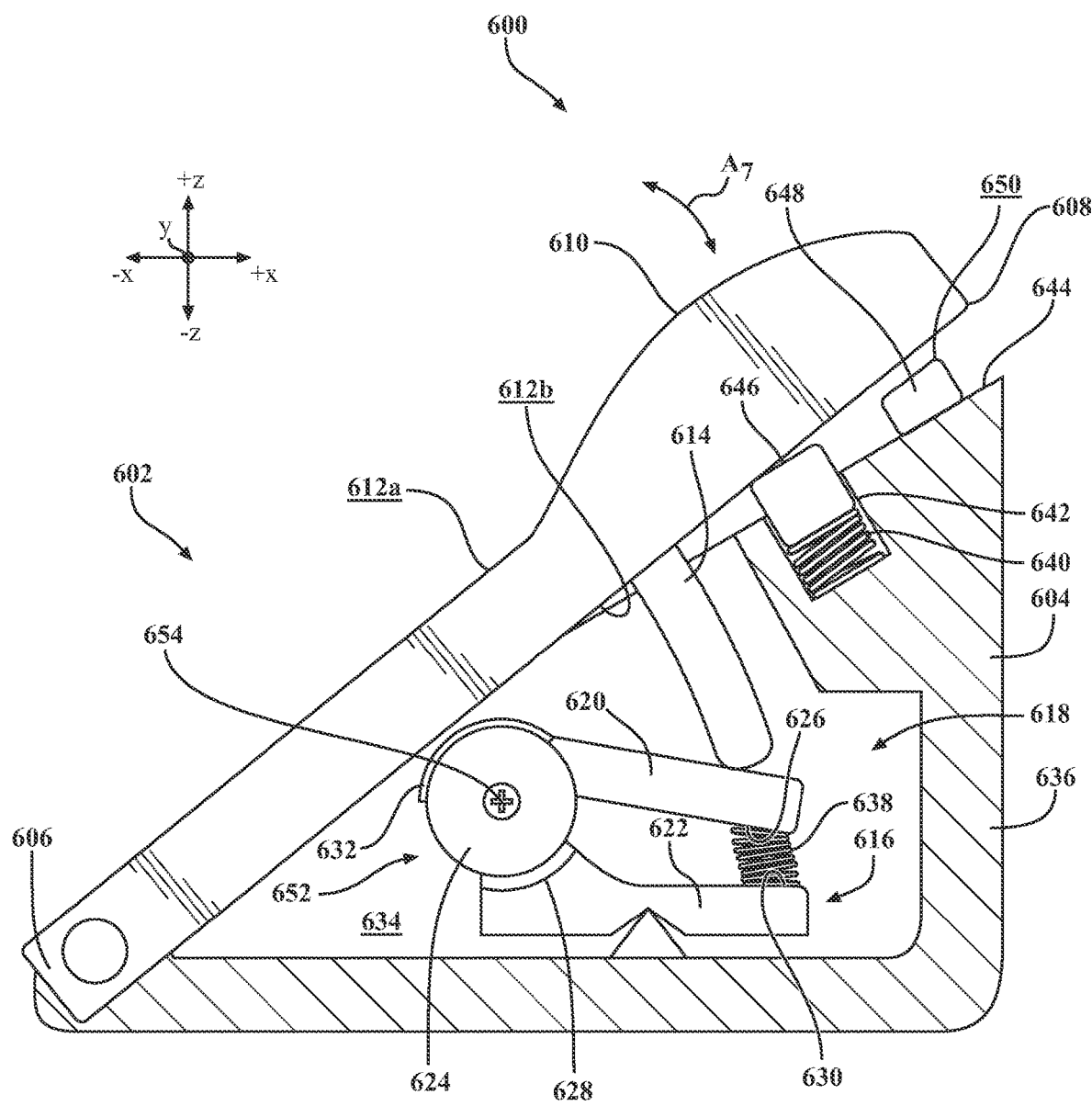
FIG. 6C schematically depicts a perspective view of the pedal assembly of FIG. 6A with a pedal arm in a partially depressed state, according to one or more embodiments shown and described herein.

Referring now to FIG. 6C, when a second predetermined load L2 that is larger than the first predetermined load L1 acts on the pedal arm 602, the link 614 continues to move (e.g., in the direction illustrated by arrow A7). In response, once the pedal arm 602 has moved a predetermined distance, the interior surface 612b of the pedal arm 602 contacts the upper surface 646 of the at least one second spring 640. In these embodiments, the force exerted on the pedal arm 602 is sufficient to overcome a combined resistance of the at least one first spring 638 and frictional forces acting between the hub portion 624 and the friction member 632, such that the at least one second spring 640, which is at least partially lodged in the spring receiving cavity 642, begins to compress. As should be appreciated in view of the foregoing, the compression of the at least one second spring 640 may offer increased resistance to the pedal arm 602. Accordingly, the second predetermined load L2 may be enough force to compress both the at least one first spring 638 and the at least one second spring 640 a predetermined distance achieve the desirable curve illustrated by bracket 104 in FIG. 1.

Figure 6D:
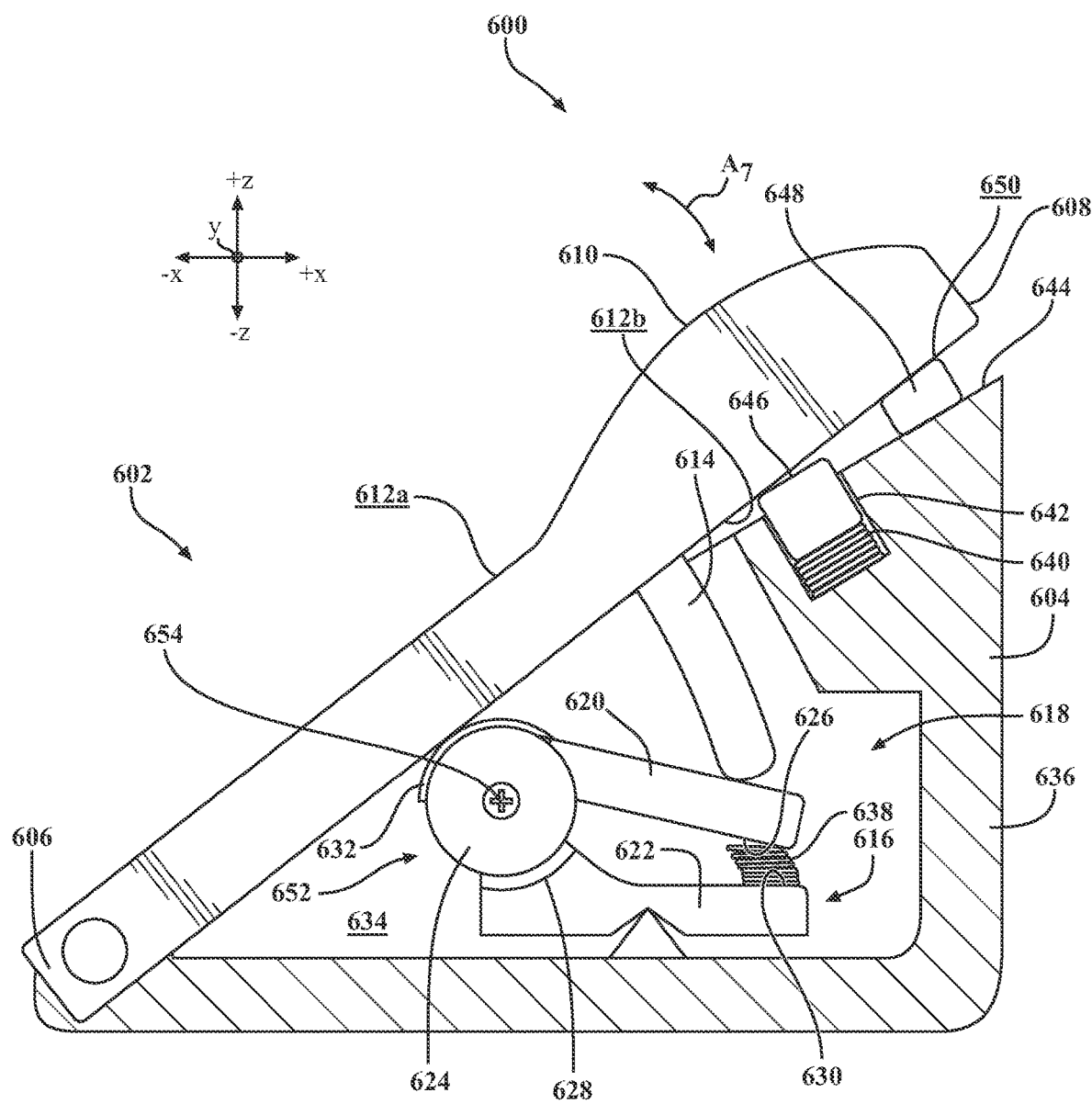
FIG. 6D schematically depicts a perspective view of the pedal assembly of FIG. 6A with a pedal arm in a fully depressed state, according to one or more embodiments shown and described herein.

Turning now to FIG. 6D, a third predetermined load L3 may be applied to the pedal arm 602 that is greater than the second predetermined load L2 and the first predetermined load L1 as the driver continues to exert force on the pedal pad 610, such that the interior surface 612b of the pedal arm comes into contact with the upper surface 650 of the elastomer member 648 positioned on the housing upper surface 644. The elastomer member 648, being made of a flexible material such as rubber, polyurethane, or any other similarly deformable material, may begin to compress under the force applied by the pedal arm 602 to the elastomer member 648. In these embodiments, the compression of the elastomer member 648 may provide a significant resistance force, which may correspond to the third section of the desired force curve depicted by bracket 106 in FIG. 1. For example, the resistance offered by the compression of the elastomer member 648 may be the highest resistance generated by the pedal emulator assembly 600, which may indicate to a driver an end-stop feeling of the pedal arm 602 depression.

In view of the foregoing, it should be appreciated that the force applied by the various springs (e.g., the at least one first spring 638 and/or the at least one second spring 640) and the elastomer member 648 apply different forces at corresponding travel positions. Compression of the elastomer member 648 applies a significant force to the pedal arm 602. The combination of the various springs (e.g., the at least one first spring 638 and/or the at least one second spring 640) and the elastomer member 648 result in a composite of forces to provide a desired force curve.

Referring now to FIGS. 6B-6D collectively, the sensor assembly 652 is configured to monitor the rotational movement of the hub portion 624 of the lever arm 620 to determine the exact force and position of the pedal pad 610 as the pedal arm 602 is depressed. In these embodiments, the coupler 654 may rotate in tandem with the hub portion 624 of the lever arm 620, thereby converting mechanical movement (e.g., rotation) of the hub portion 624 into a measurable signal.

In particular, rotation of the coupler 654 affects the orientation and position of the coupler 654 relative to the transmitting and receiving coils. For example, as the coupler 654 moves (e.g., rotates), it induces changes in a magnetic field emitted by the transmitting coil. The receiving coils detect these changes, and variations in the received magnetic field can then be converted into electrical signals, which are processed, by an onboard controller or microprocessor. Accordingly, the electrical signals indicative of the variations in the received magnetic field may be directly correlated to the rotational position of the hub portion 624, and in turn, the pedal pad 610.

Now referring to FIGS. 7A-7D, there is shown a schematic representation of a fifth embodiment of a pedal emulator assembly 700 that utilizes a rotational pedal arm, compression, and sliding friction to generate resistance. The pedal emulator assembly 700 includes a pedal arm 702 and a housing 704. The pedal arm 702 is configured to rotate or pivot about a pivot hub 706 at a first end 708a of the pedal arm 702. An opposite second end 708b includes a pedal pad 710 attached thereto. The pedal arm 702 includes an exterior surface 712a, and an opposite interior surface 712b. The housing 704 includes a friction member 714 integrally formed with and extending from an inner surface 716 of a sidewall 717. The friction member 714 may be arcuate shaped and extend from a position below the interior surface 712b of the pedal arm 702 to and partially around the first end 708a or pivot hub 706.

The housing 704 further includes a spring receiving cavity 718 positioned below the interior surface 712b of the pedal arm 702. Further, the interior surface 712b of the pedal arm includes a spring receiving portion 720 positioned between the first end 708a and the second end 708b. At least one compressible member, such as at least one spring 722, extends between the spring receiving portion 720 and the spring receiving cavity 718 such that the at least one spring is compressible between the housing 704 and the pedal arm 702 when a force is applied to the pedal pad 710.

In the embodiments described herein, the housing 704 and pedal arm 702 may be a molded plastic. For example, the housing 704 and pedal arm 702 may be formed with various materials such as acrylonitrile butadiene styrene (ABS), polyethylene (PE), polypropylene (PP), polycarbonate (PC), nylon, polycarbonate/acrylonitrile butadiene styrene, polyurethane, polymethyl methacrylate, high density polyethylene, low density polyethylene, polystyrene, PEEK, POM (Acetal/Delrin), polyethylene terephthalate, thermoplastic elastomer, polyetherimide, theremoplastic vulcanizate, polysulfone, combinations thereof, and/or the like. Additionally, additives may be added such as UV absorbers, flame-retardants, colorants, glass fibers, plasticizers and/or the like.

In other embodiments, the housing 704 and pedal arm 702 may be formed from injection molding or other additive manufacturing techniques. For example, as provided herein, additive manufacturing techniques refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

A friction member assembly 724 is coupled to the interior surface 712b of the pedal arm 702 via a first link arm 726 between the spring receiving portion 720 and the first end 708a to a friction shoe 728. The first link arm 726 may be rotatably received within a semi-annular receiving portion 730 of the friction shoe 728 at or adjacent to a proximate end 732. A second link arm 734 may be received within a receiving portion 736 at a distal end 738 of the friction shoe 728 and extend between the friction shoe 728 and the first end 708a of the pedal arm 702. As such, the friction member assembly 724 may include the friction shoe 728, the first link arm 726, and/or the second link arm 734.

The friction shoe 728 may further include a recess or notch 740 that receives a spring extending between the notch 740 and the second link arm 734 and/or a cantilever member 742 that is fixed or coupled to the second link arm 734 and moves within the notch 740 based on the amount of rotation of the first end 708a about the pivot hub 706. The friction shoe 728 abuts or rides within the friction member 714, which is arcuate, or non-linear. That is, the friction shoe 728 may be arcuate shaped or non-linear.

Figure 7A:
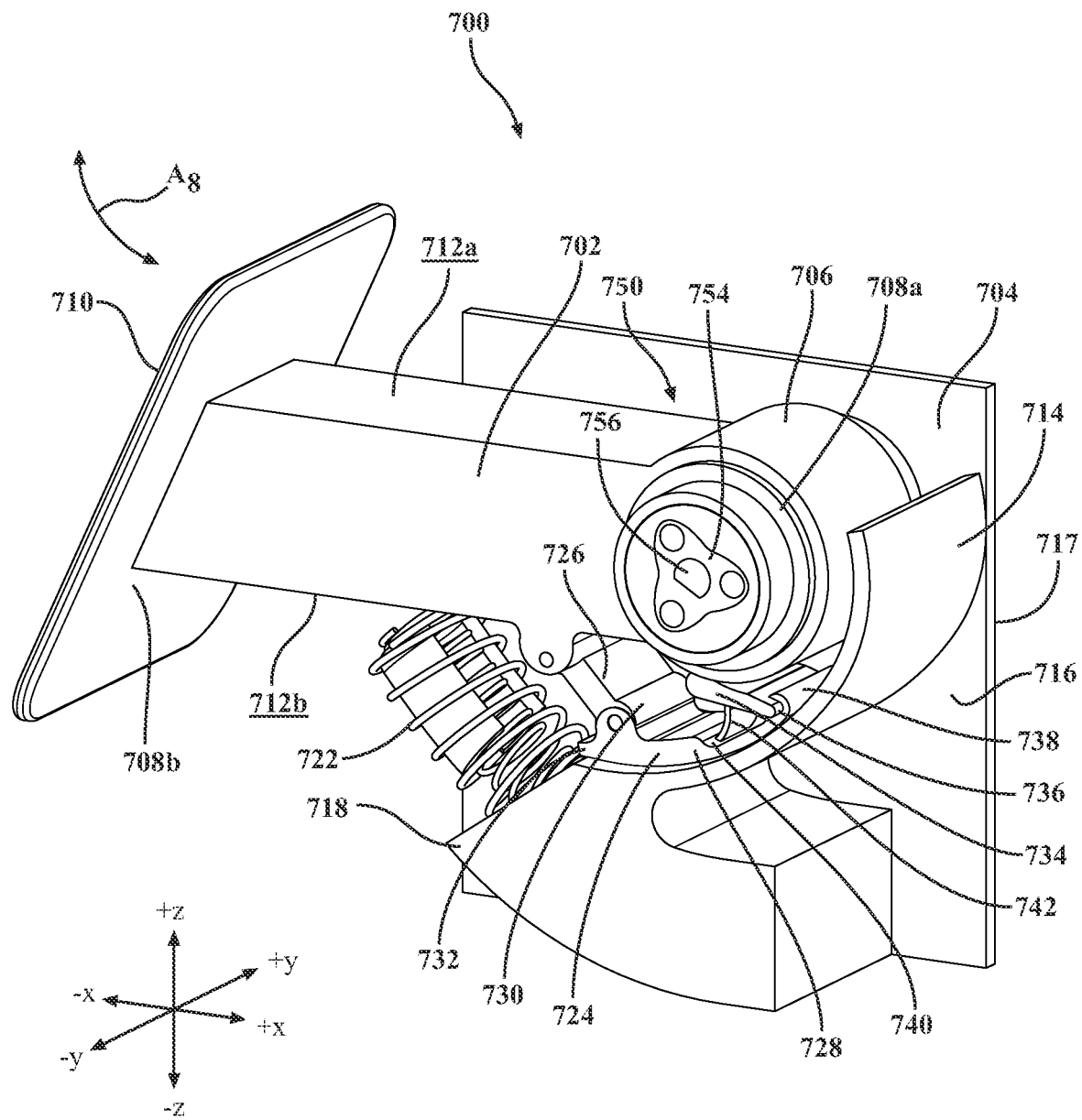
FIG. 7A schematically depicts a rear and right side perspective view of a fifth example pedal assembly utilizing a rotational pedal arm to generate resistance, according to one or more embodiments shown and described herein.
Figure 7B:
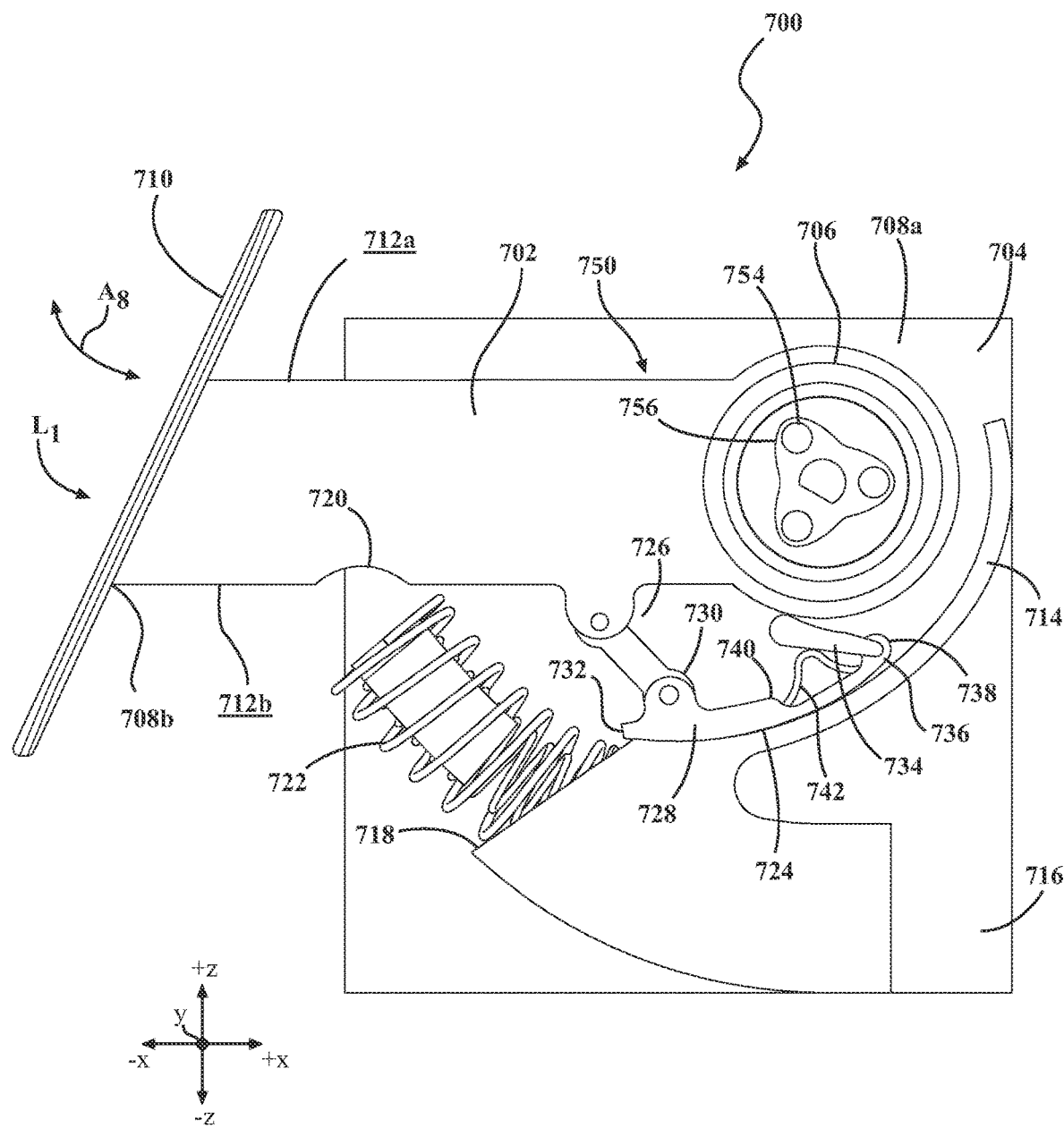
FIG. 7B schematically depicts a side view of the pedal assembly of FIG. 7A with the rotational pedal arm in an unengaged state, according to one or more embodiments shown and described herein.

Operation of the pedal emulator assembly will now be described in detail with reference to FIGS. 7B-7D. As depicted in FIG. 7B, when a first predetermined load L1 is applied to the pedal pad 710, the first end 708a and the pedal arm begins to rotate about the pivot hub 706. In these embodiments, rotation of the pedal arm 702 about the pivot hub 706 causes the interior surface 712b of the pedal pad 710 to contact and compress the at least one spring 722. In these embodiments, the at least one spring 722 may be in a mostly unbiased position, such that the at least one spring 722 is only applying a minimum resistance to maintain the position of the pedal arm 702. As such, the first predetermined load L1 may be enough force to compress the at least one spring 722 a predetermined distance, such that the spring receiving portion 720 of the pedal arm 702 contacts the at least one spring 722 to achieve the desirable force curve illustrated by bracket 102 of FIG. 1

Simultaneously, the rotation of the pedal arm 702 actuates the first link arm 726, which, in turn, pushes the friction shoe 728 along the friction member 714. In these embodiments, the shape and/or material of the friction shoe 728 and friction member 714 may allow for the introduction of sliding friction into the pedal emulator assembly 700, which forms a portion of the resistance generated by the first predetermined load L1 and as depicted in the bracket 102 of FIG. 1. For example, and as should be appreciated in view of the foregoing, higher frictional forces may be achieved between the friction shoe 728 and the friction member 714 by increasing the contact surface area between the two components.

In the embodiment depicted in FIGS. 7A-7D, as the friction shoe 728 contacts various portions of the friction member 714, the angle of contact between the friction shoe 728 and the friction member 714 may change due to the non-linear, or arcuate, profile of the friction member 714. Accordingly, when the friction shoe 728 contacts portions of the friction member 714 having a steeper curvature, the friction shoe 728 may produce a larger normal force (e.g., a force perpendicular to the surface of the friction member 714), which may in turn result in an increased frictional force.

Referring again to FIG. 7B, as the pedal pad 710 receives the first predetermined load L1, the first link arm 726 and the second link arm 734 may act as connectors between the pedal arm 702 and the friction shoe 728. Accordingly, in these embodiments, the first link arm 726 and the second link arm 734 may translate the rotational motion of the pedal arm 702 into linear motion of the friction shoe 728. In these embodiments, the non-linear profile of the friction member 714 may result in the generation of frictional force between the friction shoe 728 and the friction member 714 as the friction shoe is linearly actuated, as has been described in detail herein.

Figure 7C:
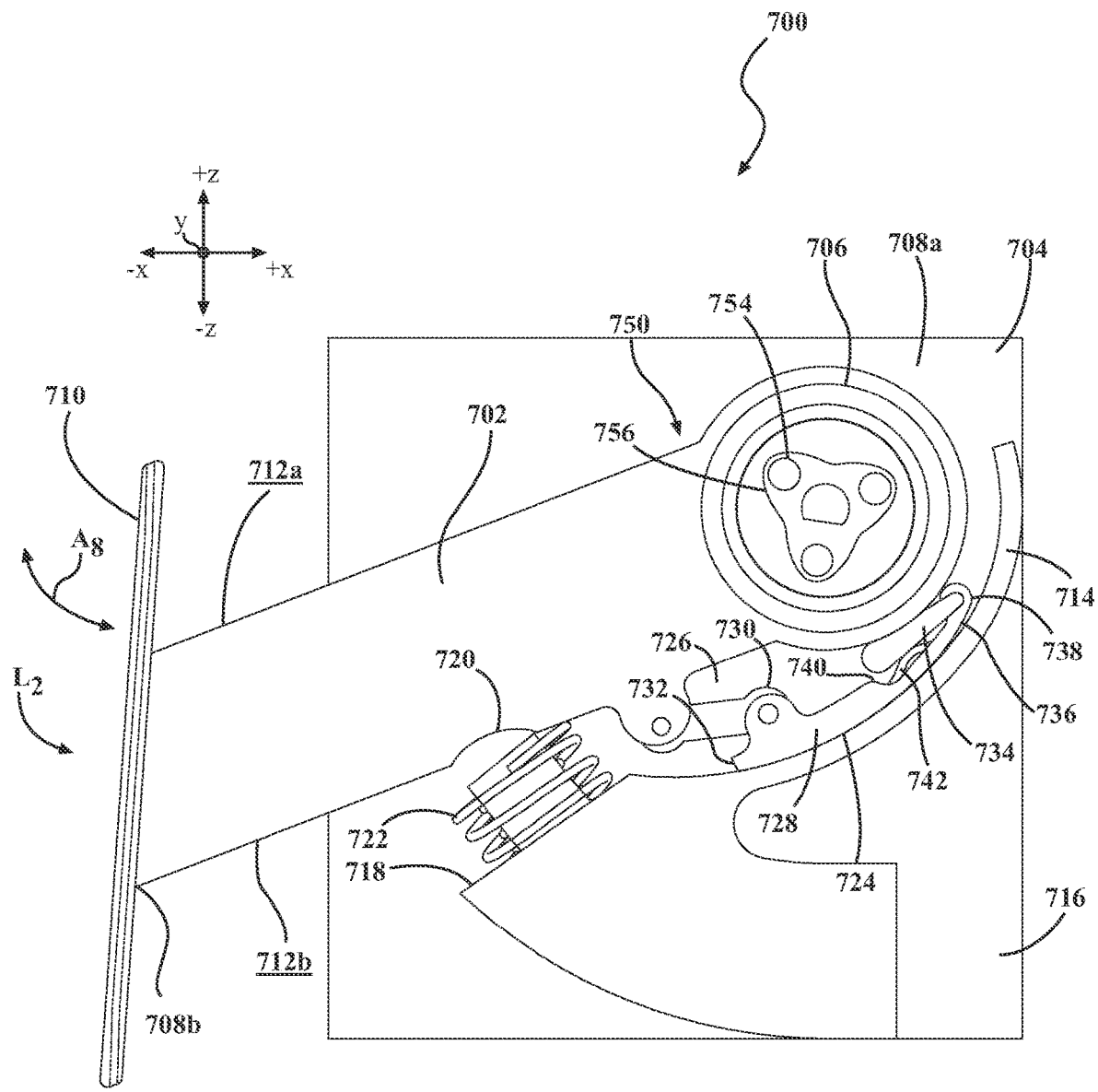
FIG. 7C schematically depicts a side view of the pedal assembly of FIG. 7A with a pedal arm in a partially engaged state, according to one or more embodiments shown and described herein.

Turning now to FIG. 7C, as the pedal arm 702 continues to rotate about the pivot hub 706, the pedal arm 702 may receive a second predetermined load L2. In these embodiments, when the second predetermined load L2 is applied to the pedal arm, the interior surface 712b of the pedal arm 702 may further compress the at least one spring 722, thereby increasing resistance within the pedal emulator assembly 700 and making the pedal arm 702 more difficult to depress (e.g., rotate). Furthermore, as the pedal arm 702 rotates, the friction shoe 728 continues to traverse the friction member 714. As the friction shoe 728 interacts with a portion of the friction member 714 having a steeper curve, the resistance due to friction increases, as has been described herein. Accordingly, it should be appreciated that the progressive increase in friction resulting from the non-linear profile of the friction member 714 may simulate the braking force in a traditional brake pad and provide tactile feedback to the driver.

Referring still to FIG. 7C, as the second predetermined load L2 acts on the pedal arm 702, the position of the cantilever member 742 within the notch 740 may also change. For example, and as described herein, rotation of the pedal arm 702 may cause the first link arm 726 to move the friction shoe 728 along the friction member 714. As the friction shoe 728 moves, the cantilever member 742 may be subject to displacement due to the connection between the cantilever member 742 and the second link arm 734. Accordingly, as the pedal arm 702 continues to rotate, the cantilever member 742 may become increasingly displaced, which may cause the cantilever member 742 to bend. In these embodiments, the bending of the cantilever member 742 and the connection between the cantilever member 742 and the second link arm 734 may provide a leverage effect that exerts a force on the second link arm 734. More particularly, the force exerted by the cantilever member 742 against the second link arm is directed towards the pivot hub 706 of the pedal arm 702, thereby opposing the rotation of the pedal arm 702. Accordingly, the force exerted by the cantilever member 742 on the second link arm 734 may further contribute to the resistance of the pedal pad 710 and the tactile feedback experienced by the driver.

In the embodiments described herein, it should be appreciated that the resistance generated by the cantilever member 742, the friction member 714, and the at least one spring 722 when the second predetermined load L2 acts on the pedal arm 702 may produce a greater pedal effect experienced by the driver, as is illustrated in bracket 104 of FIG. 1

Figure 7D:
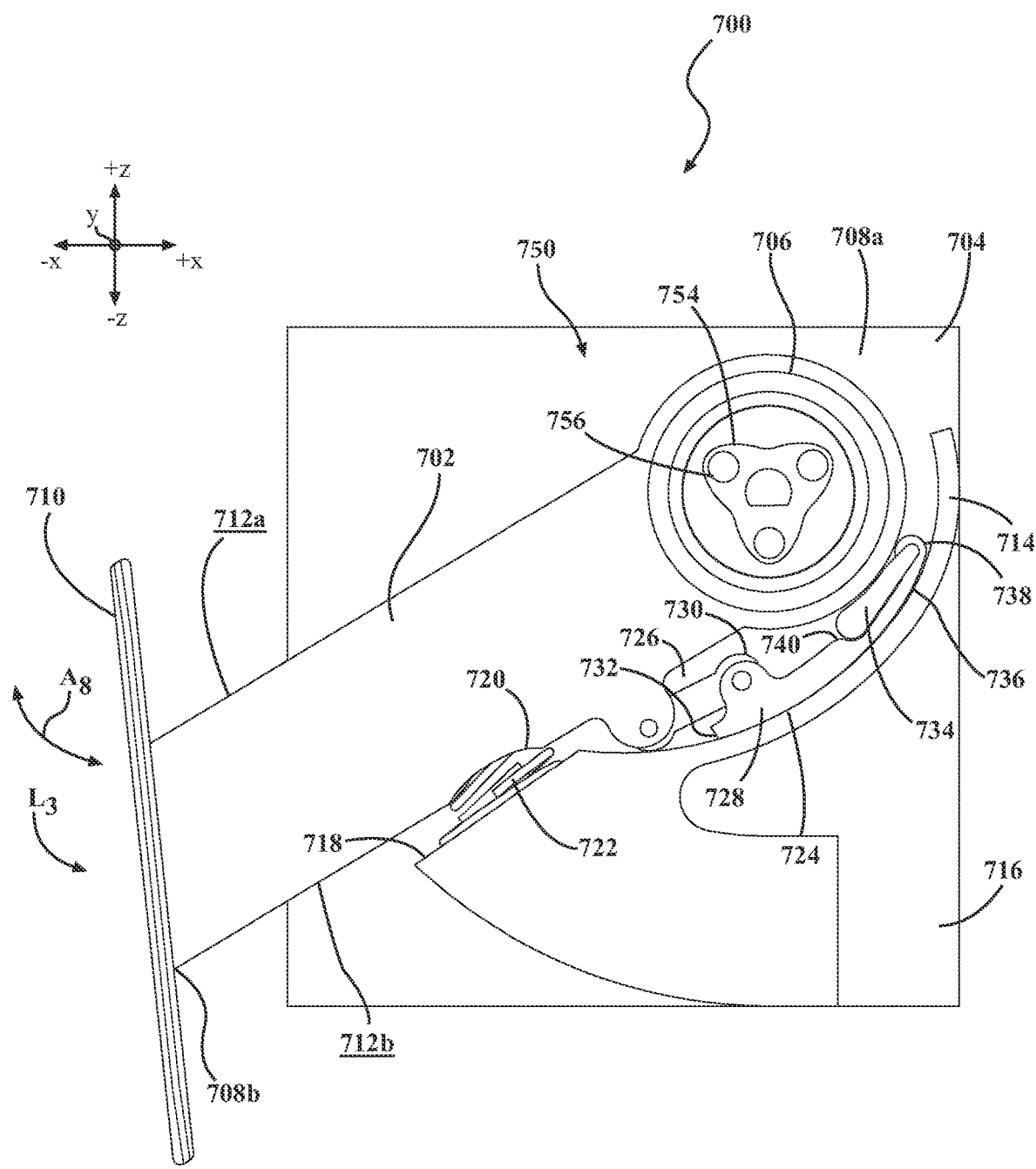
FIG. 7D schematically depicts a side view of the pedal assembly of FIG. 7A with a pedal arm in a fully engaged state, according to one or more embodiments shown and described herein.

Turning now to FIG. 7D, the pedal emulator assembly 700 is depicted in a fully compressed position, in which a third predetermined load L3 that is greater than the first predetermined load L1 and the second predetermined load L2 is being applied to the pedal arm. In these embodiments, the pedal arm 702 may be fully rotated, such that the interior surface 712b of the pedal pad 710 fully compresses the at least one spring 722. Furthermore, the friction shoe 728 may interact with a portion of the friction member 714 having the most aggressive curve (e.g., steepest slope), which results in a maximum level of frictional force being exerted on the pedal pad 710. Similarly, the first link arm 726 actuates the friction shoe 728 at a maximum distance along the friction member 714, while the cantilever member 742 exerts a maximum force on the second link arm 734. In these embodiments, the combination of the of forces may result in a peak resistance being achieved within the pedal emulator assembly 700, which may correspond to the third section depicted as bracket 106 in the desired force curve illustrated in FIG. 1.

In view of the foregoing, it should be appreciated that the force applied by the at least one spring 722, friction shoe 728, the curvature of the friction member 714, and the various link arms 726, 734 apply different forces at the corresponding travel positions. Compression of the second link arm 734 and curvature of the friction member 714 with the friction shoe 728 at that particular point applies a significant force to the pedal arm 702. The combination of the at least one spring 722, friction shoe 728, curvature of the friction member 714 and the various link arms 726, 734 result in a composite of forces to provide a desired force curve.

Referring again to FIGS. 7A-7D, the pedal emulator assembly 700 may further include a sensor assembly 750 is configured to monitor the rotational movement of the hub portion 624 of the pivot hub 706 to determine the exact force and position of the pedal pad 710 as the pedal arm 702 is depressed. In these embodiments, the sensor assembly 750 may further include a coupler 754 that may be integrated into the pivot hub 706, such that the coupler 756 may rotate in tandem with the pivot hub 706 of the pedal arm 702 and convert mechanical movement (e.g., rotation) of the pivot hub 706 into a measurable signal.

In particular, rotation of the coupler 754 affects the orientation and position of the coupler 754 relative to a plurality of transmitting and receiving coils (not depicted). For example, as the coupler 754 moves (e.g., rotates), it induces changes in a magnetic field emitted by the transmitting coil. The receiving coils detect these changes, and variations in the received magnetic field can then be converted into electrical signals, which are processed, by an onboard controller or microprocessor. Accordingly, the electrical signals indicative of the variations in the received magnetic field may be directly correlated to the rotational position of the pivot hub 706, and in turn, the pedal pad 710.

1. A pedal emulator assembly comprising: a housing having a cavity defined by a pair of sidewalls, a first end wall and a second end wall; a lower arm having a spring retaining portion formed therein; a pedal arm pivotally coupled the pedal arm and having a pedal pad; a lever arm positioned within the cavity of the housing and pivotally coupled to the housing, the lever arm further including a spring receiving portion; and a spring carrier including a compressible member extending between the spring receiving portion and the spring retaining portion; wherein, when a first predetermined load is applied to the pedal pad, the pedal arm drives the lever arm into the compressible member such that the compressible member compresses into an at least partially compressed state to generate a first return force on the pedal pad.
2. The pedal emulator assembly of any preceding clause, wherein the lever arm further includes an upper frame portion that includes an engagement surface having a non-linear profile that extends between a first end of the lever arm and a second end of the lever arm.
3. The pedal emulator assembly of any preceding clause, wherein the upper frame portion includes a first portion extending between the first end of the lever arm and an apex of the lever arm.
4. The pedal emulator assembly of any preceding clause, wherein the upper frame portion includes a second portion extending between the apex of the lever arm and the second end of the lever arm.
5. The pedal emulator assembly of any preceding clause, wherein the first portion of the upper frame portion has a first slope and the second portion of the upper frame portion has a second slope different from the first slope.
6. The pedal emulator assembly of any preceding clause, wherein, when a second predetermined load is applied to the pedal pad, the pedal arm further contacts the first portion of the upper frame portion to generate a second return force on the pedal pad, the second predetermined load is a greater load than the first predetermined load and the second return force is a greater force than the first return force.
7. The pedal emulator assembly of any preceding clause, wherein, when a third predetermined load is applied to the pedal pad, the pedal arm further contacts the second portion of the upper frame to generate a third return force on the pedal pad, the third predetermined load is a greater load than the second predetermined load, and the third return force is a greater force than the second return force.
8. The pedal emulator assembly of any preceding clause, wherein the lower arm is fixedly coupled to within the cavity of the housing.
9. The pedal emulator assembly of any preceding clause, wherein the lower arm further includes a concave portion configured to receive a pivot portion of the pivot end of the pedal arm, such that the pedal arm pivots about the pivot portion within the concave portion of the lower arm.
10. The pedal emulator assembly of any preceding clause, wherein the compressible member includes a plurality of springs coaxially aligned about the spring carrier.
11. The pedal emulator assembly of any preceding clause, further comprising: a sensor assembly positioned within the housing, the sensor assembly further comprising: a circuit board; at least one Hall Effect chip communicatively coupled to the circuit board; and a magnet communicatively coupled to the at least one Hall Effect chip; wherein the sensor assembly is configured to detect movement of the pedal arm.
12. A pedal emulator assembly for a vehicle comprising: a floor mounted housing having a cavity defined by a pair of side walls, a first end wall, and a second end wall; a lower arm having a spring retaining portion formed therein; a pedal arm at least partially received in the cavity, the pedal arm having an interior surface, a pivot end, and an opposite pad end on which a pedal pad is attached; a lever arm positioned within the cavity of the housing and pivotally coupled to the housing, the lever arm further comprising: a first end; a second end positioned opposite the first end; an apex disposed at the first end; a hub portion disposed at the second end; an upper frame portion and a lower frame portion that connect at the apex and the hub portion; and a spring receiving portion positioned between the first end and the second end and within the lower frame portion; and a spring carrier including a compressible member extending between the spring receiving portion and the spring retaining portion; wherein, when a first predetermined load is applied to the pedal pad, the interior surface of the pedal arm drives the lever arm into the compressible member such that the compressible member compresses into a compressed state to generate a first return force on the pedal pad.
13. The pedal emulator assembly of any preceding clause, wherein the interior surface of the pedal arm is non-linear.
14. The pedal emulator assembly of any preceding clause, wherein the upper frame portion includes a surface having a non-linear profile that extends between the first end of the lever arm and the second end of the lever arm.
15. The pedal emulator assembly of any preceding clause, wherein the upper frame portion includes a first portion extending between the first end of the lever arm and the apex of the lever arm and a second portion extending between the apex of the lever arm and the second end of the lever arm.
16. The pedal emulator assembly of any preceding clause, wherein the first portion of the upper frame portion has a first slope and the second portion of the upper frame has a second slope different from the first slope.

17. The pedal emulator assembly of any preceding clause, wherein, when a second predetermined load is applied to the pedal pad, the interior surface of the pedal arm contacts the first portion of the upper frame portion to generate a second return force on the pedal pad, the second predetermined load is a greater load than the first predetermined load, and the second return force is a greater force than the first return force.

18. The pedal emulator assembly of any preceding clause, wherein, when a third predetermined load is applied to the pedal pad, the interior surface of the pedal arm contacts the second portion of the upper frame portion to generate a third return force on the pedal pad, the third predetermined load is a greater load than the second predetermined load, and the third return force is a greater force than the second return force.

19. The pedal emulator assembly of any preceding clause, further comprising: a sensor assembly positioned within the housing, the sensor assembly further comprising: a circuit board; at least one Hall Effect chip communicatively coupled to the circuit board; and a magnet communicatively coupled to the at least one Hall Effect chip; wherein the sensor assembly is configured to detect movement of the pedal arm.

20. A pedal emulator assembly for a vehicle comprising: a housing having a cavity defined by a pair of side walls, a first end wall and a second end wall; a lower arm having a spring retaining portion formed therein; a pedal arm at least partially received in the cavity, the pedal arm having a pivot end pivotally coupled to the housing, an opposite pad end on which a pedal pad is attached, and an interior surface that is non-linear; a lever arm positioned within the cavity of the housing and pivotally coupled to the housing, the lever arm further comprising: a first end; a second end positioned opposite the first end; an apex disposed at the first end; a hub portion disposed at the second end; an upper frame and a lower frame that connect at the apex and the hub portion, the upper frame including an upper surface with a non-linear profile; and a spring receiving portion positioned between the first end and the second end in the lower frame; a spring carrier including a compressible member extending between the spring receiving portion and the spring retaining portion; and wherein, when a first predetermined load is applied to the pedal pad, the interior surface of the pedal arm contacts the upper surface of the upper frame of the lever arm, such that the lever arm is forced into the compressible member to generate a return force on the pedal pad.

21. A pedal emulator assembly comprising: a housing including a cavity; a pedal arm at least partially received in the cavity, the pedal arm having a pivot end, an opposite pad end on which a pedal pad is attached, and a protrusion extending from an interior surface of the pedal arm; a lever arm positioned within the cavity of the housing and pivotally coupled to the housing, the lever arm further including an engagement surface configured to engage a contact surface of the protrusion; and a spring carrier including a compressible member extending between the pivot end of the pedal arm and the lever arm; wherein, when a first predetermined load is applied to the pedal pad, the contact surface of the protrusion of the pedal arm slidably engages against the engagement surface of the lever arm and generates a first return force on the pedal pad.

22. The pedal emulator assembly of any preceding clause, wherein the outer surface of the lever arm is a non-linear surface.

23. The pedal emulator assembly of any preceding clause, wherein the engagement surface of the housing is a non-linear surface.

24. The pedal emulator assembly of any preceding clause, wherein the engagement surface of the lever arm and the contact surface of the protrusion are configured such that, when a second predetermined load is applied to the pedal arm, contact between the engagement surface of the lever arm and the contact surface of the projection increases.

25. The pedal emulator assembly of any preceding clause, wherein, when a second predetermined load is applied to the pedal arm, rotation of the pedal arm compresses the compressible member to generate a second return force on the pedal pad.

26. The pedal emulator assembly of any preceding clause, further comprising an elastomer member positioned within a recess formed in the housing.

27. The pedal emulator assembly of any preceding clause, wherein an interior surface of the pedal arm at the pad end contacts and compresses the elastomer member when a third predetermined load is applied to the pedal pad.

28. The pedal emulator assembly of any preceding clause, further comprising a sensor assembly positioned within the housing, the sensor assembly further comprising: a circuit board; at least one Hall Effect chip communicatively coupled to the circuit board; and a magnet communicatively coupled to the at least one Hall Effect chip; wherein the sensor assembly is configured to detect movement of the pedal arm.

29. The pedal emulator assembly of any preceding clause, wherein the housing and the pedal arm are formed of molded plastic.

30. A pedal emulator assembly comprising: a housing including a cavity; a pedal arm at least partially received in the cavity, the pedal arm having a pivot end, an opposite pad end on which a pedal pad is attached, and a protrusion extending from an interior surface of the pedal arm; a lever arm positioned within the cavity of the housing and pivotally coupled to the housing, the lever arm further including an outer surface configured to engage a contact surface of the protrusion; and a spring carrier having a pedal end and an opposite lever arm end, the spring carrier extending between the pivot end of the pedal arm and the lever arm; and an elastomer member positioned within a recess formed in the housing; wherein, when a first predetermined load is exerted on the pedal pad, the contact surface of the protrusion of the pedal arm slides against an engagement surface of the lever arm and generates first return force on the pedal pad.

31. The pedal emulator assembly of any preceding clause, wherein the outer surface of the lever arm is a non-linear surface.

32. The pedal emulator assembly of any preceding clause, wherein the engagement surface of the housing is a non-linear surface.

33. The pedal emulator assembly of any preceding clause, wherein the interior surface of the pedal arm and the outer surface of the lever arm are configured such that contact between the outer surface of the lever arm and the interior surface of the pedal arm increases as the pedal pad is depressed from an initial position to a fully depressed position.

34. The pedal emulator assembly of any preceding clause, wherein the interior surface of the pedal arm at the pad end contacts and compresses the elastomer member when a third predetermined load is applied to the pedal pad.

35. The pedal emulator assembly of any preceding clause, further comprising a sensor assembly positioned within the housing, the sensor assembly further comprising: a circuit board; at least one Hall Effect chip communicatively coupled to the circuit board; and a magnet communicatively coupled to the at least one Hall Effect chip; wherein the sensor assembly is configured to detect movement of the pedal arm.

36. The pedal emulator assembly of any preceding clause, wherein the pedal arm and the housing are formed from molded plastic.

37. The pedal emulator assembly of any preceding clause, wherein the lever arm further includes a protrusion that engages a recess formed in the cavity of the housing.

38. The pedal emulator assembly of any preceding clause, wherein the elastomer member is formed of rubber or plastic.

39. The pedal emulator assembly of any preceding clause, wherein the housing is configured to be mounted to an instrument panel.

40. A pedal emulator assembly for a vehicle comprising: a housing including a cavity; a pedal arm at least partially received in the cavity, the pedal arm having a pivot end, an opposite pad end on which a pedal pad is attached, and a protrusion extending from an interior surface of the pedal arm; a lever arm positioned within the cavity of the housing and pivotally coupled to the housing, the lever arm further including an engagement surface configured to engage a contact surface of the protrusion of the pedal arm; and a spring carrier having a pedal end and an opposite lever arm end, the spring carrier extending between the pivot end of the pedal arm and the lever arm; an elastomer member positioned within a recess formed in the housing; and a sensor assembly positioned within the housing and configured to detect movement of the pedal arm, the sensor assembly further comprising: a circuit board; at least one Hall Effect chip communicatively coupled to the circuit board; and a magnet communicatively coupled to the at least one Hall Effect chip; wherein, when a first predetermined load is applied to the pedal pad, the interior surface of the pedal arm slides against the engagement surface of the lever arm and generates frictional force on the pedal pad.

41. A pedal emulator assembly comprising: a housing having a cavity defined by a pair of opposing side walls; a pedal arm at least partially received in the cavity, the pedal arm having a pivot end and an opposite pad end on which a pedal pad is attached; a pair of slots formed in the housing, the pair of slots extending through the pair of opposing side walls of the cavity; a lower arm having a first end pivotally coupled to the pivot end of the pedal arm and an opposite second end, the lower arm including a spring retaining portion; a link lever arm including a support end having an aperture extending there through, and a coupled end that is pivotally coupled to the lower arm; an upper lever arm pivotally coupled to the housing, the upper lever arm including a spring receiving portion; an elongated member extending through the pair of slots and the aperture of the link lever arm and contacting the upper lever arm; and a compressible member extending between the spring receiving portion of the upper lever arm and the spring retaining portion of the lower arm; wherein, when a first predetermined load is applied to the pedal pad, contact between the pair of slots and the elongated member drives the elongated member along the upper lever arm, such that the upper lever arm is forced into contact with the compressible member and compresses the compressible member to generate a first return force on the pedal pad.

42. The pedal emulator assembly of any preceding clause, wherein the upper lever arm includes an upper frame having an engagement surface having a non-linear profile that extends between a first end of the upper lever arm and an apex of the upper frame of the upper lever arm.

43. The pedal emulator assembly of any preceding clause, wherein the engagement surface includes a first portion extending partially between the first end of the upper lever arm and the apex of the upper lever arm.

44. The pedal emulator assembly of any preceding clause, wherein the first portion of the engagement surface has a first slope that changes along a length of the first portion of the upper frame portion.

45. The pedal emulator assembly of any preceding clause, wherein, when a second predetermined load is applied to the pedal pad, the elongated member contacts the first portion of the engagement surface to generate a second return force on the pedal pad.

46. The pedal emulator assembly of any preceding clause, wherein the engagement surface includes a second portion extending between the first portion of the engagement surface and the apex of the upper lever arm.

47. The pedal emulator assembly of any preceding clause, wherein the second portion of the engagement surface has a second slope that increases in steepness along a length of the second portion of the upper frame.

48. The pedal emulator assembly of any preceding clause, wherein, when a third predetermined load is applied to the pedal pad, the elongated member contacts the second portion of the engagement surface to generate a third return force on the pedal pad.

49. The pedal emulator assembly of any preceding clause, wherein the elongated member further includes a pair of terminating ends having a first diameter that is larger than a second diameter of each of the pair of slots.

50. The pedal emulator assembly of any preceding clause, further comprising a sensor assembly configured to monitor rotational movement of a second end of the upper lever arm.

51. The pedal emulator assembly of any preceding clause, wherein the sensor assembly further comprises a coupler integrated into the second end of the upper lever arm, such that the coupler rotates in tandem with the second end of the upper lever arm.

52. The pedal emulator assembly of any preceding clause, wherein the housing and the pedal arm are formed of molded plastic.

53. The pedal emulator assembly of any preceding clause, wherein the compressible member comprises a spring extending between the spring receiving portion of the upper lever arm and the spring retaining portion of the lower arm.

54. A pedal emulator assembly for a vehicle comprising: a floor mounted housing having a cavity defined by a pair of opposing side walls; a pedal arm at least partially received in the cavity, the pedal arm having a pivot end and an opposite pad end on which a pedal pad is attached; a pair of slots formed in the housing, the pair of slots extending through the pair of opposing side walls of the cavity; a lower arm having a first end pivotally coupled to the pivot end of the pedal arm and an opposite second end, the lower arm including a spring retaining portion; a link lever arm including a support end having an aperture extending there through, and a coupled end that is pivotally coupled to the lower arm; a upper lever arm pivotally coupled to the housing, the upper lever arm comprising: a first end and second end positioned opposite the first end; an apex disposed at the first end; a hub portion disposed at the second end; an upper frame and a lower frame that connect at the apex and the hub portion, the upper frame including an engagement surface with a non-linear profile; and a spring receiving portion positioned between the first end and the second end in the lower frame; an elongated member extending through the pair of slots and the aperture of the link lever arm and contacting the upper lever arm; and a compressible member extending between the spring receiving portion of the upper lever arm and the spring retaining portion of the lower arm; wherein, when a first predetermined load is applied to the pedal pad, contact between the pair of slots and the elongated member drives the elongated member along the engagement surface of the upper lever arm, such that the lower frame of the upper lever arm is forced into contact with the compressible member and compresses the compressible member to generate a first return force on the pedal pad.

55. The pedal emulator assembly of any preceding clause, further comprising a sensor assembly configured to monitor rotational movement of the second end of the upper lever arm.

56. The pedal emulator assembly of any preceding clause, wherein the sensor assembly further comprises a coupler integrated into the second end of the upper lever arm, such that the coupler rotates in tandem with the second end of the upper lever arm.

57. The pedal emulator assembly of any preceding clause, wherein the support end of the link lever arm includes a pair of ears, each of the pair of ears including the aperture for receiving the elongated member.

58. The pedal emulator assembly of any preceding clause, wherein the compressible member comprises a spring having a plurality of coils that each extend between the spring receiving portion of the upper lever arm and the spring retaining portion of the lower arm.

59. The pedal emulator assembly of any preceding clause, wherein a slope of the engagement surface of the upper frame increases in steepness along a length from the first end to the apex of the upper frame.

60. A pedal emulator assembly for a vehicle comprising: a floor mounted housing having a cavity defined by a pair of opposing side walls; a pedal arm at least partially received in the cavity, the pedal arm having a pivot end and an opposite pad end on which a pedal pad is attached; a pair of slots formed in the housing, a pair of slots extending through the pair of opposing side walls of the cavity; a lower arm having a first end pivotally coupled to the pivot end of the pedal arm and an opposite second end, the lower arm including a spring retaining portion; a link lever arm including a support end having a pair of ears, each of the pair of ears having an aperture extending there through, and a coupled end that is pivotally coupled to the lower arm; an upper lever arm pivotally coupled to the housing, the upper lever arm comprising: a first end and second end positioned opposite the first end; an apex disposed at the first end; a hub portion disposed at the second end; an upper frame and a lower frame that connect at the apex and the hub portion, the upper frame including an engagement surface having a slope that increases in steepness from the first end to the apex of the upper lever arm; and a spring receiving portion positioned between the first end and the second end in the lower frame; an elongated member extending through the pair of slots and the aperture of the link lever arm and contacting the engagement surface of the upper lever arm; and a compressible member extending between the spring receiving portion of the upper lever arm and the spring retaining portion of the lower arm; wherein, when a first predetermined load is applied to the pedal pad, contact between the pair of slots and the elongated member drives the elongated member along the engagement surface of the upper lever arm, such that the lower frame of the upper lever arm is forced into contact with the compressible member and compresses the compressible member to generate a first return force on the pedal pad.

61. A pedal emulator assembly comprising: a housing having a cavity and a friction member formed on an interior surface of the housing; a pedal arm at least partially received in the cavity, the pedal arm having a pivot end and an opposite pad end on which a pedal pad is attached, a spring carrier assembly comprising: a lever arm having a spring receiving portion and a hub portion that abuts the friction member of the housing; and a spring carrier including a spring retaining portion; a link coupled to the pedal arm and the lever arm of the spring carrier assembly; and a compressible member positioned between the spring receiving portion of the lever arm and the spring retaining portion of the spring carrier; wherein, when a first predetermined load is applied to the pedal pad, the link drives the lever arm into the compressible member such that the compressible member compresses and the hub portion rotates against the friction member to generate a first return force on the pedal pad.

62. The pedal emulator assembly of any preceding clause, wherein the housing is mounted to a floor of a vehicle.

63. The pedal emulator assembly of any preceding clause, wherein the friction member of the housing has a semi-annular or semi-circular profile.

64. The pedal emulator assembly of any preceding clause, wherein the housing further includes a spring receiving cavity.

65. The pedal emulator assembly of any preceding clause, wherein a second compressible member is positioned at least partially within the spring receiving cavity.

66. The pedal emulator assembly of any preceding clause, wherein, when distance second predetermined load is applied to the pedal pad, the pedal arm contacts the second compressible member and compresses the second compressible member into the spring receiving cavity.

67. The pedal emulator assembly of any preceding clause, further comprising an elastomer member extending from the housing.
68. The pedal emulator assembly of any preceding clause, wherein, when distance third predetermined load is applied to the pedal pad, the pedal arm contacts the elastomer member and compresses the elastomer member against the housing.
69. The pedal emulator assembly of any preceding clause, further comprising a sensor assembly configured to monitor rotational movement of the lever arm.
70. The pedal emulator assembly of any preceding clause, wherein the sensor assembly further comprises a coupler integrated into the hub portion of the lever arm, such that the coupler rotates in tandem with the hub portion of the lever arm.
71. A pedal emulator assembly comprising: a housing having a cavity, a spring receiving cavity, and a friction member formed on an interior surface of the housing; a pedal arm at least partially received in the cavity, the pedal arm having a pivot end and an opposite pad end on which a pedal pad is attached; a spring carrier assembly comprising: a lever arm having a spring receiving portion and a hub portion that abuts the friction member of the housing; and a spring carrier including a spring retaining portion; a link coupled to the pedal arm and the lever arm of the spring carrier assembly; a first compressible member positioned between the spring receiving portion of the lever arm and the spring retaining portion of the spring carrier; and a second compressible member is positioned at least partially within the spring receiving cavity, wherein, when a first predetermined load is applied to the pedal pad, the link drives the lever arm into the first compressible member, and when a second predetermined load is applied to the pedal pad, the link drives the lever arm into the first compressible member and the second compressible member, such that the first compressible member and the second compressible member compress and the hub portion rotates against the friction member to generate a second return force on the pedal pad.
72. The pedal emulator assembly of any preceding clause, wherein the friction member of the housing has a semi-annular or semi-circular profile.
73. The pedal emulator assembly of any preceding clause, further comprising an elastomer member extending from the housing.
74. The pedal emulator assembly of any preceding clause, wherein, when a third predetermined load is applied to the pedal pad, the pedal arm contacts the elastomer member and compressed the elastomer member against the housing.
75. The pedal emulator assembly of any preceding clause, further comprising a sensor assembly configured to monitor rotational movement of the lever arm.
76. The pedal emulator assembly of any preceding clause, wherein the sensor assembly further comprises a coupler integrated into the hub portion of the lever arm, such that the coupler rotates in tandem with the hub portion of the lever arm.
77. A pedal emulator assembly comprising: a housing having a cavity, a spring receiving cavity, and a friction member formed on an interior surface of the housing; a pedal arm at least partially received in the cavity, the pedal arm having a pivot end and an opposite pad end on which a pedal pad is attached; a spring carrier assembly comprising: a lever arm having a spring receiving portion and a hub portion that abuts the friction member of the housing; and a spring carrier including a spring retaining portion; a link coupled to the pedal arm and the lever arm of the spring carrier assembly; a first compressible member positioned between the spring receiving portion of the lever arm and the spring retaining portion of the spring carrier; a second compressible member is positioned at least partially within the spring receiving cavity; and an elastomer member extending from the housing; wherein, when a first predetermined load is applied to the pedal pad, the pedal arm rotates such that the link drives the lever arm into the first compressible member, and when a second predetermined load is applied to the pedal pad, the link drives the lever arm into the second compressible member, and when a third predetermined load is applied to the pedal pad, an interior surface of the pedal arm compresses the elastomer member to generate a return force on the pedal pad.
78. The pedal emulator assembly of any preceding clause, wherein the friction member of the housing has a semi-annular or semi-circular profile.
79. The pedal emulator assembly of any preceding clause, further comprising a sensor assembly configured to monitor rotational movement of the lever arm.
80. The pedal emulator assembly of any preceding clause, wherein the sensor assembly further comprises a coupler integrated into the hub portion of the lever arm, such that the coupler rotates in tandem with the hub portion of the lever arm.
81. A pedal emulator assembly comprising: a housing having a spring receiving cavity and a friction member formed on an inner surface of the housing; a pedal arm at least partially received in the housing, the pedal arm having a pivot end an opposite pad end on which a pedal pad is attached, and a spring receiving portion positioned between the pivot end and the opposite pad end on which the pedal pad is attached; a compressible member extending between the spring receiving cavity and the spring receiving portion of the pedal arm; and a friction member assembly comprising: a friction shoe that abuts the friction member of the housing; a first link arm extending between the spring receiving portion of the pedal arm and a proximate end of the friction shoe; and a second link arm extending between the pivot end of the pedal arm and a distal end of the friction shoe; wherein, when a first predetermined load is applied to the pedal pad, the pedal arm compresses the compressible member to generate a first return force on the pedal pad.
82. The pedal emulator assembly of any preceding clause, wherein, when a second predetermined load is applied to the pedal pad, the friction shoe rotates against the friction member to generate a second return force on the pedal pad.
83. The pedal emulator assembly of any preceding clause, wherein the friction member of the housing is arcuate shaped.
84. The pedal emulator assembly of any preceding clause, wherein the friction member of the housing extends from a position below an interior surface of the pedal arm to and partially around the pivot end of the pedal arm.
85. The pedal emulator assembly of any preceding clause, wherein the friction shoe is arcuate shaped.

86. The pedal emulator assembly of any preceding clause, wherein the friction shoe further comprises a notch.

87. The pedal emulator assembly of any preceding clause, wherein the friction assembly further includes a cantilever member coupled to the second link arm and extending between the second link arm and the notch of the friction shoe, such that the cantilever member moves within the notch.

88. The pedal emulator assembly of any preceding clause, wherein, when a second predetermined load is applied to the pedal pad, the cantilever member is displaced within the notch, such that the cantilever member bends and exerts a force on the second link arm.

89. The pedal emulator assembly of any preceding clause, further comprising a sensor assembly configured to monitor rotational movement of the pedal pad.

90. The pedal emulator assembly of any preceding clause, wherein the sensor assembly further comprises a coupler integrated into the pivot end of the pedal arm, such that the coupler rotates in tandem with the pivot end of the pedal arm.

91. A pedal emulator assembly comprising: a housing having a spring receiving cavity and a friction member formed on an inner surface of the housing; a pedal arm at least partially received in the housing, the pedal arm having a pivot end an opposite pad end on which a pedal pad is attached, and a spring receiving portion positioned between the pivot end and the opposite pad end on which the pedal pad is attached; a compressible member extending between the spring receiving cavity and the spring receiving portion of the pedal arm; and a friction assembly comprising: a friction shoe that abuts the friction member of the housing; a first link arm extending between the spring receiving portion of the pedal arm and a proximate end of the friction shoe; a second link arm extending between the pivot end of the pedal arm and a distal end of the friction shoe; a notch; and a cantilever member coupled to the second link arm and extending between the second link arm and the notch of the friction shoe, such that the cantilever member moves within the notch; wherein, when a first predetermined load is applied to the pedal pad, the pedal arm compresses the compressible member, and when a second predetermined load is applied to the pedal pad, the friction shoe rotates against the friction member to generate a return force on the pedal pad.

92. The pedal emulator assembly of any preceding clause, wherein the friction member of the housing is arcuate shaped.

93. The pedal emulator assembly of any preceding clause, wherein the friction member of the housing extends from a position below an interior surface of the pedal arm to and partially around the pivot end of the pedal arm.

94. The pedal emulator assembly of any preceding clause, wherein the friction shoe is arcuate shaped.

95. The pedal emulator assembly of any preceding clause, wherein, when a third predetermined load is applied to the pedal pad, the cantilever member is displaced within the notch, such that the cantilever member bends and exerts a force on the second link arm.

96. The pedal emulator assembly of any preceding clause, further comprising a sensor assembly configured to monitor rotational movement of the pedal pad.

97. The pedal emulator assembly of any preceding clause, wherein the sensor assembly further comprises a coupler integrated into the pivot end of the pedal arm, such that the coupler rotates in tandem with the pivot end of the pedal arm.

98. A pedal emulator assembly for a vehicle comprising: a floor mounted housing having a spring receiving cavity and an arcuate shaped friction member formed on an inner surface of the housing; a pedal arm at least partially received in the housing, the pedal arm having a pivot end an opposite pad end on which a pedal pad is attached, and a spring receiving portion positioned between the pivot end and the opposite pad end on which the pedal pad is attached; a compressible member extending between the spring receiving cavity and the spring receiving portion of the pedal arm; and a friction assembly comprising: an arcuate shaped friction shoe that abuts the friction member of the housing; a first link arm extending between the spring receiving portion of the pedal arm and a proximate end of the friction shoe; a second link arm extending between the pivot end of the pedal arm and a distal end of the friction shoe; a notch; and a cantilever member coupled to the second link arm and extending between the second link arm and the notch of the friction shoe, such that the cantilever member moves within the notch; wherein, when a first predetermined load is applied to the pedal arm, the pedal arm compresses the compressible member, when a second predetermined load is applied to the pedal arm, the friction shoe rotates against the friction member, and when a third predetermined load is applied to the pedal arm, the cantilever member is displaced within the notch to generate a return force on the pedal pad.

99. The pedal emulator assembly of any preceding clause, further comprising a sensor assembly configured to monitor rotational movement of the pedal pad.

100. The pedal emulator assembly of any preceding clause, wherein the sensor assembly further comprises a coupler integrated into the pivot end of the pedal arm, such that the coupler rotates in tandem with the pivot end of the pedal arm.

It should now be understood that the embodiments described herein are directed to embodiments of pedal emulator assemblies that include sensors adapted to sense a position and/or force of a pedal pad. The various pedal assemblies are configured to simulate a braking fluid system, such as a hydraulic system, that is based on a speed system such as the faster a driver depresses onto the pedal pad of a pedal, the harder or more difficult the pedal is to depress, known herein as hepatic force. The pedal emulator assemblies described herein apply an opposite emulator force to provide the driver with a resistive force that changes according to the speed in which the PE is applied. Generally, the emulator assembly outputs three distinct force vs travel sections that correspond to a specific range of travel such that the driver feels different resistance or haptics based on how fast the pedal is being depressed.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A pedal emulator assembly comprising:
   a housing defined by a pair of sidewalls, a first end wall and a second end wall;
   a pedal arm having a pedal pad and having a pair of opposing walls, the pedal arm pivotally coupled the housing such that the pair of opposing walls are movable relative to the pair of sidewalls thereby defining a cavity by the pair of opposing walls and the housing;
   a lower arm having a spring retaining portion formed therein;
   a lever arm pivotally coupled to the housing, the lever arm further including:
      a spring receiving portion; and
      an engagement surface configured to slidably engage with a portion of the pedal arm, the engagement surface having a non-linear profile that extends a length between a first end positioned at a distal end of the lever arm and a second end of the lever arm, the non-linear profile configured to provide a different force characteristic based on an engagement position of contact between the portion of the pedal arm and the engagement surface substantially along the length of the non-linear profile based on a load applied to the pedal pad, the engagement surface is positioned to be enclosed within the cavity; and
   a spring carrier including a compressible member extending between the spring receiving portion and the spring retaining portion,
   wherein, when the load is a first predetermined load applied to the pedal pad, the pedal arm drives the lever arm into the compressible member such that the compressible member compresses into an at least partially compressed state to generate a first return force on the pedal pad.

2. The pedal emulator assembly of claim 1, wherein the engagement surface of the lever arm is defined by an upper frame portion.

3. The pedal emulator assembly of claim 2, wherein the upper frame portion includes a first portion extending between the first end of the lever arm and an apex of the engagement surface of the lever arm.

4. The pedal emulator assembly of claim 3, wherein the upper frame portion includes a second portion extending between the apex of the engagement surface of the lever arm and the second end of the lever arm.

5. The pedal emulator assembly of claim 4, wherein the engagement surface of the first portion of the upper frame portion has a first slope and the engagement surface of the second portion of the upper frame portion has a second slope different from the first slope.

6. The pedal emulator assembly of claim 1, wherein, when the load is a second predetermined load applied to the pedal pad, the pedal arm further contacts a different engagement position of contact of the engagement surface than the engagement position of contact when the load is the first predetermined load to generate a second return force on the pedal pad, the second predetermined load is a greater load than the first predetermined load and the second return force is a greater force than the first return force.

7. The pedal emulator assembly of claim 6, wherein, when the load is a third predetermined load applied to the pedal pad, the pedal arm further contacts a different engagement position of contact of the engagement surface than the engagement position of contact when the load is the second predetermined load to generate a third return force on the pedal pad, the third predetermined load is a greater load than the second predetermined load, and the third return force is a greater force than the second return force.

8. The pedal emulator assembly of claim 1, wherein the lower arm is fixedly coupled to within the cavity of the housing.

9. The pedal emulator assembly of claim 1, wherein the lower arm further includes a concave portion configured to receive a pivot portion of a pivot end of the pedal arm, such that the pedal arm pivots about the pivot portion within the concave portion of the lower arm.

10. The pedal emulator assembly of claim 1, wherein the compressible member includes a plurality of springs coaxially aligned about the spring carrier.

11. The pedal emulator assembly of claim 1, further comprising:
    a sensor assembly positioned within the housing, the sensor assembly further comprising:
       a circuit board;
       at least one Hall Effect chip communicatively coupled to the circuit board; and
       a magnet communicatively coupled to the at least one Hall Effect chip;
    wherein the sensor assembly is configured to detect movement of the pedal arm.

12. A pedal emulator assembly for a vehicle comprising:
    a floor mounted housing having a pair of sidewalls, a first end wall, and a second end wall;
    a lower arm having a spring retaining portion formed therein;
    a pedal arm having a pair of opposing walls, an interior surface, and a pedal pad, the pedal arm pivotally coupled the housing such that the pair of opposing walls are movable relative to the pair of sidewalls thereby defining a cavity by the pair of opposing walls and the housing;
    a lever arm pivotally coupled to the housing, the lever arm further comprising:
       a first end positioned at a distal end of the lever arm;
       a second end positioned opposite the first end;
       a hub portion disposed at the second end;
       an upper frame portion and a lower frame portion that connect at the distal end and at the hub portion, the upper frame portion having an engagement surface configured to slidably engage with a portion of the interior surface of the pedal arm, the engagement surface having a non-linear profile that extends a length between the distal end of the lever arm and the hub portion, the non-linear profile configured to provide a different force characteristic based on an engagement position of contact between the portion of the pedal arm and the engagement surface substantially along the length of the non-linear profile based on a load applied to the pedal pad, the engagement surface is positioned to be enclosed within the cavity; and a spring receiving portion positioned between the first end and the second end and within the lower frame portion; and a spring carrier including a compressible member extending between the spring receiving portion and the spring retaining portion, wherein, when the load is a first predetermined load applied to the pedal pad, the interior surface of the pedal arm drives the lever arm into the compressible member such that the compressible member compresses into a compressed state to generate a first return force on the pedal pad.

13. The pedal emulator assembly of claim 12, wherein the interior surface of the pedal arm is non-linear.

14. The pedal emulator assembly of claim 12, wherein the upper frame portion includes a first portion extending between the first end of the lever arm and an apex of the upper frame portion and a second portion extending between the apex of the upper frame portion and the second end of the lever arm.

15. The pedal emulator assembly of claim 14, wherein the engagement surface of the first portion of the upper frame portion has a first slope and the engagement surface of the second portion of the upper frame portion has a second slope different from the first slope.

16. The pedal emulator assembly of claim 12, wherein, when the load is a second predetermined load applied to the pedal pad, the interior surface of the pedal arm contacts a different engagement position of contact of the engagement surface than the engagement position of contact when the load is the first predetermined load to generate a second return force on the pedal pad, the second predetermined load is a greater load than the first predetermined load, and the second return force is a greater force than the first return force.

17. The pedal emulator assembly of claim 16, wherein, when the load is a third predetermined load applied to the pedal pad, the interior surface of the pedal arm contacts a different engagement position of contact of the engagement surface than the engagement position of contact when the load is the second predetermined load to generate a third return force on the pedal pad, the third predetermined load is a greater load than the second predetermined load, and the third return force is a greater force than the second return force.

18. The pedal emulator assembly of claim 12, further comprising:

a sensor assembly positioned within the housing, the sensor assembly further comprising:
a circuit board;
at least one Hall Effect chip communicatively coupled to the circuit board; and
a magnet communicatively coupled to the at least one Hall Effect chip, wherein the sensor assembly is configured to detect movement of the pedal arm.

19. A pedal emulator assembly for a vehicle comprising:

a housing defined by a pair of sidewalls, a first end wall and a second end wall;

a lower arm having a spring retaining portion formed therein;

a pedal arm having a pair of opposing walls, a pivot portion having a pivot end pivotally coupled to the housing, a pedal pad, and an interior surface that is non-linear, the pedal arm pivotally coupled the housing such that the pair of opposing walls are movable relative to the pair of sidewalls thereby defining a cavity by the pair of opposing walls and the housing;

a lever arm positioned within the cavity of the housing and pivotally coupled to the housing, the lever arm further comprising:

a first end positioned at a distal end of the lever arm;
a second end positioned opposite the first end;
a hub portion disposed at the second end;
an upper frame and a lower frame that connect at an apex at the distal end and at the hub portion, the upper frame including an engagement surface with a non-linear profile configured to slidably engage with a portion of the interior surface of the pedal arm, the engagement surface is positioned to be enclosed within the cavity; and
a spring receiving portion positioned between the first end and the second end in the lower frame; and a spring carrier including a compressible member extending between the spring receiving portion and the spring retaining portion, wherein, when a first predetermined load is applied to the pedal pad, the interior surface of the pedal arm contacts the engagement surface of the upper frame of the lever arm, such that the lever arm is forced into the compressible member to generate a return force on the pedal pad.

20. The pedal emulator assembly of claim 1, wherein the engagement surface extending between the first end and the second end such that the length of the engagement surface is greater than half of a distance of the lever arm between the first end and the second end.

* * * * *